United States Patent
Kurihara et al.

(10) Patent No.: US 11,845,674 B2
(45) Date of Patent: Dec. 19, 2023

(54) LITHIUM TITANATE POWDER AND ACTIVE MATERIAL INGREDIENT FOR ELECTRODE OF POWER STORAGE DEVICE, AND ELECTRODE SHEET AND POWER STORAGE DEVICE USING SAME

(71) Applicant: UBE Corporation, Ube (JP)

(72) Inventors: Yoshiki Kurihara, Ube (JP); Atsuyoshi Nakagawa, Ube (JP); Hiroshi Fujino, Ube (JP); Chisen Hashimoto, Ube (JP); Hirofumi Takemoto, Ube (JP); Koji Abe, Ube (JP)

(73) Assignee: UBE Corporation, Ube (JP)

( * ) Notice: Subject to any disclaimer, the term of this patent is extended or adjusted under 35 U.S.C. 154(b) by 1134 days.

(21) Appl. No.: 16/469,988

(22) PCT Filed: Dec. 15, 2017

(86) PCT No.: PCT/JP2017/045208
§ 371 (c)(1),
(2) Date: Jun. 14, 2019

(87) PCT Pub. No.: WO2018/110708
PCT Pub. Date: Jun. 21, 2018

(65) Prior Publication Data
US 2020/0087160 A1    Mar. 19, 2020

(30) Foreign Application Priority Data

Dec. 16, 2016  (JP) ................................. 2016-244347
Jul. 7, 2017   (JP) ................................. 2017-133638
Sep. 13, 2017  (JP) ................................. 2017-176098

(51) Int. Cl.
*C01G 23/00* (2006.01)
*H01G 11/06* (2013.01)
*H01G 11/24* (2013.01)
*H01G 11/46* (2013.01)
*H01G 11/50* (2013.01)
*H01M 4/485* (2010.01)
*H01M 10/0525* (2010.01)

(52) U.S. Cl.
CPC .......... *C01G 23/005* (2013.01); *H01G 11/06* (2013.01); *H01G 11/24* (2013.01); *H01G 11/46* (2013.01); *H01G 11/50* (2013.01); *H01M 4/485* (2013.01); *H01M 10/0525* (2013.01); *C01P 2002/85* (2013.01); *C01P 2006/12* (2013.01); *C01P 2006/40* (2013.01)

(58) Field of Classification Search
CPC ...... C01G 23/005; H01G 11/06; H01G 11/24; H01G 11/46; H01G 11/50; H01M 4/485; H01M 10/0525
See application file for complete search history.

(56) References Cited

U.S. PATENT DOCUMENTS

| | | | |
|---|---|---|---|
| 2008/0003503 A1 | 1/2008 | Kawakami et al. | |
| 2011/0059366 A1 | 3/2011 | Eom | |
| 2011/0293507 A1* | 12/2011 | Dambournet | H01M 4/485 |
| | | | 423/598 |
| 2012/0021292 A1 | 1/2012 | Awano et al. | |
| 2012/0045693 A1 | 2/2012 | Eom | |
| 2014/0312269 A1 | 10/2014 | Laumann et al. | |
| 2016/0204433 A1 | 7/2016 | Takemoto et al. | |
| 2017/0107117 A1 | 4/2017 | Takemoto et al. | |

FOREIGN PATENT DOCUMENTS

| | | |
|---|---|---|
| CN | 102983319 A | 3/2013 |
| EP | 2 420 475 A1 | 2/2012 |
| JP | 2011-60764 A | 3/2011 |
| JP | 2011-165372 A | 8/2011 |
| JP | 2012-28251 A | 2/2012 |
| JP | 2012-43765 A | 3/2012 |
| JP | 2014-533870 A | 12/2014 |
| KR | 10-1634088 B1 | 6/2016 |
| WO | WO 2009/113387 A1 | 9/2009 |
| WO | WO 2015/178457 A1 | 11/2015 |

OTHER PUBLICATIONS

Extended European Search Report dated Jul. 3, 2020 in Patent Application No. 17879889.8, 6 pages.
International Search Report dated Feb. 6, 2018 in PCT/JP2017/045208 filed on Dec. 15, 2017.

* cited by examiner

*Primary Examiner* — James A Fiorito
(74) *Attorney, Agent, or Firm* — Oblon, McClelland, Maier & Neustadt, L.L.P.

(57) ABSTRACT

The present invention provides a lithium titanate powder for an electrode of an energy storage device, the lithium titanate powder comprising $Li_4Ti_5O_{12}$ as a main component, having a specific surface area of 4 $m^2$/g or more, and containing at least one localized element selected from the group consisting of boron (B), Ln (where Ln is at least one metal element selected from the group consisting of La, Ce, Pr, Nd, Pm, Sm, Eu, Gd, Tb, Dy, Hb, Er, Tm, Yb, Lu, Y, and Sc), and M1 (where M1 is at least one metal element selected from W and Mo), wherein boron (B), Ln, and M1 as the localized element are localized on or near surfaces of lithium titanate particles forming the lithium titanate powder.

23 Claims, No Drawings

LITHIUM TITANATE POWDER AND ACTIVE MATERIAL INGREDIENT FOR ELECTRODE OF POWER STORAGE DEVICE, AND ELECTRODE SHEET AND POWER STORAGE DEVICE USING SAME

TECHNICAL FIELD

The present invention relates to a lithium titanate powder suitable as an electrode material for energy storage devices and the like, an active material comprising this lithium titanate powder, and an energy storage device including a positive electrode sheet or a negative electrode sheet comprising this active material.

BACKGROUND ART

A variety of materials as electrode materials for energy storage devices have been examined in recent studies. Among these materials, lithium titanate demonstrates high input/output characteristics when used in an active material. For this reason, lithium titanate receives attention as an active material for an energy storage device for electric vehicles such as HEVs, PHEVs, and BEVs.

The inner temperature of vehicles often reaches 60° C. or more in summer. Thus, the energy storage device for electric vehicles should demonstrate safety and maintain its performance even at high temperature. Unfortunately, if an energy storage device comprising lithium titanate operates at such high temperature, the energy storage device may expand due to gas generated by an electrochemical side reaction of lithium titanate, impairing the safety of the energy storage device. Moreover, if charged in a short time for timesaving, the energy storage device will have reduced charge capacity and cannot be used at its original capacity. Accordingly, it is desired to develop a lithium titanate which allows the prevention of generation of gas during the operation of the energy storage device at high temperature and has high charge rate characteristics. Here, the operation of the energy storage device at high temperature refers to charge, discharge, or repetition of charge/discharge of the energy storage device at 60° C. or more.

Patent Document 1 discloses a negative electrode active substance comprising a lithium-transition metal composite oxide containing an alkali metal and/or an alkaline earth metal. According to this disclosure, the alkali metal and/or the alkaline earth metal contained in the lithium-transition metal composite oxide stabilizes the spinel crystal structure of the lithium-transition metal composite oxide, thus improving the cycle characteristics. In addition, boron contained in the lithium-transition metal composite oxide prevents the lithium-transition metal composite oxide from reacting with an electrolyte, further improving the cycle characteristics.

Patent Document 2 discloses a metal-substituted lithium titanate whose lithium component is partially substituted by a metal having 2 or more valences. Such a metal-substituted lithium titanate, whose lithium component is partially ion exchanged for a metal having two or more valences, enables control of the size and shape of particles thereof, and can be used in a variety of applications such as electrode materials for lithium batteries.

Patent Document 3 discloses a nonaqueous electrolyte lithium secondary battery including a negative electrode composed of a negative electrode active substance and a positive electrode composed of a positive electrode active substance, wherein a main component of the negative electrode active substance is a calcined body of an oxide having a spinel structure represented by a formula $Li_xTi_{5/3-y}L_yO_4$ (where L is an element including B, Co, or Zn and excluding Ti, $4/3 \le x \le 7/3$, and $0 < y \le 5/3$), and a main component of the positive electrode active substance is a calcined body of an oxide having a spinel structure represented by a formula $Li[Ni_{2-n}M_nO_4]$ (where M represents one or more transition metal elements including Mn, Co, Zn, Fe, or V and excluding Ni, and $0.75 \le n \le 1.80$). Titanium atoms in the negative electrode active substance are partially replaced with another element, thereby preventing formation of an electrode having large gaps generated by a bulky oxide of Ti. As a result, ions or electrons can be smoothly donated or received between particles, thus improving the storage performance of the battery.

Patent Document 4 discloses a technique of adding a substance containing a cation having an ionic radius larger than that of titanium during calcination of lithium titanate to prepare a negative electrode material comprising lithium titanate having a three-dimensional skeleton structure containing anions and cations in the crystal structure. The tunnel structure of the resulting negative electrode material maintains poor oxidation/reduction potential of the negative electrode and improves the cycle stability.

Patent Document 5 discloses a negative electrode active substance containing secondary particles, which are agglomerates of primary particles, the negative electrode active substance having a specific surface area of 2 $m^2/g$ or more and 5 $m^2/g$ or less, and being represented by a formula $Li_{4-x-y}M_yTi_{5+x-z}M'_zO_{12}$ (where x is in the range of 0 to 1, y is in the range of 0 to 1, z is in the range of 0 to 1, M is an element selected from the group consisting of La, Tb, Gd, Ce, Pr, Nd, Sm, Ba, Sr, Ca, Mg, and combinations thereof, and M' is an element selected from the group consisting of V, Cr, Nb, Fe, Ni, Co, Mn, W, Al, Ga, Cu, Mo, P, and combinations thereof). According to Patent Document 5, a lithium secondary battery having high life properties is obtained.

Patent Document 6 discloses an electrode comprising lithium titanate doped with at least one element selected from the group consisting of Mg, Al, Ca, Ba, Bi, Ga, V, Nb, W, Mo, Ta, Cr, Fe, Ni, Co, and Mn. According to Patent Document 6, a nonaqueous electrolyte secondary battery having high charge/discharge cycle characteristics is obtained.

Furthermore, Patent Document 7 discloses a technique using lithium titanate containing at least one element selected from the group consisting of Nb, Ta, Mo, and W as a negative electrode material contained in a negative electrode mixture layer of a nonaqueous electrolyte secondary battery. In Patent Document 7, a negative electrode material is prepared by mixing lithium titanate powder with a compound containing Nb, Ta, Mo, or W.

PRIOR ART DOCUMENT

Patent Document

Patent Document 1: JP 2004-235144 A
Patent Document 2: JP H10-251020 A
Patent Document 3: JP 4196234 B
Patent Document 4: JP 2012-28251 A
Patent Document 5: JP 2012-43765 A
Patent Document 6: WO 2011/121950
Patent Document 7: WO 2017/150020

SUMMARY OF INVENTION

Problems to be Solved by Invention

In the lithium transition metal composite oxide according to Patent Document 1, when a lithium compound, a titanium compound, and an alkali metal compound and/or an alkaline earth metal compound are mixed, a boron compound is also mixed with these raw materials; and then, the raw material mixture is calcined to prepare the composite oxide. For this reason, the boron compound acts as a sintering promoter during the calcination to promote growth of lithium titanate particles, thereby yielding a lithium titanate powder having a reduced specific surface area. For this reason, such a lithium titanate powder, when used as an electrode material for energy storage devices, significantly reduces the charge/discharge capacity and the charge/discharge rate characteristics thereof. In addition, the generation of gas during the operation of the energy storage devices at high temperature cannot be sufficiently prevented. The metal-substituted lithium titanate according to Patent Document 2 can control the size and shape of particles through partial replacement of the lithium component with a metal having 2 or more valences. However, when used as an electrode material for energy storage devices, the metal-substituted lithium titanate cannot sufficiently prevent the generation of gas during the operation of the energy storage devices at high temperature. If the lithium titanate powder according to Patent Document 3 containing titanium atoms partially replaced is used as an electrode material for energy storage devices, the lithium titanate powder cannot also sufficiently prevent the generation of gas during the operation of the energy storage devices at high temperature. Furthermore, also in energy storage devices where lithium titanates according to Patent Documents 4, 5, 6, and 7 are used as negative electrode materials, the cycle stability is improved while the generation of gas during the operation of the energy storage devices at high temperature cannot be sufficiently prevented. As described above, although the lithium titanate powder containing boron and the lithium titanate powders containing a lanthanoid such as La and containing Mo or W are disclosed in Patent Documents 1 to 7, these lithium titanate powders used as electrode materials for energy storage devices cannot sufficiently prevent the generation of gas during the operation of the energy storage devices at high temperature.

An object of the present invention is to provide a lithium titanate powder which demonstrates high charge/discharge capacity and can prevent generation of gas during operation of an energy storage device at high temperature when the lithium titanate powder is used as an electrode material of the energy storage device, an active material, an electrode sheet for an energy storage device containing the same, and an energy storage device including the electrode sheet.

Means for Solving Problems

As a result of extensive research to achieve the object above, the present inventors have discovered a lithium titanate powder which has a particular specific surface area, and is composed of lithium titanate particles containing at least one element selected from the group consisting of boron (B), Ln (where Ln is at least one metal element selected from the group consisting of La, Ce, Pr, Nd, Pm, Sm, Eu, Gd, Tb, Dy, Hb, Er, Tm, Yb, Lu, Y, and Sc), and M1 (where M1 is at least one metal element selected from W and Mo), the at least one element being localized on or near surfaces of the lithium titanate particles. The present inventors also have found that an energy storage device comprising the lithium titanate powder as an electrode material has high charge/discharge capacity and can prevent the generation of gas during operation of the energy storage device at high temperature, and thus have completed the present invention. Namely, the present invention relates to the following aspects.

(1) A lithium titanate powder for an electrode of an energy storage device, the lithium titanate powder comprising $Li_4Ti_5O_{12}$ as a main component, having a specific surface area of 4 $m^2/g$ or more, and containing at least one localized element selected from the group consisting of boron (B), Ln (where Ln is at least one metal element selected from the group consisting of La, Ce, Pr, Nd, Pm, Sm, Eu, Gd, Tb, Dy, Hb, Er, Tm, Yb, Lu, Y, and Sc), and M1 (where M1 is at least one metal element selected from W and Mo), wherein boron (B), Ln, and/or M1 as the localized element are localized on or near surfaces of lithium titanate particles forming the lithium titanate powder.

(2) The lithium titanate powder for an electrode of an energy storage device according to Aspect (1), wherein boron (B) is contained as the localized element, $B_B$ (mass %) is 0.05 or more and 1.0 or less where $B_B$ is defined as the content of boron (B) determined by inductively coupled plasma atomic emission spectroscopy (ICP-AES), a peak attributed to B—O bond is observed in a spectrum of B1s in surface analysis by X-ray photoelectron spectroscopy (XPS), and a relation represented by the following expression (I) is satisfied:

$$10 \leq (B_S \times S) \leq 100 \quad (I)$$

where $B_S$ (atm %) is the concentration of boron (B) determined based on a peak area in the spectrum of B1s in surface analysis by X-ray photoelectron spectroscopy (XPS) and S ($m^2/g$) is the specific surface area.

(3) The lithium titanate powder for an electrode of an energy storage device according to Aspect (1), wherein Ln is contained as the localized element, $C_{Ln}$ (mass %) is 0.1 or more and 5 or less, where $C_{Ln}$ is the content of Ln determined by inductively coupled plasma atomic emission spectroscopy (ICP-AES), and a relation represented by the following expression (II) is satisfied:

$$1 \leq (C_{S1} \times S) \leq 100 \quad (II)$$

where $C_{S1}$ (atm %) is the concentration of Ln determined based on a peak area of a spectrum of Ln3d, Ln3d5/2, Ln4d, Ln4d5/2, Ln2p, or Ln2p3/2 in surface analysis by X-ray photoelectron spectroscopy (XPS) and S ($m^2/g$) is the specific surface area.

(4) The lithium titanate powder for an electrode of an energy storage device according to Aspect (1), wherein M1 is contained as the localized element, $C_{M1}$ (mol %) is 0.01 or more and 0.9 or less, where $C_{M1}$ is the content of M1 determined by inductively coupled plasma atomic emission spectroscopy (ICP-AES), and a relation represented by the following expression (III) is satisfied:

$$1 \leq (C_{S2} \times S) \leq 100 \quad (III)$$

where $C_{S2}$ (atm %) is the concentration of M1 determined based on a peak area of a spectrum of W4d5/2 and/or Mo3d in surface analysis by X-ray photoelectron spectroscopy (XPS) and S ($m^2/g$) is the specific surface area.

(5) The lithium titanate powder for an electrode of an energy storage device according to Aspect (1),
wherein Ln is contained in the localized element,
$C_{Ln}$ (mass %) is 0.1 or more and 5 or less, where $C_{Ln}$ is the content of Ln determined by inductively coupled plasma atomic emission spectroscopy (ICP-AES), and
relations represented by the following expressions (IV) and (V) are satisfied:

$$D1 > D2 \quad \text{(IV)}$$

$$0.20 \leq D1/Dti \leq 2.0 \quad \text{(V)}$$

where D1 (atm %) is the elemental concentration of Ln at a depth position of 1 nm from the surface of each lithium titanate particle, Dti (atm %) is the atomic concentration of titanium at a depth position of 1 nm therefrom, and D2 (atm %) is the elemental concentration of Ln at a depth position of 100 nm from the surface of each lithium titanate particle, the elemental concentrations and the atomic concentration being measured by energy dispersive X-ray spectroscopy in cross-sectional analysis of the lithium titanate particles forming the lithium titanate powder using a scanning transmission electron microscope.

(6) The lithium titanate powder for an electrode of an energy storage device according to Aspect (1),
wherein M1 is contained as the localized element,
$C_{M1}$ (mol %) is 0.01 or more and 0.9 or less, where $C_{M1}$ is the content of M1 determined by inductively coupled plasma atomic emission spectroscopy (ICP-AES), and
relations represented by the following expressions (VI) and (VII) are satisfied:

$$E1 > E2 \quad \text{(VI)}$$

$$0.05 \leq E1/Eti \leq 6 \quad \text{(VII)}$$

where E1 (atm %) is the elemental concentration of M1 at a depth position of 1 nm from the surface of each lithium titanate particle, Eti (atm %) is the atomic concentration of titanium at a depth position of 1 nm therefrom, and E2 (atm %) is the elemental concentration of M1 at a depth position of 100 nm from the surface of each lithium titanate particle, the elemental concentrations and the atomic concentration being measured by energy dispersive X-ray spectroscopy in cross-sectional analysis of the lithium titanate particles forming the lithium titanate powder using a scanning transmission electron microscope.

(7) The lithium titanate powder for an electrode of an energy storage device according to Aspect (6), wherein $C_{M1}$ is 0.02 or more and 0.9 or less.

(8) The lithium titanate powder for an electrode of an energy storage device according to Aspect (5), wherein in the cross-sectional analysis of the lithium titanate particles forming the lithium titanate powder using the scanning transmission electron microscope, Ln is not detected at a position of 100 nm from the surfaces of the lithium titanate particles measured by energy dispersive X-ray spectroscopy.

(9) The lithium titanate powder for an electrode of an energy storage device according to Aspect (6) or (7), wherein in the cross-sectional analysis of the lithium titanate particles forming the lithium titanate powder using the scanning transmission electron microscope, M1 is not detected at a position of 100 nm from the surfaces of the lithium titanate particles measured by energy dispersive X-ray spectroscopy.

(10) The lithium titanate powder for an electrode of an energy storage device according to any one of Aspects (1) to (9), wherein M2 (where M2 is at least one element selected from the group consisting of elements of Groups 2, 12, and 13) is contained.

(11) The lithium titanate powder for an electrode of an energy storage device according to Aspect (10), wherein M2 is at least one element selected from the group consisting of B, Mg, Zn, Al, Ga, and In.

(12) The lithium titanate powder for an electrode of an energy storage device according to Aspect (11), wherein M2 is Al.

(13) The lithium titanate powder for an electrode of an energy storage device according to Aspect (12), wherein boron (B) is contained as the localized element, and a ratio of $A_S$ to $B_S$ ($A_S/B_S$ (atm %/atm %)) is 0.06 or more and 3 or less, where $B_S$ (atm %) is the concentration of boron (B) determined based on a peak area in a spectrum of B1s in surface analysis by X-ray photoelectron spectroscopy (XPS), and $A_S$ (atm %) is the concentration of Al determined based on a peak area in a spectrum of Al2s in surface analysis by X-ray photoelectron spectroscopy (XPS).

(14) The lithium titanate powder for an electrode of an energy storage device according to any one of Aspects (10) to (13), wherein a relation represented by the following expression (VIII) is satisfied:

$$F1/F2 \geq 5 \quad \text{(VIII)}$$

where F1 (atm %) is the elemental concentration of M2 at an inner position of 1 nm from the surface of each lithium titanate particle, the inner position being located on a straight line which extends from the surface of each lithium titanate particle and is drawn orthogonal to a tangent of the surface of the lithium titanate particle, and F2 (atm %) is the elemental concentration of M2 at a depth position of 100 nm from the surface of the lithium titanate particle, the inner position being located on a straight line which extends from the surface of the lithium titanate particle and is drawn orthogonal to a tangent of the surface of the lithium titanate particle, the elemental concentrations being measured by energy dispersive X-ray spectroscopy in cross-sectional analysis of the lithium titanate particles forming the lithium titanate powder using a scanning transmission electron microscope.

(15) The lithium titanate powder for an electrode of an energy storage device according to any one of Aspects (10) to (14), wherein $C_{M2}$ (mass %) is 0.01 or more and 1.0 or less, where $C_{M2}$ is the content of M2 determined by inductively coupled plasma atomic emission spectroscopy (ICP-AES).

(16) The lithium titanate powder for an electrode of an energy storage device according to Aspect (15),
wherein boron (B) is contained as the localized element, and
a ratio of $C_{M2}$ to $B_B$ ($C_{M2}/B_B$ (mass %/mass %)) is 0.07 or more and 15 or less, where $B_B$ (mass %) is the content of boron (B) determined by inductively coupled plasma atomic emission spectroscopy (ICP-AES).

(17) The lithium titanate powder for an electrode of an energy storage device according to Aspect (15),
wherein Ln is contained as the localized element, and
a ratio of $C_{M2}$ to $C_{Ln}$ ($C_{M2}/C_{Ln}$ (mass %/mass %)) is 0.05 or more and 5.0 or less, where $C_{Ln}$ (mass %) is the content of Ln determined by inductively coupled plasma atomic emission spectroscopy (ICP-AES).

(18) The lithium titanate powder for an electrode of an energy storage device according to Aspect (15),
wherein M1 is contained as the localized element,
a ratio of $C_{M2}$ to $C_{M1}$ ($C_{M2}/C_{M1}$ (mol %/mol %)) is 0.3 or more and 30 or less, where $C_{M1}$ (mol %) is the content of M1 determined by inductively coupled plasma atomic emission spectroscopy (ICP-AES).

(19) An active material comprising the lithium titanate powder for an electrode of an energy storage device according to any one of Aspects (1) to (18).
(20) An electrode sheet for an energy storage device, comprising the active material according to Aspect (19).
(21) An energy storage device comprising the active material according to Aspect (19).
(22) A lithium ion secondary battery comprising the active material according to Aspect (19).
(23) A hybrid capacitor comprising the active material according to Aspect (19).

Effects of Invention

The present invention provides a lithium titanate powder suitable for an electrode material for energy storage devices which provides energy storage devices having improved charge/discharge capacity without generating gas during operation of the energy storage devices at high temperature, and an active material, an electrode sheet for energy storage devices comprising the same, and an energy storage device including the electrode sheet.

MODES FOR CARRYING OUT THE INVENTION

[Lithium Titanate Powder According to the Present Invention]

The lithium titanate powder according to the present invention comprises $Li_4Ti_5O_{12}$ as a main component.

The lithium titanate powder has a specific surface area of 4 $m^2/g$ or more.

The lithium titanate powder contains at least one localized element selected from the group consisting of boron (B), Ln (where Ln is at least one metal element selected from the group consisting of La, Ce, Pr, Nd, Pm, Sm, Eu, Gd, Tb, Dy, Hb, Er, Tm, Yb, Lu, Y, and Sc), and M1 (where M1 is at least one metal element selected from W and Mo).

In the lithium titanate powder for an electrode of an energy storage device, boron (B), Ln, and/or M1 as the localized element are localized on or near the surfaces of the lithium titanate particles forming the lithium titanate powder.

In the present invention, the localized element indicates the specific elements above (i.e., boron, Ln, and M1) whose presence is localized on or near surfaces of the lithium titanate particles forming the lithium titanate powder.

<Lithium Titanate Powder Comprising $Li_4Ti_5O_{12}$ as Main Component>

The lithium titanate powder according to the present invention comprises $Li_4Ti_5O_{12}$ as a main component, and a crystalline component and/or an amorphous component other than $Li_4Ti_5O_{12}$ in the range of providing the effects of the present invention. In the lithium titanate powder according to the present invention, among the diffraction peaks measured by X-ray diffraction, the proportion of the intensity of the main peak of $Li_4Ti_5O_{12}$ in the sum of the intensity of the main peak of $Li_4Ti_5O_{12}$, the intensity of the main peak of the crystalline component other than $Li_4Ti_5O_{12}$, and the highest intensity of the halo pattern attributed to the amorphous component is preferably 90% or more, more preferably 95% or more. The lithium titanate powder according to the present invention may contain, as crystalline components, anatase titanium dioxide, rutile titanium dioxide, and a lithium titanate represented by a different formula $Li_2TiO_3$, which are derived from the raw materials used in the synthesis. A smaller proportion of these crystalline components in the lithium titanate powder according to the present invention results in an energy storage device having more improved charge rate characteristics and charge/discharge capacity. Accordingly, it is particularly preferred that the sum of the intensity of the main peak of anatase titanium dioxide, the intensity of the main peak of rutile titanium dioxide, and the intensity corresponding to the main peak of $Li_2TiO_3$ (which is calculated by multiplying the peak intensity corresponding to the (-133) plane of $Li_2TiO_3$ by 100/80) be 5 or less, where the intensity of the main peak of $Li_4Ti_5O_{12}$ among the diffraction peaks measured by X-ray diffraction is 100. Here, the main peak of $Li_4Ti_5O_{12}$ refers to a peak corresponding to the diffraction peak attributed to the (111) plane (2θ=18.33) of $Li_4Ti_5O_{12}$ in the PDF card 00-049-0207 of ICDD (PDF 2010). The main peak of anatase titanium dioxide refers to a peak corresponding to the diffraction peak attributed to the (101) plane (2θ=25.42) in the PDF card 01-070-6826. The main peak of rutile titanium dioxide refers to a peak corresponding to the diffraction peak attributed to the (110) plane (2θ=27.44) in the PDF card 01-070-7347. The peak corresponding to the (-133) plane of $Li_2TiO_3$ refers to a peak corresponding to the diffraction peak attributed to the (-133) plane (2θ=43.58) of $Li_2TiO_3$ in the PDF card 00-033-0831, and the main peak of $Li_2TiO_3$ refers to a peak corresponding to the (002) plane. The term "ICDD" is an abbreviation of International Centre for Diffraction Data, and "PDF" is an abbreviation of the powder diffraction file.

<Specific Surface Area>

The lithium titanate powder according to the present invention has a specific surface area of 4 $m^2/g$ or more determined by a BET method. A specific surface area of 4 $m^2/g$ or more prevents a rapid reduction in charge/discharge capacity and charge rate characteristics of the energy storage device. The specific surface area is preferably 4.5 $m^2/g$ or more, more preferably 5 $m^2/g$ or more. The upper limit of the specific surface area can be any value. The upper limit is preferably 40 $m^2/g$ or less. A specific surface area of 40 $m^2/g$ or less is preferred because such a lithium titanate powder used as an active substance for an electrode demonstrates favorable handling properties during application of the electrode. The specific surface area is more preferably 25 $m^2/g$ or less, particularly preferably 15 $m^2/g$ or less.

<Containment of Localized Element>

The lithium titanate powder according to the present invention contains at least one localized element selected from the group consisting of boron (B), Ln (where Ln is at least one metal element selected from the group consisting of La, Ce, Pr, Nd, Pm, Sm, Eu, Gd, Tb, Dy, Hb, Er, Tm, Yb, Lu, Y, and Sc), and M1 (where M1 is at least one metal element selected from W and Mo). In the present invention, the presence of these localized elements boron (B), Ln, and M1 is localized on or near the surfaces of the lithium titanate particles forming the lithium titanate powder. In the present invention, it is sufficient that these localized elements are localized on or near surfaces of the lithium titanate particles: For example, the concentration of the localized element on or near the surface of each lithium titanate particle (for example, in a region from the surface of the lithium titanate particle to a depth of about 5 nm) is higher than the concentration of the localized element in the entire lithium titanate particle.

<First Embodiment (Embodiment in which Boron (B) is Contained as Localized Element)>

First, a first embodiment will be described in which boron (B) is contained as the localized element. The lithium titanate powder according to the first embodiment of the present invention contains boron (B). Here, the term "contains boron (B)" indicates that boron (B) is detected by inductively coupled plasma atomic emission analysis (ICP-AES) of the lithium titanate powder according to the present invention. The lower limit of the quantity detectable by inductively coupled plasma atomic emission analysis is usually 0.001 mass %.

In the lithium titanate powder according to the first embodiment of the present invention, $B_B$ (mass %) is 0.05 or more and 1.0 or less where $B_B$ is the content of boron (B) determined by inductively coupled plasma atomic emission analysis (ICP-AES). A content of boron (B) within this range results in an energy storage device having high charge/discharge capacity and high charge rate characteristics without generating gas during operation of the energy storage device at high temperature when such a lithium titanate powder is used in the energy storage device. The content $B_B$ of boron (B) is preferably 0.08 or more, more preferably 0.1 or more to further prevent generation of gas during operation of the energy storage device at high temperature. The content $B_B$ of boron (B) is preferably 0.8 or less, more preferably 0.5 or less to increase the charge/discharge capacity of the energy storage device.

The lithium titanate powder according to the first embodiment of the present invention preferably has a peak attributed to B—O bond in a spectrum of B1s in surface analysis by X-ray photoelectron spectroscopy (XPS). Here, the term "has the peak attributed to B—O bond" indicates that the peak top of boron (B1s) is observed at 191 to 194 eV in a narrow spectrum (185 to 200 eV) of B1s when the Ti 2p3 peak is corrected to 458.8 eV in surface analysis by X-ray photoelectron spectroscopy. Boron in this bonding state can further enhance the effect of preventing the generation of gas during the operation of the energy storage device at high temperature. It is believed that the surface B—O bond prevents the side reaction.

The lithium titanate powder according to the first embodiment of the present invention preferably satisfies the relation represented by the following expression (1) where $B_S$ (atm %) is the concentration of boron (B) determined based on the peak area of the spectrum of B1s in surface analysis by X-ray photoelectron spectroscopy (XPS), and S (m²/g) is the specific surface area described in Section <Specific surface area> above. In the lithium titanate powder according to the present invention, $B_S \times S$ (atm %·m²/g) is an index related with the amount of boron (B) per mass present on the surface of the lithium titanate powder. The lithium titanate powder according to the first embodiment of the present invention satisfies preferably the relation represented by the following expression (2), preferably particularly the relation represented by the following expression (3) to further enhance the charge/discharge capacity and the charge rate characteristics of the energy storage device and further prevent the generation of gas during the operation of the energy storage device at high temperature. The lower limit of the detectable concentration of boron (B) in surface analysis by X-ray photoelectron spectroscopy (XPS) is usually 0.1 atm %.

$$10 \leq (B_S \times S) \leq 100 \quad (1)$$

$$10 \leq (B_S \times S) \leq 90 \quad (2)$$

$$15 \leq (B_S \times S) \leq 80 \quad (3)$$

The lithium titanate powder according to the first embodiment of the present invention preferably contains M2 as a different element (where M2 is at least one metal element selected from the group consisting of elements of Groups 2, 12, and 13). This is because the effect of improving the charge rate characteristics and the effect of preventing the generation of gas at high temperature charge/discharge are further enhanced if both of M2 and boron (B) are contained the lithium titanate powder according to the first embodiment of the present invention. In particular, M2 is more preferably at least one metal element selected from Mg, Zn, Al, Ga, or In. Furthermore, M2 is more preferably Al. These metal elements Mg, Zn, Al, Ga, and In as ions each have a Pauling's ionic radius within the range of (the Pauling's ionic radius of $Ti^{4+}$)+20 pm (that is, within the range of 68 pm±20 pm where $Ti^{4+}$ has a Pauling's ionic radius of 68 pm), and have different valences from that of $Ti^{4+}$. For this reason, it is inferred that these metal elements can improve the diffusion rate of Li ions from the electrolyte solution into lithium titanate, thus reducing the charge transfer energy of Li ions during migration. Furthermore, it is inferred that in addition to the action above, if both of M2 and boron (B) as a metalloid are contained in the lithium titanate powder according to the first embodiment of the present invention, the surface electron conductivity of the lithium titanate powder is adjusted; as a result, compared to the case where boron (B) alone is contained, an electrochemical side reaction caused by donation and reception of electrons which become active at high temperature is further prevented without increasing the electric resistance.

As a preferred content of M2, $C_{M2}$ (mass %) is 0.01 or more and 1.0 or less where $C_{M2}$ is the content of M2 measured by inductively coupled plasma atomic emission analysis. $C_{M2}$ is preferably 0.05 or more, more preferably 0.2 or more, still more preferably 0.5 or more to further prevent the generation of gas during the operation of the energy storage device at high temperature. $C_{M2}$ is preferably 0.8 or less, more preferably 0.6 or less to increase the charge/discharge capacity of the energy storage device.

In the lithium titanate powder according to the first embodiment of the present invention, the ratio of $C_{M2}$ to $B_B$ ($C_{M2}/B_B$ (mass %/mass %)) is preferably 0.07 or more and 15 or less. The ratio $C_{M2}/B_B$ is more preferably 0.1 or more and 10 or less, still more preferably 0.1 or more and 5 or less to further prevent the generation of gas during the operation of the energy storage device at high temperature.

In the lithium titanate powder according to the first embodiment of the present invention, to further prevent the generation of gas during the operation of the energy storage device at high temperature, the lower limit of the ratio of $A_S$ to $B_S$ ($A_S/B_S$) is preferably 0.06 or more, more preferably 0.08 or more, where $A_S$ (atm %) is the concentration of Al determined based on the peak area of the spectrum of Al2s in surface analysis by X-ray photoelectron spectroscopy (XPS). Its upper limit is preferably 3 or less, more preferably 2.7 or less.

To improve the charge characteristics and further prevent the generation of gas, a larger amount of M2 is contained in the surface region of each of lithium titanate particles forming the lithium titanate powder than in the inner region thereof. In cross-sectional analysis of the lithium titanate particles using a scanning transmission electron microscope, the relation represented by the following expression (4) is preferably satisfied:

$$F1/F2 \geq 5 \quad (4)$$

where F1 (atm %) is the atomic concentration of M2 at an inner position of 1 nm from the surface of each lithium titanate particle, the inner position being located on a straight line which extends from the surface of the lithium titanate particle and is drawn orthogonal to a tangent of the surface of the lithium titanate particle, and F2 (atm %) is the atomic concentration of M2 at an inner position of 100 nm from the surface of the lithium titanate particle, the inner position being located on the straight line, the atomic concentrations being measured by energy dispersive X-ray spectroscopy (EDS).

To improve the charge characteristics and further prevent the generation of gas, the following expression (5) is preferably satisfied:

$$0.01 \leq F1/Fti \leq 0.4 \tag{5}$$

where Fti (atm %) is the atomic concentration of titanium at an inner position of 1 nm from the surface of each lithium titanate particle measured by energy dispersive X-ray spectroscopy (EDS).

The atomic concentration F1 (atm %) of M2 and the atomic concentration Fti (atm %) of titanium at a depth position of 1 nm from the surface of the lithium titanate particle can be determined by the measurement by energy dispersive X-ray spectroscopy performed at an inner position of 1 nm from the surface of the lithium titanate particle, the inner position being located on a straight line which extends from the surface of the lithium titanate particle and is drawn orthogonal to a tangent of the surface of the lithium titanate particle. Similarly, the atomic concentration F2 (atm %) of M2 at a depth position of 100 nm from the surface of the lithium titanate particle can be determined by the measurement by energy dispersive X-ray spectroscopy at an inner position of 100 nm from the surface of the lithium titanate particle, the inner position being located on a straight line which extends from the surface of the lithium titanate particle and is drawn orthogonal to a tangent of the surface of the lithium titanate particle. In a first aspect of the present invention, F1 and Fti are measured at a depth position of 1 nm from the surface of the lithium titanate particle because the atomic concentration of M2 and the atomic concentration of titanium can be appropriately measured (that is, the state of the surface thereof can be appropriately measured), and F2 is measured at a depth position of 100 nm because the atomic concentration of M2 inside the lithium titanate particle can be appropriately measured (that is, the inner state of the particle not affected by influences on the surface thereof can be appropriately measured).

In the lithium titanate powder according to the first aspect of the present invention, preferably, M2 is not detected at a depth position of 100 nm from the surface of the lithium titanate particle measured by energy dispersive X-ray spectroscopy in cross-sectional analysis of the lithium titanate particles forming the lithium titanate powder using a scanning transmission electron microscope. In the present invention, the term "M2 is not detected" indicates that the quantity of M2 is equal to or less than the detectable quantity in measurement when the measurement is performed by energy dispersive X-ray spectroscopy. Although the lower limit of the quantity thereof detectable by energy dispersive X-ray spectroscopy varies according to the elements to be measured or the state thereof, the lower limit is usually 0.1 atm %.

<Second Embodiment (Embodiment in which Ln is Contained as Localized Element)>

A second embodiment will now be described in which Ln is contained as the localized element. Here, Ln is at least one metal element selected from the group consisting of La, Ce, Pr, Nd, Pm, Sm, Eu, Gd, Tb, Dy, Hb, Er, Tm, Yb, Lu, Y, and Sc. The term "Ln is contained" indicates that one metal element Ln is detected in inductively coupled plasma atomic emission analysis (ICP-AES) of the lithium titanate powder according to the present invention. The lower limit of the detectable quantity by inductively coupled plasma atomic emission analysis is usually 0.001 mass %. Ln is preferably at least one metal element selected from the group consisting of La, Pr, Nd, Gd, Er, and Y, more preferably La to further prevent the generation of gas during the operation of the energy storage device at high temperature.

As the content of Ln in the lithium titanate powder according to the second embodiment of the present invention, $C_{Ln}$ (mass %) is preferably 0.1 or more and 5 or less where $C_{Ln}$ is the content of Ln determined by inductively coupled plasma atomic emission analysis (ICP-AES). A content of Ln in the lithium titanate powder for an energy storage device within this range results in an energy storage device having higher charge/discharge capacity while the generation of gas during operation thereof at high temperature is further prevented. The content $C_{Ln}$ of Ln is preferably 0.3 or more, more preferably 0.6 or more to further prevent the generation of gas during the operation of the energy storage device at high temperature. The content $C_{Ln}$ of Ln is preferably 3.5 or less, more preferably 1.5 or less to increase the charge/discharge capacity of the energy storage device.

In the lithium titanate powder according to the second embodiment of the present invention, the relation represented by the following expression (6) is satisfied:

$$1 \leq (C_{S1} \times S) \leq 100 \tag{6}$$

where $C_{S1}$ (atm %) is the concentration of Ln determined based on the peak area in the spectrum of Ln3d, Ln3d5/2, Ln4d, Ln4d5/2, Ln2p, or Ln2p3/2 in surface analysis by X-ray photoelectron spectroscopy (XPS), and S (m²/g) is the specific surface area described in Section <Specific surface area> above. In the lithium titanate powder according to the present invention, $C_{S1} \times S$ (atm %·m²/g) is an index related with the amount of Ln present on the surface of the lithium titanate powder per mass. To further increase the charge/discharge capacity of the energy storage device and further prevent the generation of gas during the operation of the energy storage device at high temperature, the relation represented by the following expression (7) is more preferably satisfied, and the relation represented by the following expression (8) is particularly preferably satisfied:

$$2 \leq (C_{S1} \times S) \leq 50 \tag{7}$$

$$3 \leq (C_{S1} \times S) \leq 30 \tag{8}$$

The peak area in the spectrum of Ln3d, Ln3d5/2, Ln4d, Ln4d5/2, Ln2p, or Ln2p3/2 is used in the determination of the concentration $C_{S1}$ of Ln in the second embodiment of the present invention. The peak area to be used may be selected according to the types of elements forming Ln. For example, the value attributed to La3d5/2 is used for La, that attributed to Ce3d for Ce, that attributed to Pr3d5/2 for Pr, that attributed to Nd3d5/2 for Nd, that attributed to Pm4d for Pm, that attributed to Sm4d for Sm, that attributed to Eu4d for Eu, that attributed to Gd4d for Gd, that attributed to Tb4d for Tb, that attributed to Dy4d5/2 for Dy, that attributed to Hb4d5/2 for Hb, that attributed to Er4d for Er, that attributed to Tm4d for Tm, that attributed to Yb4d for Yb, that attributed to Lu4d5/2 for Lu, that attributed to Y3d for Y, and that attributed to Sc2p or Sc2p3/2 for Sc.

Alternatively, the lithium titanate powder according to the second embodiment of the present invention preferably satisfies the relations represented by the following expressions (9) and (10):

$$D1 > D2 \tag{9}$$

$$0.20 \leq D1/Dti \leq 2.0 \tag{10}$$

where D1 (atm %) is the atomic concentration of Ln at a depth position of 1 nm from the surface of each lithium titanate particle, Dti (atm %) is the atomic concentration of titanium at a depth position of 1 nm from the surface of the lithium titanate particle, and D2 (atm %) is the atomic concentration of Ln at a depth position of 100 nm from the surface of the lithium titanate particle, the atomic concentrations being measured by energy dispersive X-ray spectroscopy in cross-sectional analysis of the lithium titanate particles using a scanning transmission electron microscope.

In the present invention, as D1/Dti, it is sufficient that the relation represented by 0.20≤D1/Dti≤2.0 is satisfied. Preferred is 0.20≤D1/Dti≤1.5, more preferred is 0.20≤D1/Dti≤0.8, and still more preferred is 0.20≤D1/Dti≤0.6.

The atomic concentration D1 (atm %) of Ln and the atomic concentration Dti (atm %) of titanium at a depth position of 1 nm from the surface of the lithium titanate particle can be determined by the measurement by energy dispersive X-ray spectroscopy performed at an inner position of 1 nm from the surface of the lithium titanate particle, the inner position being located on a straight line which extends from the surface of the lithium titanate particle and is drawn orthogonal to a tangent of the surface of the lithium titanate particle. Similarly, the atomic concentration D2 (atm %) of Ln at a depth position of 100 nm from the surface of the lithium titanate particle can be determined by the measurement by energy dispersive X-ray spectroscopy performed at an inner position of 100 nm from the surface of the lithium titanate particle, the inner position being located on a straight line which extends from the surface of the lithium titanate particle and is drawn orthogonal to a tangent of the surface of the lithium titanate particle. In the present invention, D1 and Dti are measured at a depth position of 1 nm because the atomic concentration of Ln and the atomic concentration of titanium on the surface of the lithium titanate particle can be appropriately measured (that is, the state of the surface can be appropriately measured), and D2 is measured at a depth position of 100 nm because the atomic concentration of Ln inside the lithium titanate particle can be appropriately measured (that is, the inner state of the particle not affected by influences on the surface thereof can be appropriately measured).

In the lithium titanate powder according to the second embodiment of the present invention, preferably, Ln is not detected at a depth position of 100 nm from the surface of the lithium titanate particle measured by energy dispersive X-ray spectroscopy in cross-sectional analysis of the lithium titanate particles forming the lithium titanate powder using a scanning transmission electron microscope. In the present invention, the term "Ln is not detected" indicates that the quantity of Ln is equal to or less than the detectable quantity in measurement when the measurement is performed by energy dispersive X-ray spectroscopy. Although the lower limit of the quantity detectable by energy dispersive X-ray spectroscopy varies according to the elements to be measured or the state thereof, the lower limit is usually 0.5 atm %. In other words, it is preferred in the second embodiment of the present invention that the elemental concentration of Ln at an inner position of 100 nm from the surface of the lithium titanate particle be the lower limit of the detectable quantity, i.e., 0.5 atm % or less.

The lithium titanate powder according to the second embodiment of the present invention preferably contains M2 as a different element (where M2 is at least one metal element selected from the group consisting of elements of Groups 2, 12, and 13). This is because the effect of preventing the generation of gas during charge/discharge at high temperature is further enhanced if both of M2 and Ln are contained in the lithium titanate powder according to the second embodiment of the present invention. In particular, M2 is more preferably at least one element selected from the group consisting of B, Mg, Zn, Al, Ga, and In. Furthermore, M2 is more preferably Al. It is inferred that if both of M2 and Ln are contained in the lithium titanate powder according to the second embodiment of the present invention, the surface electron conductivity of the lithium titanate powder is adjusted; as a result, compared to the case where Ln alone is contained, an electrochemical side reaction caused by donation and reception of electrons which become active at high temperature can be further prevented without increasing the electric resistance.

As the content of M2, $C_{M2}$ (mass %) is preferably 0.01 or more and 1.0 or less where $C_{M2}$ is the content of M2 measured by inductively coupled plasma atomic emission analysis. $C_{M2}$ is preferably 0.05 or more, more preferably 0.2 or more, still more preferably 0.5 or more to further prevent the generation of gas during the operation of the energy storage device at high temperature. $C_M$ is more preferably 0.8 or less, still more preferably 0.4 or less to further increase the charge/discharge capacity of the energy storage device.

In the lithium titanate powder according to the second embodiment of the present invention, the ratio of $C_{M2}$ to $C_{Ln}$ ($C_{M2}/C_{Ln}$ (mass %/mass %)) is preferably 0.05 or more and 5.0 or less, more preferably 0.07 or more and 4.0 or less, still more preferably 0.1 or more and 3.0 or less.

In the lithium titanate powder according to the second embodiment of the present invention, a larger amount of M2 is contained in the surface region of each of the lithium titanate particles forming the lithium titanate powder than in the inner region thereof to improve the charge characteristics and further prevent the generation of gas. The relation represented by the following expression (11) is preferably satisfied:

$$F1/F2 \geq 5 \qquad (11)$$

where F1 (atm %) is the atomic concentration of M2 at an inner position of 1 nm from the surface of each lithium titanate particle measured by energy dispersive X-ray spectroscopy (EDS), the inner position being located on a straight line which extends from the surface of the lithium titanate particle and is drawn orthogonal to a tangent of the surface of each lithium titanate particle, and F2 (atm %) is the atomic concentration of M2 at an inner position of 100 nm from the surface of the lithium titanate particle, the inner position being located on the straight line, the atomic concentrations being measured by energy dispersive X-ray spectroscopy in cross-sectional analysis of the lithium titanate particles using a scanning transmission electron microscope.

To improve the charge characteristics and further prevent the generation of gas, the relation represented by the following expression (12) is satisfied:

$$0.01 \leq F1/Fti \leq 0.4 \qquad (12)$$

where Fti (atm %) is the atomic concentration of titanium at an inner position of 1 nm from the surface of the lithium titanate particle measured by energy dispersive X-ray spectroscopy (EDS).

In the lithium titanate powder according to a second aspect of the present invention, preferably, M2 is not detected at a depth position of 100 nm from the surface of the lithium titanate particle measured by energy dispersive X-ray spectroscopy in cross-sectional analysis of the lithium titanate particles forming the lithium titanate powder using a scanning transmission electron microscope. In the present invention, the term "M2 is not detected" indicates that the quantity of M2 is equal to or less than the detectable quantity in measurement when the measurement is performed by energy dispersive X-ray spectroscopy. Although the lower limit of the quantity thereof detectable by energy dispersive X-ray spectroscopy varies according to the elements to be measured or the state thereof, the lower limit is usually 0.1 atm %.

<Third Embodiment (Embodiment in which M1 is Contained as Localized Element)>

A third embodiment will now be described in which M1 is contained as a localized element. Here, M1 is at least one metal element selected from W and Mo. The term "M1 is contained" indicates that one metal element M1 is detected in inductively coupled plasma atomic emission analysis (ICP-AES) of the lithium titanate powder according to the present invention. The lower limit of the detectable quantity by inductively coupled plasma atomic emission analysis is usually 0.001 mass %.

As the content of M1 in the lithium titanate powder according to the third embodiment of the present invention, $C_{M1}$ (mol %) is preferably 0.01 or more and 0.9 or less, where $C_{M1}$ is the content of M1 determined by inductively coupled plasma atomic emission analysis (ICP-AES). When the lithium titanate powder is used in the energy storage device, a content of M1 within this range results in an energy storage device having higher charge/discharge capacity while the generation of gas during the operation thereof at high temperature is further prevented. The content $C_{M1}$ of M1 is preferably 0.02 or more, more preferably 0.04 or more, still more preferably 0.07 or more to further prevent the generation of gas during the operation of the energy storage device at high temperature. The content $C_{M1}$ of M1 is preferably 0.5 or less, more preferably 0.3 or less, still more preferably 0.1 or less to increase the charge/discharge capacity of the energy storage device.

In the lithium titanate powder according to the third embodiment of the present invention, the relation represented by the following expression (13) is satisfied:

$$1 \leq (C_{S2} \times S) \leq 100 \quad (13)$$

where $C_{S2}$ (atm %) is the concentration of M1 determined based on the peak area in the spectrum of W4d5/2 and/or Mo3d in surface analysis by X-ray photoelectron spectroscopy (XPS), and S (m²/g) is the specific surface area described in Section <Specific surface area> above. In the lithium titanate powder according to the present invention, $C_{S2} \times S$ (atm %·m²/g) is the index related with the amount of M1 present on the surface of the lithium titanate powder per mass. To further increase the charge/discharge capacity of the energy storage device and to further prevent the generation of gas during the operation of the energy storage device at high temperature, the relation represented by the following expression (14) is preferably satisfied, and the relation represented by the following expression (15) is particularly preferred satisfied:

$$2 \leq (C_{S2} \times S) \leq 50 \quad (14)$$

$$3 \leq (C_{S2} \times S) \leq 30 \quad (15)$$

Alternatively, in the lithium titanate powder according to the third embodiment of the present invention, the relations represented by the following expressions (16) and (17) are satisfied:

$$E1 > E2 \quad (16)$$

$$0.05 \leq E1/Eti \leq 6 \quad (17)$$

where E1 (atm %) is the atomic concentration of M1 at a depth position of 1 nm from the surface of each lithium titanate particle, Eti (atm %) is the atomic concentration of titanium at a depth position of 1 nm from the surface of the lithium titanate particle, and E2 (atm %) is the atomic concentration of M1 at a depth position of 100 nm from the surface of the lithium titanate particle, the atomic concentrations being measured by energy dispersive X-ray spectroscopy in cross-sectional analysis of the lithium titanate particles using a scanning transmission electron microscope.

In the present invention, as E1/Eti, it is sufficient that the relation represented by $0.05 \leq E1/Eti \leq 6$ is satisfied. Preferred is $0.05 \leq E1/Eti \leq 4$, more preferred is $0.05 \leq E1/Eti \leq 3$, still more preferred is $0.05 \leq E1/Eti \leq 0.5$, and most preferred is $0.05 \leq E1/Eti \leq 0.2$.

The atomic concentration E1 (atm %) of M1 and the atomic concentration Eti (atm %) of titanium at a depth position of 1 nm from the surface of the lithium titanate particle can be determined by the measurement by energy dispersive X-ray spectroscopy performed at an inner position of 1 nm from the surface of the lithium titanate particle on a straight line which extends from the surface of the lithium titanate particle and is drawn orthogonal to a tangent of the surface of the lithium titanate particle. Similarly, the atomic concentration E2 (atm %) of M1 at a depth position of 100 nm from the surface of the lithium titanate particle can be determined by the measurement by energy dispersive X-ray spectroscopy performed at an inner position of 100 nm from the surface of the lithium titanate particle on a straight line which extends from the surface of the lithium titanate particle and is drawn orthogonal to a tangent of the surface of the lithium titanate particle. In the present invention, E1 and Eti are measured at a depth position of 1 nm because the atomic concentration of M1 and the atomic concentration of titanium on the surface of the lithium titanate particle can be appropriately measured (that is, the state of the surface can be appropriately measured), and E2 is measured at a depth position of 100 nm because the atomic concentration of M1 inside the lithium titanate particle can be appropriately measured (that is, the inner state of the particle not affected by influences on the surface thereof can be appropriately measured).

In the lithium titanate powder according to the third embodiment of the present invention, preferably, M1 is not detected at a depth position of 100 nm from the surface of the lithium titanate particle measured by energy dispersive X-ray spectroscopy in cross-sectional analysis of the lithium titanate particles forming the lithium titanate powder using a scanning transmission electron microscope. In the present invention, the term "M1 is not detected" indicates that the quantity of M1 is equal to or less than the detectable quantity in measurement when the measurement is performed by energy dispersive X-ray spectroscopy. Although the lower limit of the quantity detectable by energy dispersive X-ray spectroscopy varies according to the elements to be measured or the state thereof, the lower limit is usually 0.5 atm %. In other words, it is preferred in the present invention that the elemental concentration of M1 at an inner position of 100 nm from the surface of the lithium titanate particle is 0.5 atm % or less as the detectable lower limit in the case where all the target elements are limited to only metal elements.

The lithium titanate powder according to the third embodiment of the present invention preferably contains M2 as a different element (where M2 is at least one element selected from the consisting of elements of Groups 2, 12, and 13). This is because the charge/discharge capacity during charge/discharge at high temperature is further increased if both of M2 and M1 are contained in the lithium titanate powder according to the present invention. In particular, M2 is more preferably at least one element selected from the group consisting of B, Mg, Zn, Al, Ga, and In. Furthermore, M2 is more preferably Al. It is inferred that if both of M2 and M1 are contained in the lithium titanate powder according to the present invention, the surface electron conductivity of the lithium titanate powder is adjusted; as a result, compared to the case where M1 alone is contained, the electric resistance can be reduced.

As the content of M2, $C_{M2}$ (mol %) is preferably 0.01 or more and 1.0 or less, where $C_{M2}$ is the content of M2 measured by inductively coupled plasma atomic emission analysis. $C_{M2}$ is preferably 0.03 or more and 0.8 or less, more preferably 0.1 or more and 0.6 or less to increase the charge/discharge capacity of the energy storage device.

In the lithium titanate powder according to the third embodiment of the present invention, the ratio of $C_{M2}$ to $C_{M1}$ ($C_{M2}/C_{M1}$ (mol %/mol %)) is preferably 0.3 or more and 30 or less, more preferably 0.5 or more and 20 or less, still more preferably 1.0 or more and 15 or less.

In the lithium titanate powder according to the third embodiment of the present invention, a larger amount of M2 is contained in the surface region of each of the lithium titanate particles forming the lithium titanate powder than in the inner region thereof to improve the charge characteristics and further prevent the generation of gas. The relation represented by the following expression (18) is preferably satisfied:

$$F1/F2 \geq 5 \quad (18)$$

where F1 (atm %) is the atomic concentration of M2 at an inner position of 1 nm from the surface of each lithium titanate particle energy dispersive X-ray spectroscopy (EDS), the inner position being located on a straight line which extends from the surface of the lithium titanate particle and is drawn orthogonal to a tangent of the surface of the lithium titanate particle, and F2 (atm %) is the atomic concentration of M2 at an inner position of 100 nm from the surface of the lithium titanate particle, the inner position being located on the straight line, the atomic concentrations being measured by energy dispersive X-ray spectroscopy in cross-sectional analysis of the lithium titanate particles using a scanning transmission electron microscope.

To improve the charge characteristics and further prevent the generation of gas, the relation represented by the following expression (19) is preferably satisfied:

$$0.01 \leq F1/Fti \leq 0.4 \quad (19)$$

where Fti (atm %) is the atomic concentration of titanium at an inner position of 1 nm from the surface of each lithium titanate particle measured by energy dispersive X-ray spectroscopy (EDS).

In the lithium titanate powder according to the third aspect of the present invention, preferably, M2 is not detected at a depth position of 100 nm from the surface of each lithium titanate particle measured by energy dispersive X-ray spectroscopy in cross-sectional analysis of the lithium titanate particles forming the lithium titanate powder using a scanning transmission electron microscope. In the present invention, the term "M2 is not detected" indicates that the quantity of M2 is equal to or less than the detectable quantity in measurement when the measurement is performed by energy dispersive X-ray spectroscopy. Although the lower limit of the quantity thereof detectable by energy dispersive X-ray spectroscopy varies according to the elements to be measured or the state thereof, the lower limit is usually 0.1 atm %.

<Water Content>

In the lithium titanate powder according to the present invention, the water content measured by a Karl-Fischer method (25° C. to 350° C.) (hereinafter, referred to as water content at 25° C. to 350° C. in some cases) is preferably 5000 ppm or less. Here, the water content (25° C. to 350° C.) in the lithium titanate powder according to the present invention measured by the Karl-Fischer method refers to the total water content of: a water content obtained through measurement by the Karl-Fischer method of the content of water released from the lithium titanate powder according to the present invention during the period from the start of heating to the end of keeping the temperature at 200° C. when the lithium titanate powder according to the present invention is heated under a nitrogen stream from 25° C. to 200° C. and is held at 200° C. for one hour; and a water content obtained through measurement by the Karl-Fischer method of water released from the lithium titanate powder according to the present invention during the period from the start of heating at 200° C. to the end of keeping the temperature at 350° C. when the lithium titanate powder according to the present invention is subsequently heated under a nitrogen stream from 200° C. to 350° C. and is held at 350° C. for one hour. A water content of 5000 ppm or less is preferred because such a lithium titanate powder used as an active substance for an electrode demonstrates favorable handling properties during application of the electrode. The method of measuring the water content will be described in Section <Measurement of water content by Karl-Fischer method> below. The water content measured by the Karl-Fischer method (25° C. to 350° C.) includes both of the content of water physically adsorbed on the lithium titanate powder according to the present invention and the content of water chemically adsorbed thereon. It is usually difficult to measure the water content of the lithium titanate powder in the range beyond 350° C. by the Karl-Fischer method, and water is barely detected by other methods (such as pyrolysis gas chromatograph mass spectrometry). To further prevent the generation of gas during the operation of the energy storage device at high temperature, the water content measured by the Karl-Fischer method (25° C. to 350° C.) is more preferably 1000 ppm or less, particularly preferably 600 ppm or less.

In addition, to further prevent the generation of gas during the operation of the energy storage device at high temperature, the water content measured by the Karl-Fischer method (200° C. to 350° C.) (hereinafter, referred to as water content at 200° C. to 350° C.) is preferably 1000 ppm or less. Here, the water content measured by the Karl-Fischer method (200° C. to 350° C.) in the lithium titanate powder according to the present invention refers to the water content obtained through measurement by the Karl-Fischer method of the content of water released from the lithium titanate powder according to the present invention during the period from the start of heating at 200° C. to the end of keeping the temperature at 350° C. in the water content (25° C. to 350° C.). The water contained in lithium titanate includes physically adsorbed water and chemically adsorbed water. It is inferred that in both cases, most of water present on the surface of lithium titanate desorbs from its surface until the temperature reaches 200° C., and thus is included in the water content measured by the Karl-Fischer method (25° C. to 200° C.). Here, the water content measured by the Karl-Fischer method (25° C. to 200° C.) in the lithium titanate powder according to the present invention refers to the water content obtained through measurement by the Karl-Fischer method of the content of water released from the lithium titanate powder according to the present invention during the period from the start of heating to the end of keeping the temperature at 200° C. when the lithium titanate powder according to the present invention is heated under a nitrogen stream from 25° C. to 200° C. and is held at 200° C. for one hour. Usually, the preparation of energy storage devices comprises a step of drying electrodes. For this reason, the water content measured by the Karl-Fischer method (25° C. to 200° C.) is mostly released in such a drying step. For this reason, it is considered that water which affects the energy storage device is mainly water present inside the lithium titanate particles, which is difficult to remove by the drying, rather than water on the surfaces of the particles. Accordingly, it is considered that most of water which is present inside the particles and substantially affects the energy storage device is included in the water content measured by the Karl-Fischer method (200° C. to 350° C.). From this viewpoint, the water content measured by the Karl-Fischer method (200° C. to 350° C.) is more preferably 300 ppm or less, particularly preferably 150 ppm or less. The lower limit of the water content measured by the Karl-Fischer method (200° C. to 350° C.) can be any value. Depending on the case, the lower limit may be equal to or less than the detection limit of the measurement apparatus (the case where it can be determined that the detected value is substantially 0 ppm).

In the case where lithium titanate containing a rare earth element is prepared by the production methods according to the specifications of Patent Documents 4 and 5, rare earth element-containing particles having a crystal structure (such as a perovskite structure) different from that of $Li_4Ti_5O_{12}$ (spinel structure) are generated separately from the lithium titanate particles, and the rare earth element never covers the surface of lithium titanate. In contrast, as in the second embodiment of the present invention, if Ln is localized on or near surfaces of the lithium titanate particles, preferably in the state where Ln is contained in a specific range of the concentration ratio of Ln to Ti, and the ratio of the concentration of Ln to that of Ti is lower inside the particles than that on the surfaces thereof, more preferably Ln is not present inside the particles (for example, at an inner position of 100 nm from the surfaces of the lithium titanate particles), in short, if only the surfaces of the lithium titanate particles are coated with a layer containing a small amount of Ln in a specific manner, an energy storage device is obtained in which the generation of gas during the operation of the energy storage device at high temperature is prevented without impairing the charge/discharge capacity thereof.

Although the reason why the generation of gas is prevented is unclear, adsorption of water is inhibited by an Ln diffusion layer formed on and near the surfaces of the lithium titanate particles in which Ln atoms are localized, thus preventing the generation of hydrogen. Furthermore, it is considered that the Ln diffusion layer prevents the contact between the electrolyte solution and $Li_4Ti_5O_{12}$, therefore preventing the generation of organic gas caused by electrochemical decomposition of a nonaqueous solvent in the electrolyte solution.

In the production methods according to the specifications of Patent Documents 5 and 6, the entire lithium titanate particle is doped with a specific element in a uniform concentration. In contrast, as in the third embodiment of the present invention, if M1 is localized on or near the surfaces of the lithium titanate particles, preferably the concentration of M1 on the surfaces thereof is high, more preferably M1 is not present inside the particles (for example, at an inner position of 100 nm from the surfaces of the lithium titanate particles), an energy storage device is obtained in which the generation of gas during the operation of the energy storage device at high temperature is prevented without impairing the charge/discharge capacity thereof.

Although the reason why the generation of gas is prevented is unclear, it is considered that if M1 is present near the interface between the surfaces of the lithium titanate particles and the electrolyte solution, M1 can efficiently convert organic gas generated on or near the surfaces of the particles into another substance, thereby reducing the total amount of gas. In addition, it is considered that the active site of $Li_4Ti_5O_{12}$ causing the decomposition of the electrolyte solution is protected by the formation of the M1 diffusion layer on and near the surfaces of the lithium titanate particles in the form of a solid solution, therefore further preventing the generation of organic gas caused by decomposition of the electrolyte solution.

[Method of Producing Lithium Titanate Powder According to the Present Invention]

One example of a method of producing the lithium titanate powder according to the present invention will now be described separately as a step of preparing raw materials, a calcination step, and a surface treatment step, but the method of producing the lithium titanate powder according to the present invention is not limited to this.

<Step of Preparing Raw Materials>

The raw materials for the lithium titanate powder according to the present invention are composed of a titanium raw material and a lithium raw material. As the titanium raw material, titanium compounds such as anatase titanium dioxide and rutile titanium dioxide are used. It is preferred that the titanium raw material readily react with the lithium raw material in a short time. From this viewpoint, anatase titanium dioxide is preferred. To sufficiently react the raw materials by calcination in a short time, the titanium raw material preferably has a volume median particle diameter (average particle size, D50) of 2 μm or less.

As the lithium raw material, lithium compounds such as lithium hydroxide monohydrate, lithium oxide, lithium hydrogen carbonate, and lithium carbonate are used.

In the case where a mixture composed of the raw materials above is calcined in a short time in the present invention, before the calcination, the mixed powders forming the mixture is preferably prepared such that D95 in a particle size distribution curve measured with a laser diffraction/scattering particle size distribution analyzer is 5 μm or less. Here, D95 refers to a particle diameter at which the cumulative volume frequency calculated based on the volume fraction is 95% in cumulation in ascending order of particle diameter.

As the method of preparing the mixture, the methods listed below can be used. A first method is a method of preparing raw materials, and then milling and mixing the raw materials at the same time. A second method is a method of milling raw materials until the D95 after mixing is 5 μm or less, and then mixing these raw materials or mixing these materials while lightly milling those. A third method is a method of producing powders each composed of nanoparticles by a method such as crystallization of raw materials, classifying the powders as needed, and then mixing these powders or mixing these powders while lightly milling those. Among these methods, the first method in which mixing of the raw materials and milling thereof are performed at the same time is industrially advantageous because this method has a smaller number of steps. A conductive agent may be added at the same time.

In all of the first to third methods, the raw materials can be mixed by any method, and either wet mixing or dry mixing may be used. For example, Henschel mixers, ultrasonic dispersion apparatuses, homomixers, mortars, ball mills, centrifugal ball mills, planetary ball mills, vibration ball mills, Attritor high-speed ball mills, bead mills, and roll mills can be used.

In the case where the resulting mixture is a mixed powder, it can be fed to the subsequent calcination step. In the case where the resulting mixture is a mixed slurry of mixed powder, the mixed slurry after dried with a rotary evaporator or the like can be fed to the subsequent calcination step. In the case where the calcination is performed with a rotary kiln furnace, the mixed slurry can be fed as it is into the furnace.

<Calcination Step>

The resulting mixture is then calcined. Calcination is preferably performed at high temperature in a short time to yield a powder having a larger specific surface area and a larger crystallite size through the calcination. From such a viewpoint, the highest temperature during calcination is preferably 1000° C. or less, more preferably 950° C. or less, still more preferably 900° C. or less. To reduce the proportion of specific impurity phases and increase the crystallinity of lithium titanate, the highest temperature during calcination is preferably 800° C. or more, more preferably 810° C. or more. Similarly, from this viewpoint, the retention time at the highest temperature during calcination is preferably 2 to 60 minutes, more preferably 5 to 45 minutes, still more preferably 5 to 30 minutes. If the highest temperature during calcination is high, a shorter retention time is preferably selected. Similarly, to increase the crystallite size obtained by calcination, it is preferred that the residence time at 700 to 800° C. be particularly short; for example, the residence time is preferably within 15 minutes.

Any calcination method that can be performed under such conditions can be used. Examples of usable calcination methods include fixed bed calcination furnaces, roller hearth calcination furnaces, mesh belt calcination furnaces, fluidized bed calcination furnaces, and rotary kiln calcination furnaces. In the case where calcination is efficiently performed in a short time, roller hearth calcination furnaces, mesh belt calcination furnaces, and rotary kiln calcination furnaces are preferred. If a roller hearth calcination furnace or a mesh belt calcination furnace which performs calcination with the mixture accommodated in a sagger is used, a small amount of mixture is preferably accommodated in the sagger to ensure the uniformity of the temperature distribution of the mixture during calcination and yield lithium titanate with a constant level of quality.

The rotary kiln calcination furnace is a particularly preferred calcination furnace to produce the lithium titanate powder according to the present invention because any container which accommodates the mixture is unnecessary, calcination can be performed while the mixture is continuously being fed, and the calcined product has a homogeneous thermal history to generate homogeneous lithium titanate.

Irrespective of the calcination furnace, calcination can be performed in any atmosphere in which desorbed water and carbon dioxide gas can be removed. Although the atmosphere is usually an air atmosphere using compressed air, an oxygen, nitrogen, or hydrogen atmosphere may also be used, for example.

The lithium titanate powder after calcination has agglomerated to a small extent, but does not need to be milled to break particles. For this reason, after calcination, disintegration to loosen the agglomerates or classification may be performed as needed. If only disintegration to loosen the agglomerates is performed without milling, the lithium titanate powder after calcination maintains high crystallinity also after the disintegration.

<Surface Treatment Step>

The lithium titanate powder before a surface treatment prepared through the steps above (hereinafter, referred to as lithium titanate base powder in some cases. Hereinafter, the lithium titanate particles forming the lithium titanate base powder are referred to as lithium titanate base particles) is mixed with a compound containing boron (B) (hereinafter, referred to as Treatment agent 1 in some cases), a compound containing Ln (hereinafter, referred to as Treatment agent 2 in some cases), or a compound containing M1 (hereinafter, referred to as Treatment agent 3 in some cases), and the mixture is subjected to a heat treatment. In other words, the compound containing boron (B) (Treatment agent 1) is used in the lithium titanate powder according to the first embodiment of the present invention described above (embodiment in which boron (B) is contained as the localized element), the compound containing Ln (Treatment agent 2) in the lithium titanate powder according to the second embodiment of the present invention described above (embodiment in which Ln is contained as the localized element), and the compound containing M1 (Treatment agent 3) in the lithium titanate powder according to the third embodiment of the present invention described above (embodiment in which M1 is contained as the localized element). The heat treatment is performed on the mixture of the lithium titanate base particles with each of the compounds.

Any compound containing boron (B) (Treatment agent 1) can be used. Examples thereof include boric acid ($H_3BO_3$), boron oxide ($B_2O_3$), lithium tetraborate ($Li_2B_4O_7$), boron phosphate ($PBO_4$), lithium borate, and the like. Among these compounds, boric acid ($H_3BO_3$), boron oxide ($B_2O_3$), and lithium tetraborate ($Li_2B_4O_7$) are preferred.

The compound containing boron (B) (Treatment agent 1) can be added in any amount as long as the amount of boron (B) in the lithium titanate powder falls within the range specified in the first embodiment of the present invention. For example, in the case where boric acid ($H_3BO_3$) is used, the compound is added in a proportion of preferably 0.4 mass % or more, more preferably 0.6 mass % or more, particularly preferably 0.7 mass % or more of the lithium titanate base powder. The compound is added in a proportion of preferably 10 mass % or less, more preferably 8 mass % or less, particularly preferably 4 mass % or less of the lithium titanate base powder.

Any compound containing Ln (Treatment agent 2) can be used. Examples thereof include oxides of Ln, hydroxides of Ln, sulfuric acid compounds of Ln, nitric compounds of Ln, fluorides of Ln, organic compounds of Ln, and metal salt compounds containing Ln. A wet process described later is suitably used to uniformly diffuse Ln over the surfaces of particles of the lithium titanate powder. In this case, preferably, the compound containing Ln and having solubility to a solvent is dissolved in the solvent, and is mixed with the lithium titanate base powder. To prevent the generation of gas, acetic compounds containing Ln and hydrates thereof are preferred.

If Ln is lanthanum (La), examples of compounds containing La include lanthanum oxide, lanthanum hydroxide, lanthanum fluoride, lanthanum sulfate, lanthanum nitrate, lanthanum carbonate, lanthanum acetate, lanthanum oxalate, lanthanum chloride, lanthanum boride, lanthanum phosphate, and the like. Among these compounds, lanthanum acetate and hydrates thereof are preferred.

The compound containing Ln (Treatment agent 2) may be added in any amount as long as the amount of Ln in the lithium titanate powder falls within the range specified in the second embodiment of the present invention. For example, if lanthanum acetate n-hydrate (where n=0.5 to 4.0) is used, the compound is added in a proportion of preferably 0.25 mass % or more, more preferably 0.8 mass % or more, particularly preferably 1.5 mass % or more of the lithium titanate base powder to further prevent the generation of gas during the operation of the energy storage device at high temperature. To increase the charge/discharge capacity of the energy storage device, the compound is added in a proportion of preferably 13 mass % or less, more preferably 10 mass % or less, particularly preferably 5 mass % or less of the lithium titanate base powder.

Any compound containing M1 (Treatment agent 3) can be used. Examples thereof include oxides of M1, hydroxides of M1, sulfuric acid compounds of M1, nitric compounds of M1, fluorides of M1, organic compounds of M1, and metal salt compounds containing M1. If M1 is molybdenum (Mo), molybdenum oxide, molybdenum trioxide, molybdenum trioxide hydrate, molybdenum boride, phosphomolybdic acid, molybdenum disilicide, molybdenum chloride, molybdenum sulfide, silicomolybdic acid hydrate, sodium molybdenum oxide, molybdenum carbide, molybdenum acetate dimer, lithium molybdate, sodium molybdate, potassium molybdate, calcium molybdate, magnesium molybdate, manganese molybdate, ammonium molybdate, and the like. If M1 is tungsten (W), examples thereof include tungsten oxide, tungsten trioxide, tungsten trioxide hydrate, tungsten boride, phosphotungstic acid, tungsten disilicide, tungsten chloride, tungsten sulfate, silicotungstic acid hydrate, sodium tungsten oxide, tungsten carbide, tungsten acetate dimer, lithium tungstate, sodium tungstate, potassium tungstate, calcium tungstate, magnesium tungstate, manganese tungstate, ammonium tungstate, tungstic acid, and the like. A wet process described later is suitable to uniformly diffuse M1 over the surfaces of the particles of the lithium titanate powder. In this case, preferably, a compound containing M1 and having solubility to a solvent is dissolved in the solvent, and is mixed with the lithium titanate base powder. A lithium oxide containing M1 is preferred to prevent the generation of gas.

The compound containing M1 (Treatment agent 3) can be added in any amount as long as the amount of M1 in the lithium titanate powder falls within the range specified in the third embodiment of the present invention. For example, if lithium molybdate ($Li_2MoO_4$) is used as Treatment agent 3, Treatment agent 3 is added in a proportion of preferably 0.2 mass % or more, more preferably 0.4 mass % or more, still more preferably 1.0 mass % or more, particularly preferably 2.5 mass % or more of the lithium titanate base powder to further prevent the generation of gas during the operation of the energy storage device at high temperature. To increase the charge/discharge capacity of the energy storage device, Treatment agent 3 is added in a proportion of preferably 5.0 mass % or less, more preferably 2.5 mass % or less, still more preferably 1.0 mass % or less, particularly preferably 0.2 mass % or less of the lithium titanate base powder. For example, if Treatment agent 3 used is lithium tungstate ($Li_2WO_4$), Treatment agent 3 is added in a proportion of preferably 0.3 mass % or more, more preferably 0.6 mass % or more, still more preferably 1.4 mass % or more of the lithium titanate base powder to further prevent the generation of gas during the operation of the energy storage device at high temperature. To increase the charge/discharge capacity of the energy storage device, Treatment agent 3 is added in a proportion of preferably 7.0 mass % or less, more preferably 3.5 mass % or less of the lithium titanate base powder.

The lithium titanate powder according to the present invention can further contain M2. If M2 is contained, the compound containing boron (B) (Treatment agent 1), the compound containing Ln (Treatment agent 2), or the compound containing M1 (Treatment agent 3), and further a compound containing M2 (hereinafter, referred to as Treatment agent 4 in some cases) are mixed with the lithium titanate base powder, and the mixture is subjected to the heat treatment. Alternatively, the lithium titanate base powder may be mixed with Treatment agent 1, 2, or 3, and may be subjected to the heat treatment. Thereafter, the resulting product may be mixed with Treatment agent 4, followed by the heat treatment. Alternatively, the lithium titanate base powder may be mixed with Treatment agent 4, and may be subjected to the heat treatment. Thereafter, the resulting product may be mixed with Treatment agent 1, 2, or 3, followed by the heat treatment.

The compound containing M2 (Treatment agent 4) may be any compound which is diffused by the heat treatment. Examples thereof include oxides of M2, hydroxides of M2, sulfuric acid compounds of M2, nitric compounds of M2, fluorides of M2, organic compounds of M2, and metal salt compounds containing M2. A wet process described later is suitable to uniformly diffuse M2 over the surfaces of the particles of the lithium titanate powder. In this case, preferably, a compound containing M2 and having solubility to a solvent is dissolved in the solvent, and is mixed with the lithium titanate base powder. Sulfuric acid compounds containing M2 and fluorides containing M2 are preferred to prevent the generation of gas.

If M2 is aluminum (Al), examples of compounds containing Al include aluminum acetate, aluminum fluoride, aluminum sulfate, and the like. Among these compounds, aluminum sulfate and hydrates thereof and aluminum fluoride are preferred.

The compound containing M2 (Treatment agent 4) may be added in any amount as long as the amount of M2 in the lithium titanate powder falls within the range specified in the present invention. For example, if aluminum sulfate hexadecahydrate ($Al_2(SO_4)_3 \cdot 16H_2O$) is used, the compound is preferably added in a proportion of 0.3 mass % or more of the lithium titanate base powder. The compound is added in a proportion of preferably 12 mass % or less, more preferably 10 mass % or less, particularly preferably 8 mass % or less of the lithium titanate base powder. Furthermore, a suitable proportion of the amount of the compound containing M2 (Treatment agent 4) to be added is determined with respect to the relation with the compound containing boron (B) (Treatment agent 1), the compound containing Ln (Treatment agent 2), and the compound containing M1 (Treatment agent 3).

Mixing of the lithium titanate base powder with the compound containing boron (B) (Treatment agent 1), the compound containing Ln (Treatment agent 2), or the compound containing M1 (Treatment agent 3), and further the compound containing M2 (Treatment agent 4) can be performed by any mixing method. Either wet mixing or dry mixing can be used. Preferably, the compound containing boron (B) (Treatment agent 1), the compound containing Ln (Treatment agent 2), or the compound containing M1 (Treatment agent 3), and optionally the compound containing M2 (Treatment agent 4) are homogeneously dispersed on the surfaces of the lithium titanate base particles. In this viewpoint, the wet mixing is preferred.

In the dry mixing, paint mixers, Henschel mixers, ultrasonic dispersion apparatuses, homomixers, mortars, ball mills, centrifugal ball mills, planetary ball mills, vibration ball mills, Attritor high-speed ball mills, bead mills, roll mills, and the like can be used, for example.

In the wet mixing, Treatment agent 1, 2, or 3, and optionally Treatment agent 4, and the lithium titanate base powder are placed into water or an alcohol solvent, and are mixed into a slurry. The alcohol solvent is preferably those having a boiling point of 100° C. or less, such as methanol, ethanol, and isopropyl alcohol, because these solvents are easy to remove. An aqueous solvent is industrially preferred because it is easy to recover and discard.

Although the amount of solvent is non-problematic if Treatment agent 1, 2, or 3, and optionally Treatment agent 4, and the lithium titanate base particles are sufficiently wet, Treatment agent 1, 2, or 3, and optionally Treatment agent 4, and the lithium titanate base particles are preferably homogeneously dispersed in the solvent. For this purpose, the solvent is preferably used in an amount such that the amount of Treatment agent 1, 2, or 3, and optionally Treatment agent 4 dissolved in the solvent is 50% or more of the total amount of Treatment agent 1, 2, or 3, and optionally Treatment agent 4 added to the solvent. The amount of Treatment agent 1, 2, or 3, and optionally Treatment agent 4 dissolved in the solvent increases at higher temperature. Accordingly, the mixing of the lithium titanate base powder with Treatment agent 1, 2, or 3, and optionally Treatment agent 4 in the solvent is preferably performed under heating. In addition, the amount of solvent can be reduced by the heating. For this reason, the mixing method under heating is industrially suitable. The temperature during the mixing is preferably 40 to 100° C., more preferably 60 to 100° C.

In the case of wet mixing, although depending on the heat treatment method, the solvent is preferably removed before the heat treatment, which is performed after the mixing step. The solvent is preferably removed by evaporating the solvent into dryness. Examples of the method of evaporating the solvent into dryness include a method of evaporating the solvent by heating a slurry while stirring the slurry with a stirring blade, a method using a drying apparatus, such as a conical dryer, which enables drying an object while stirring the object, and a method using a spray dryer. If the heat treatment is performed using a rotary kiln furnace, mixed raw materials in the form of slurry can be fed into the furnace.

Any heating method can be used in the heat treatment. Examples of usable heat treatment furnaces include fixed bed calcination furnaces, roller hearth calcination furnaces, mesh belt calcination furnaces, fluidized bed calcination furnaces, rotary kiln calcination furnaces, and the like. The atmosphere during the heat treatment may be either an air atmosphere or an inert atmosphere such as a nitrogen atmosphere. If the metal salt compound containing M2 is used as the compound containing M2 (Treatment agent 4), preferred is an air atmosphere in which anion species are readily removed from the surfaces of the particles. The temperature for the heat treatment is preferably a temperature at which boron (B), Ln, or M1, and optionally M2 diffuses to at least surface regions of the lithium titanate base particles without causing a significant reduction in the specific surface area of the base powder, which is caused as a result of sintering of lithium titanate. The upper limit of the temperature for the heat treatment is 600° C., preferably 550° C., more preferably 500° C. The lower limit of the temperature for the heat treatment is 250° C. The time for the heat treatment is 0.5 to 8 hours, more preferably 2 to 5 hours. The temperature and the time for M2 to diffuse to at least the surface regions of the lithium titanate base particles are preferably set appropriately because the reactivity varies according to the compound containing M2.

The lithium titanate powder according to the present invention may be formed into a powder containing secondary particles, which are agglomerates of primary particles, by mixing the lithium titanate powder with the treatment agent in the surface treatment step, and then performing granulation and a heat treatment on the mixture. Any granulation method which enables formation of secondary particles can be used. Preferred is a spray dryer because a large amount of powder can be treated.

The dew point may be managed in the heat treatment step to reduce the water content in the lithium titanate powder according to the present invention. The water content in the powder after the heat treatment increases if the powder is exposed to air as it is. For this reason, handling of the powder under an environment where the dew point is managed is preferred during cooling in the heat treatment furnace and after the heat treatment. The powder after the heat treatment may be classified as needed to control the diameters of the particles within the range of a desired maximum particle diameter. If the dew point is managed in the heat treatment step, the lithium titanate powder according to the present invention is preferably sealed in an aluminum-laminated bag or the like, and is taken out to an environment where the dew point is not managed. Even under the dew point management, if the lithium titanate powder after the heat treatment is milled, intake of water from milled faces is facilitated to increase the water content in the powder. For this reason, it is preferred that milling be not performed when the heat treatment has been performed.

[Active Material]

The active material according to the present invention comprises the lithium titanate powder according to the present invention. The active material may contain one or more substances other than lithium titanate powder according to the present invention. As such other substances, carbon materials [such as pyrolytic carbons, cokes, graphites (such as artificial graphite and natural graphite), burned organic high-molecular compounds, and carbon fibers], tin and tin compounds, and silicon and silicon compounds are used, for example.

[Electrode Sheet]

The electrode sheet according to the present invention is a sheet having a mixture layer on one or both surfaces of a current collector, the mixture layer comprising an active material, a conductive agent, and a binder. The electrode sheet is cut tailored to a designed shape of the energy storage device, and is used as a positive electrode or a negative electrode.

The electrode sheet according to the present invention is an electrode sheet comprising the lithium titanate powder according to the present invention as an active material. The electrode sheet according to the present invention is preferably produced as follows: A mixture of a titanium raw material and a lithium raw material is calcined, and the calcinated product is granulated. The granulated product is heat treated at a temperature in the range of 300 to 600° C. under an environment where the dew point is managed at −20° C. or less, and is cooled. Without substantially exposed to air, the resulting lithium titanate powder according to the present invention is mixed with a conductive agent and a binder under an environment where the dew point is managed at −20° C. or less. Here, the term "without substantially exposed to air" indicates that the lithium titanate powder according to the present invention is not exposed to air at all, and additionally that the lithium titanate powder according to the present invention is exposed to air such that the water content in the lithium titanate powder measured by the Karl-Fischer method (25° C. to 350° C.) does not increase.

[Energy Storage Device]

The energy storage device according to the present invention is a device which includes an electrode comprising the active material according to the present invention, and stores/releases energy using intercalation and deintercalation of lithium ions to and from the electrode. Examples thereof include hybrid capacitors, lithium batteries, and the like.

[Hybrid Capacitor]

The hybrid capacitor is a device including a positive electrode comprising an active substance, such as activated carbon, which causes formation of a capacitance through physical adsorption as in an electrode material for an electric double-layer capacitor, an active substance, such as graphite, which causes formation of a capacitance through physical adsorption and intercalation/deintercalation, or an active substance, such as a conductive polymer, which causes formation of a capacitance through a redox reaction; and a negative electrode comprising the active material according to the present invention. The active material according to the present invention is usually used in the form of an electrode sheet for the hybrid capacitor.

[Lithium Battery]

The lithium battery according to the present invention collectively refers to lithium primary batteries and lithium secondary batteries. In this specification, the term "lithium secondary battery" is used as a concept also including so-called lithium ion secondary batteries.

The lithium battery includes a positive electrode, a negative electrode, and a nonaqueous electrolytic solution of an electrolyte salt dissolved in a nonaqueous solvent. The active material according to the present invention can be used as an electrode material. The active material according to the present invention is usually used in the form of an electrode sheet for the lithium battery. Although this active material may be used both as positive electrode active substance and as a negative electrode active substance, a case where the active material is used as a negative electrode active substance will now be described.

<Negative Electrode>

The negative electrode includes a mixture layer on one or both surfaces of a negative electrode current collector, the mixture layer comprising a negative electrode active substance (active material according to the present invention), a conductive agent, and a binder. The mixture layer is usually formed into the form of an electrode sheet. In the case of a negative electrode current collector composed of a porous body or the like having pores, the negative electrode current collector includes a mixture layer in the pores, the mixture layer comprising the negative electrode active substance (active material according to the present invention), a conductive agent, and a binder.

The conductive agent for the negative electrode can be any electron conductive material which does not chemically change. Examples thereof include graphites such as natural graphite (such as flake graphite) and artificial graphite; carbon blacks such as acetylene black, Ketjen black, channel black, furnace black, lamp black, and thermal black; and carbon nanotubes such as single-walled carbon nanotubes, multi-walled carbon nanotubes (multi-layer of cylindrical graphite layers concentrically disposed) (non-fishbone-like), and cup stacked-type carbon nanotubes (fishbone-like)), node-type carbon nanofibers (non-fishbone-like structure), platelet-type carbon nanofibers (stacked card-like), and the like. Graphites, carbon blacks, and carbon nanotubes may be appropriately mixed. Although not particularly limited, carbon blacks have a specific surface area of preferably 30 to 3000 $m^2/g$, more preferably 50 to 2000 $m^2/g$. Graphites have a specific surface area of preferably 30 to 600 $m^2/g$, more preferably 50 to 500 $m^2/g$. Carbon nanotubes have an aspect ratio of 2 to 150, preferably 2 to 100, more preferably 2 to 50.

Although the amount of conductive agent to be added varies according to the specific surface area of the active substance or the types of conductive agent and should be optimized, the amount in the mixture layer is preferably 0.1 to 10 mass %, more preferably 0.5 to 5 mass %. An amount of less than 0.1 mass % cannot ensure the conductivity of the mixture layer. An amount of more than 10 mass % is not suitable for an increase in capacity because the proportion of the active substance is relatively reduced, resulting in an energy storage device having insufficient discharge capacity per unit mass and unit volume of the mixture layer.

Examples of the binder for the negative electrode include poly(tetrafluoroethylene) (PTFE), poly(vinylidene fluoride) (PVDF), poly(vinylpyrrolidone) (PVP), copolymers of styrene and butadiene (SBR), copolymers of acrylonitrile and butadiene (NBR), carboxymethyl cellulose (CMC), and the like. Although not particularly limited, poly(vinylidene fluoride) preferably has a molecular weight of 20000 to 200000. To ensure the binding properties of the mixture layer, the molecular weight is preferably 25000 or more, more preferably 30000 or more, still more preferably 50000 or more. To ensure the conductivity without obstructing the contact between the active substance and the conductive agent, the molecular weight is preferably 150000 or less. In particular, when the active substance has a specific surface area of 10 $m^2/g$ or more, the molecular weight is preferably 100000 or more.

Although the amount of the binder to be added varies according to the specific surface area of the active substance, the type of the conductive agent, and the combinations thereof and should be optimized, the amount of the binder in the mixture layer is preferably 0.2 to 15 mass %. To increase the binding properties and ensure the strength of the mixture layer, the amount is preferably 0.5 mass % or more, more preferably 1 mass % or more, still more preferably 2 mass % or more. To prevent a reduction in proportion of the active substance and a reduction in discharge capacity of the energy storage device per unit mass and unit volume of the mixture layer, the amount is preferably 10 mass % or less, more preferably 5 mass % or less.

Examples of the negative electrode current collector include aluminum, stainless steel, nickel, copper, titanium, calcined carbon, and these materials having surfaces coated with carbon, nickel, titanium, or silver, and the like. The surfaces of these materials may be oxidized, or may be subjected to a surface treatment to form depressions and projections on the surface of the negative electrode current collector. Examples of forms of the negative electrode current collector include formed bodies of sheets, nets, foils, films, punched materials, lath bodies, porous bodies, foamed bodies, fiber groups, and nonwoven fabrics. The negative electrode current collector is preferably formed of porous aluminum. The porous aluminum has a porosity of 80% or more and 95% or less, preferably 85% or more.

In a method of preparing the negative electrode, the negative electrode can be prepared by homogeneously mixing the negative electrode active substance (active material according to the present invention), the conductive agent, and the binder in the solvent to prepare a coating material, and applying the coating material onto the negative electrode current collector, followed by drying and compression of the resultant product. In the case of the negative electrode current collector composed of a porous body or the like having pores, the negative electrode can be prepared by press fitting and filling a coating material made of the negative electrode active substance (active material according to the present invention), the conductive agent, and the binder homogeneously mixed in the solvent into pores of a current collector, or by immersing a current collector having pores in the coating material to diffuse the coating material into the pores, followed by drying and compression of the resultant product.

In the method of homogeneously mixing the negative electrode active substance (active material according to the present invention), the conductive agent, and the binder in the solvent to prepare a coating material, a kneader of a type, such as a planetary mixer having a stirring base which revolves while rotating in a kneader vessel, a twin-screw extruder kneader, a planetary agitating/defoaming apparatus, a bead mill, a high-speed swirling mixer, a powder sucking continuous dissolving/dispersing apparatus, or the like can be used, for example. The production process may be divided into steps according to the concentration of the solid content, and these apparatuses may be used suitably according to the steps.

The apparatus to be used varied according to the conductive agent, and the binder in the solvent, the specific surface area of the active substance, the type of the conductive agent, the type of the binder, and the combinations thereof to homogeneously mix the negative electrode active substance (active material according to the present invention), and should be optimized. If a kneader of a type, such as a planetary mixer having a stirring bar which revolves while rotating in a kneader vessel, a twin-screw extruder kneader, a planetary agitating/defoaming apparatus, or the like is used, the production process is preferably divided into steps according to the concentration of the solid content as follows: Kneading is performed in a state with a high concentration of the solid content, and then the concentration of the solid content is gradually reduced to control the viscosity of the coating material. In a state with a high concentration of the solid content, the concentration is preferably 60 to 90 mass %, more preferably 70 to 90 mass %. A shear force is not obtained at a concentration of less than 60 mass %. A heavy load is put on the apparatus at a concentration of more than 90 mass %. Thus, both cases are not suitable.

Any mixing procedure can be used. Examples thereof include a method of simultaneously mixing the negative electrode active substance, the conductive agent, and the binder in the solvent, a method of preliminarily mixing the conductive agent with the binder in the solvent, then adding the negative electrode active substance thereto, and mixing these materials, a method of preliminarily preparing a negative electrode active substance slurry, a conductive agent slurry, and a binder solution separately, and mixing these slurries. Among these methods, to homogeneously disperse the materials, preferred are a method of preliminarily mixing the conductive agent and the binder in the solvent, then adding the negative electrode active substance thereto, and mixing these materials and a method of preliminarily preparing a negative electrode active substance slurry, a conductive agent slurry, and a binder solution separately, and mixing these slurries.

An organic solvent can be used as the solvent. Examples of the organic solvent include one of or a mixture of aprotic organic solvents such as 1-methy-2-pyrrolidone, dimethylacetamide, and dimethylformamide. Preferred is 1-methyl-2-pyrrolidone.

If the organic solvent is used as the solvent, the binder is preferably preliminarily dissolved in the organic solvent before use.

<Positive Electrode>

The positive electrode includes a mixture layer on one or both surfaces of a positive electrode current collector, the mixture layer comprising a positive electrode active substance, a conductive agent, and a binder.

As the positive electrode active substance, a material capable of occluding and releasing lithium is used. Examples of the active substance includes composite metal oxides of lithium containing cobalt, manganese, or nickel, lithium-containing olivine phosphate salts, and the like. These positive electrode active substances can be used alone or in combination. Examples of such composite metal oxides include $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, and the like. These lithium composite oxides may be partially substituted by other elements. Cobalt, manganese, and nickel atoms can be substituted by at least one or more other elements such as Sn, Mg, Fe, Ti, Al, Zr, Cr, V, Ga, Zn, Cu, Bi, Mo, and La, or O atoms can be partially substituted by S or F. Alternatively, these lithium composite oxides can be coated with compounds containing these other elements. Examples of the lithium-containing olivine phosphate salts include $LiFePO_4$, $LiCoPO_4$, $LiNiPO_4$, $LiMnPO_4$, $LiFe_{1-x}M_xPO_4$ (where M is at least one element selected from the group consisting of Co, Ni, Mn, Cu, Zn, and Cd, and $0 \leq x \leq 0.5$).

Examples of the conductive agent and the binder for the positive electrode include the same as those in the negative electrode. Examples of the positive electrode current collector include aluminum, stainless steel, nickel, titanium, calcined carbon, and aluminum and stainless steel whose surfaces are surface treated with carbon, nickel, titanium, or silver. The surfaces of these materials may be oxidized, and depressions and projections may be formed on the surface of the positive electrode current collector surface by the surface treatment. Examples of the forms of the current collector includes formed bodies of sheets, nets, foils, films, punched materials, lath bodies, porous bodies, foamed bodies, fiber groups, and nonwoven fabrics.

<Nonaqueous Electrolytic Solution>

The nonaqueous electrolytic solution is a solution of an electrolyte salt dissolved in a nonaqueous solvent. This nonaqueous electrolytic solution is not particularly limited, and a variety of nonaqueous electrolytic solutions can be used.

The electrolyte salt to be used is soluble in a nonaqueous electrolyte. Examples thereof include inorganic lithium salts such as $LiPF_6$, $LiBF_4$, $LiPO_2F_2$, $LiN(SO_2F)_2$, and $LiClO_4$; lithium salts having linear fluoroalkyl groups such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3$ (iso-$C_3F_7)_3$, and $LiPF_5$(iso-$C_3F_7$); lithium salts having cyclic fluoroalkylene chains such as $(CF_2)_2(SO_2)_2NLi$ and $(CF_2)_3(SO_2)_2NLi$; and lithium salts having oxalato complexes such as lithium bis[oxalato-O,O']borate and lithium difluoro[oxalato-O,O']borate as anions. Among these salts, particularly preferred electrolyte salts are $LiPF_6$, $LiBF_4$, $LiPO_2F_2$, and $LiN(SO_2F)_2$, and the most preferred electrolyte salt is $LiPF_6$. These electrolyte salts can be used alone or in combination. A suitable combination of these electrolyte salts preferably contains $LiPF_6$, and further contains at least one lithium salt selected from $LiBF_4$, $LiPO_2F_2$, and $LiN(SO_2F)_2$ in an nonaqueous electrolytic solution.

For all the electrolyte salts above when dissolved and used, the concentration is usually preferably 0.3 M or more, more preferably 0.5 M or more, still more preferably 0.7 M or more relative to the nonaqueous solvent. The upper limit is preferably 2.5 M or less, more preferably 2.0 M or less, still more preferably 1.5 M or less.

Examples of the nonaqueous solvent include cyclic carbonates, linear carbonates, linear esters, ethers, amides, phosphate esters, sulfones, lactones, nitriles, compounds having an S=O bond, and the like. Cyclic carbonates are preferably contained. The term "linear esters" is used as a concept including linear carbonates and linear carboxylate esters.

Examples of the cyclic carbonates include one or more selected from ethylene carbonate (EC), propylene carbonate (PC), 1,2-butylene carbonate, 2,3-butylene carbonate, 4-fluoro-1,3-dioxolan-2-one (FEC), trans- or cis-4,5-difluoro-1,3-dioxolan-2-one (hereinafter, collectively referred to as "DFEC"), vinylene carbonate (VC), vinyl ethylene carbonate (VEC), and 4-ethynyl-1,3-dioxolan-2-one (EEC). One or more selected from ethylene carbonate, propylene carbonate, 1,2-butylene carbonate, 2,3-butylene carbonate, 4-fluoro-1,3-dioxolan-2-one, and 4-ethynyl-1,3-dioxolan-2-one (EEC) are more suitable to improve the charge rate characteristics of the energy storage device and prevent the generation of gas during the operation of the energy storage device at high temperature. One or more cyclic carbonates having an alkylene chain selected from propylene carbonate, 1,2-butylene carbonate, and 2,3-butylene carbonate are still more suitable. The proportion of cyclic carbonates having an alkylene chain in all the cyclic carbonates is preferably 55 vol % to 100 vol %, more preferably 60 vol % to 90 vol %.

Accordingly, the nonaqueous electrolytic solution to be used is preferably a nonaqueous electrolytic solution prepared by dissolving an electrolyte salt containing at least one lithium salt selected from $LiPF_6$, $LiBF_4$, $LiPO_2F_2$, and $LiN(SO_2F)_2$ in a nonaqueous solvent containing one or more cyclic carbonates selected from ethylene carbonate, propylene carbonate, 1,2-butylene carbonate, 2,3-butylene carbonate, 4-fluoro-1,3-dioxolan-2-one, and 4-ethynyl-1,3-dioxolan-2-one. More preferably, the cyclic carbonate is one or more cyclic carbonates having an alkylene chain selected from propylene carbonate, 1,2-butylene carbonate, and 2,3-butylene carbonate.

In particular, preferred is use of a nonaqueous electrolytic solution having a concentration of all the electrolyte salts of 0.5 M or more and 2.0 M or less, containing at least $LiPF_6$ as the electrolyte salts, and containing 0.001 M or more and 1 M or less of at least one lithium salt selected from $LiBF_4$, $LiPO_2F_2$, and $LiN(SO_2F)_2$. If the proportion of a lithium salt other than $LiPF_6$ in the nonaqueous solvent is 0.001 M or more, it facilitates an improvement in charge rate characteristics of the energy storage device and demonstration of the effect of preventing the generation of gas during the operation of the energy storage device at high temperature. If the proportion is 1.0 M or less, it barely reduces an improvement in charge rate characteristics of the energy storage device and demonstration of the effect of preventing the generation of gas during the operation of the energy storage device at high temperature. Accordingly, the proportion in this range is preferred. The proportion of lithium salts other than $LiPF_6$ in the nonaqueous solvent is preferably 0.01 M or more, particularly preferably 0.03 M or more, most preferably 0.04 M or more. The upper limit is preferably 0.8 M or less, more preferably 0.6 M or less, particularly preferably 0.4 M or less.

The nonaqueous solvent is preferably used in the form of a mixture to achieve appropriate physical properties. Examples of the combination for the mixture include combinations of cyclic carbonates and linear carbonates; those of cyclic carbonates, linear carbonates, and lactones; those of cyclic carbonates, linear carbonates, and ethers; those of cyclic carbonates, linear carbonates, and linear esters; those of cyclic carbonates, linear carbonates, and nitriles; and those of cyclic carbonates, linear carbonates, and compounds having an S=O bond.

Examples of the linear esters suitably include one or more asymmetric linear carbonates selected from methyl ethyl carbonate (MEC), methyl propyl carbonate (MPC), methyl isopropyl carbonate (MIPC), methyl butyl carbonate, and ethyl propyl carbonate; one or more symmetric linear carbonates selected from dimethyl carbonate (DMC), diethyl carbonate (DEC), dipropyl carbonate, and dibutyl carbonate; and one or more linear carboxylate esters selected from pivalate esters such as methyl pivalate, ethyl pivalate, and propyl pivalate, methyl propionate, ethyl propionate, propyl propionate, methyl acetate, and ethyl acetate (EA).

Among these linear esters, preferred are linear esters having a methyl group selected from dimethyl carbonate, methyl ethyl carbonate, methyl propyl carbonate, methyl isopropyl carbonate, methyl butyl carbonate, methyl propionate, methyl acetate, and ethyl acetate (EA). Particularly preferred are linear carbonates having a methyl group.

If the linear carbonate is used, use of two or more linear carbonates is preferred. More preferably, both of a symmetric linear carbonate and an asymmetric linear carbonate are contained. Still more preferably, a larger content of the symmetric linear carbonate is contained than that of the asymmetric linear carbonate.

The content of the linear ester is not particularly limited. Preferably, the linear ester is used in the range of 60 to 90 vol % of the total volume of the nonaqueous solvent. The content of the linear ester is preferably within this range for the following reasons: A content of 60 vol % or more does not result in a nonaqueous electrolytic solution having excessively high viscosity. A content of 90 vol % or less prevents a reduction in electric conductivity of the nonaqueous electrolytic solution, which might cause a reduction in an improvement in charge rate characteristics of the energy storage device and a reduction in the effect of preventing the generation of gas during the operation of the energy storage device at high temperature.

The proportion of the volume of the symmetric linear carbonate in the linear carbonate is preferably 51 vol % or more, more preferably 55 vol % or more. The upper limit is preferably 95 vol % or less, more preferably 85 vol % or less. Particularly preferably, dimethyl carbonate is contained in the symmetric linear carbonate. More preferably, the asymmetric linear carbonate has a methyl group. Particularly preferred is methyl ethyl carbonate. These cases are preferred because the charge rate characteristics of the energy storage device and the effect of preventing the generation of gas during the operation of the energy storage device at high temperature are improved.

To improve the charge rate characteristics of the energy storage device and the effect of preventing the generation of gas during the operation of the energy storage device at high temperature, the ratio of the cyclic carbonate to the linear ester (cyclic carbonate:linear ester (volume ratio)) is preferably 10:90 to 45:55, more preferably 15:85 to 40:60, particularly preferably 20:80 to 35:65.

<Structure of Lithium Battery>

The lithium battery according to the present invention can have any structure. Examples thereof include coin batteries each including a positive electrode, a negative electrode, and a single- or multi-layer separator; and cylindrical batteries and prismatic batteries each having a positive electrode, a negative electrode, and a rolled separator, and the like.

As the separator, an insulating thin film having large ion permeability and predetermined mechanical strength is used. Examples thereof include polyethylene, polypropylene, cellulose paper, glass fiber paper, poly(ethylene terephthalate), polyimide microporous films, and the like. A multi-layer film composed of a combination of two or more thin films can also be used. The surfaces of these separators can also be coated with a resin such as PVDF, silicon resin, or rubber resin, or particles of a metal oxide such as aluminum oxide, silicon dioxide, or magnesium oxide. The separator may have a pore diameter in the range that it is useful for standard batteries, for example, 0.01 to 10 μm. The separator may have a thickness in the range that it is useful for standard batteries, for example, 5 to 300 μm.

EXAMPLES

The present invention will now be more specifically described by way of Examples and Comparative Examples, but the present invention is not limited to Examples below, and encompasses a variety of combinations which can be easily analogized from the gist of the present invention. In particular, the present invention is not limited to the combinations of solvents in Examples.

Examples and Comparative Examples According to First Embodiment

The conditions for production in Examples and Comparative Examples according to the first embodiment (embodiment in which boron (B) is contained as the localized element) are collectively shown in Table 1.

[Table 1]

TABLE 1

| | Preparation of Raw Materials | | | | | | | | | | |
|---|---|---|---|---|---|---|---|---|---|---|---|
| | Lithium Raw Material | | Titanium Raw Material | | Additive | | | | Calcination | | |
| | Kind | Average Particle Size [μm] | Kind | Specific Surface Area [m2/g] | Kind | Amount [mass %] | Mixing | Form | Calcination Furnace | Highest Temperature | Retention Time |
| Example 1-1 | Li$_2$CO$_3$ | 4.6 | anatase TiO$_2$ | 10 | | | wet bead mill | slurry | rotary furnace | 900° C. | 30 min |
| Example 1-2 | | | | | | | | | | | |
| Example 1-3 | | | | | | | | | | | |
| Example 1-4 | | | | | | | | | | | |
| Example 1-5 | | | | | | | | | | | |
| Example 1-6 | | | | | | | | | | | |
| Example 1-7 | | | | | | | | | | | |
| Example 1-8 | | | | | | | | | | | 930° C. | |
| Example 1-9 | | | | | | | | | | 850° C. | 20 min |
| Example 1-10 | | | | | | | | | | | |
| Example 1-11 | | | | | | | | | | 900° C. | 30 min |
| Example 1-12 | | | | | | | | | | | |
| Example 1-13 | | | | | | | | | | 930° C. | |
| Example 1-14 | | | | | | | | | | 850° C. | 20 min |
| Example 1-15 | | | | | | | | | | 900° C. | 30 min |
| Example 1-16 | | | | | | | | | | | |
| Example 1-17 | | | | | | | | | | | |
| Example 1-18 | | | | | | | | | | | |
| Example 1-19 | | | | | | | | | | | |
| Example 1-20 | | | | | | | | | | | |
| Example 1-21 | | | | | | | | | | | |
| Example 1-22 | | | | | | | | | | | |
| Example 1-23 | | | | | | | | | | | |
| Example 1-24 | | | | | | | | | | | |
| Example 1-25 | | | | | | | | | | | |
| Example 1-26 | | | | | | | | | | | |
| Example 1-27 | | | | | | | | | | | |
| Example 1-28 | | | | | | | | | | | |
| Example 1-29 | | | | | | | | | | | |
| Example 1-30 | Li$_2$CO$_3$ | 4.6 | anatase TiO$_2$ | 10 | Al$_2$O$_3$ | 0.55 | dry mixing | powder | muffle furnace | 900° C. | 120 min |
| Example 1-31 | | | | | | | wet bead mill | slurry | rotary furnace | | 30 min |
| Example 1-32 | | | | | | | | | | | |
| Comparative Example 1-1 | Li$_2$CO$_3$ | 4.6 | anatase TiO$_2$ | 10 | | | wet bead mill | slurry | rotary furnace | 900° C. | 30 min |
| Comparative Example 1-2 | | | | | | | | | | | |
| Comparative Example 1-3 | | | | | | | | | | 850° C. | 20 min |

TABLE 1-continued

| | | | | dry mixing | powder | muffle furnace | 900° C. | 120 min |
|---|---|---|---|---|---|---|---|---|
| Comparative Example 1-4 | | | | | | | | |
| Comparative Example 1-5 | | $H_3BO_3$ | 0.15 | | | | | |
| Comparative Example 1-6 | | | 0.90 | | | | | |
| Comparative Example 1-7 | | | 3.60 | | | | | |
| Comparative Example 1-8 | | | | wet bead mill | slurry | rotary furnace | 900° C. | 30 min |

| | Disintegration | Surface Treatment | | | | | |
|---|---|---|---|---|---|---|---|
| | Hammer Mill Disintegration | Treatment Agent 1 | | Treatment Agent 4 | | Heat Treatment | |
| | | Kind | Amount [mass %] | Kind | Amount [mass %] | Temp. | Time |
| Example 1-1 | done | $H_3BO_3$ | 0.5 | | | 500° C. | 1 h |
| Example 1-2 | | | 0.8 | | | | |
| Example 1-3 | | | 1.5 | | | | |
| Example 1-4 | | | 3.0 | | | | |
| Example 1-5 | | | 9.0 | | | | |
| Example 1-6 | | $B_2O_3$ | 0.5 | | | | |
| Example 1-7 | | $Li_2B_4O_7$ | 1.0 | | | | |
| Example 1-8 | | $H_3BO_3$ | 1.5 | | | | |
| Example 1-9 | | | 1.5 | | | | |
| Example 1-10 | | | 9.0 | | | | |
| Example 1-11 | | | 1.5 | $Al_2(SO_4)_3 \cdot 16H_2O$ | 1.5 | | |
| Example 1-12 | | | 1.5 | $AlF_3$ | 1.0 | | |
| Example 1-13 | | | 1.5 | $Al_2(SO_4)_3 \cdot 16H_2O$ | 1.5 | | |
| Example 1-14 | | | 1.5 | | 1.5 | | |
| Example 1-15 | | | 1.5 | $MgSO_3 \cdot 7H_2O$ | 0.9 | 350° C. | |
| Example 1-16 | | | 1.5 | $ZnSO_4 \cdot 7H_2O$ | 0.5 | 500° C. | |
| Example 1-17 | | | 1.5 | $Ga_2(SO_4)_3 \cdot 9H_2O$ | 0.5 | | |
| Example 1-18 | | | 1.5 | $In_2(SO_4)_3 \cdot 9H_2O$ | 0.5 | | |
| Example 1-19 | | | 1.5 | $Al_2(SO_4)_3 \cdot 16H_2O$ | 0.4 | | |
| Example 1-20 | | | 1.5 | | 5.0 | | |
| Example 1-21 | | | 1.5 | | 10.0 | | |
| Example 1-22 | | | 9.0 | | 0.4 | | |
| Example 1-23 | | | 5.0 | | 0.4 | | |
| Example 1-24 | | | 5.0 | | 0.6 | | |
| Example 1-25 | | | 0.5 | | 7.0 | | |
| Example 1-26 | | | 0.5 | | 10.0 | | |
| Example 1-27 | | | 0.5 | | 12.0 | | |
| Example 1-28 | | | 1.5 | | 1.5 | | |
| Example 1-29 | | | 1.5 | | 1.5 | | |
| Example 1-30 | done | $H_3BO_3$ | 1.5 | | | 500° C. | 1 h |
| Example 1-31 | | | | $SnSO_4$ | 0.3 | | |
| Example 1-32 | | | | $CaSO_4 \cdot 7H_2O$ | 0.7 | | |
| Comparative Example 1-1 | done | | | | | 500° C. | 1 h |
| Comparative Example 1-2 | | $H_3BO_3$ | 0.2 | | | | |
| Comparative Example 1-3 | | | 12.0 | | | | |
| Comparative Example 1-4 | | | 1.5 | | | | |
| Comparative Example 1-5 | | | | | | | |
| Comparative Example 1-6 | | | | | | | |
| Comparative Example 1-7 | | | | | | | |
| Comparative Example 1-8 | | | | $Al_2(SO_4)_3 \cdot 16H_2O$ | 1.5 | 500° C. | 1 h |

Example 1-1

<Step of Preparing Raw Materials>

$Li_2CO_3$ (average particle size: 4.6 μm) and anatase $TiO_2$ (specific surface area: 10 m²/g) were weighed such that the atomic ratio of Li to Ti (Li/Ti) was 0.83. A raw material powder was thereby prepared. Deionized water was added to and stirred with the raw material powder to give a raw material mixed slurry having a solid content of 40 mass %. Using a bead mill (made by Willy A. Bachofen AG, type: DYNO-MILL KD-20BC, material for the agitator: polyurethane, material for the vessel inner surface: zirconia) including a vessel 80 vol % filled with zirconia beads (outer diameter: 0.65 mm), this raw material mixed slurry was processed at an agitator circumferential speed of 13 m/s and a slurry feed rate of 55 kg/hr under control such that the vessel internal pressure was 0.02 to 0.03 MPa or less, and the raw material powder was wet mixed and milled.

<Calcination Step>

Using a rotary kiln calcination furnace (length of the furnace core tube: 4 m, diameter of the furnace core tube: 30 cm, external heating type) provided with an anti-adhesion mechanism, the resulting mixed slurry was introduced into the furnace core tube from the raw material feed zone of the calcination furnace, and was dried and calcined in a nitrogen atmosphere. In this operation, the tilt angle of the furnace core tube to the horizontal direction was 2 degrees, the rotational speed of the furnace core tube was 20 rpm, and the flow rate of nitrogen introduced from the calcinated product recovery zone into the furnace core tube was 20 L/min. The heating temperature of the furnace core tube was 900° C. in the raw material feed zone, 900° C. in the central zone, and 900° C. in the calcinated product recovery zone. The retention time of the calcinated product at 900° C. was 30 minutes.

<Disintegration Step>

The calcinated product recovered from the calcinated product recovery zone of the furnace core tube was disintegrated at a screen opening of 0.5 mm, the number of rotations of 8,000 rpm, and a powder feed rate of 25 kg/hr using a hammer mill (made by DALTON CORPORATION, AIIW-5).

<Surface Treatment Step>

Deionized water was added to and stirred with the calcined powder subjected to disintegration to give a slurry having a solid content of 30 mass %. Then, boric acid ($H_3BO_3$) as Treatment agent 1 was added in the amount of 0.5 mass % of the calcined powder subjected to disintegration, to prepare a mixed slurry. While being stirred, this mixed slurry was heated to 100° C. to be dried. The dried powder was placed into an alumina sagger, and was subjected to a heat treatment at 500° C. for one hour in a mesh belt conveying-type continuous furnace. The powder after the heat treatment was sieved with a sieve (mesh size: 53 μm) to yield a lithium titanate powder according to Example 1-1.

Examples 1-2 to 1-5

Lithium titanate powders according to Examples 1-2 to 1-5 were produced in the same manner as in Example 1-1 except that the amount of $H_3BO_3$ added as Treatment agent 1 in the surface treatment step was varied as shown in Table 1.

Examples 1-6 and 1-7

Lithium titanate powders according to Examples 1-6 and 1-7 were produced in the same manner as in Example 1-1 except that $H_3BO_3$ as Treatment agent 1 in the surface treatment step was replaced with boron oxide ($B_2O_3$) or lithium tetraborate ($Li_2B_4O_7$), and the amount of Treatment agent 1 added was varied as shown in Table 1.

Examples 1-8 and 1-9

Lithium titanate powders according to Examples 1-8 and 1-9 were produced in the same manner as in Example 1-3 except that the calcination temperature and the retention time in the calcination step were varied as shown in Table 1.

Example 1-10

A lithium titanate powder according to Example 1-10 was produced in the same manner as in Example 1-1 except that the calcination temperature and the retention time in the calcination step were varied as shown in Table 1, and the amount of $H_3BO_3$ added as Treatment agent 1 in the surface treatment step was varied as shown in Table 1.

Example 1-11

A lithium titanate powder according to Example 1-11 was produced in the same manner as in Example 1-1 except that in the surface treatment step, deionized water was added to and stirred with the calcined powder subjected to disintegration to give a slurry having a solid content of 30 mass %, and boric acid ($H_3BO_3$) as Treatment agent 1, and further, aluminum sulfate hexadecahydrate ($Al_2(SO_4)_3.16H_2O$) as Treatment agent 4 each were added in the amount of 1.5 mass % of the calcined powder subjected to disintegration, to prepare a mixed slurry.

Example 1-12

A lithium titanate powder according to Example 1-12 was produced in the same manner as in Example 1-11 except that in the surface treatment step, aluminum sulfate hexadecahydrate as Treatment agent 4 was replaced with aluminum fluoride ($AlF_3$), and the amount of Treatment agent 4 added was varied as shown in Table 1.

Example 1-13, 1-14

Lithium titanate powders according to Examples 1-13 and 1-14 were produced in the same manner as in Example 1-11 except that the calcination temperature and the retention time in the calcination step were varied as in Table 1.

Examples 1-15 to 1-18

Lithium titanate powders according to Examples 1-15 to 1-18 were produced in the same manner as in Example 1-11 except that in the surface treatment step, aluminum sulfate hexadecahydrate as Treatment agent 4 was replaced with magnesium sulfate heptahydrate ($MgSO_4.7H_2O$), zinc sulfate heptahydrate ($ZnSO_4.7H_2O$), gallium sulfate nonahydrate ($Ga_2(SO_4)_3.9H_2O$), or indium sulfate nonahydrate ($In_2(SO_4)_3.9H_2O$) and the amount thereof added and the temperature for the heat treatment were varied as shown in Table 1.

Examples 1-19 to 1-21

Lithium titanate powders according to Examples 1-19 to 1-21 were produced in the same manner as in Example 1-11 except that in the surface treatment step, the amount of aluminum sulfate hexadecahydrate added as Treatment agent 4 was varied as in Table 1.

Examples 1-22 to 1-27

Lithium titanate powders according to Examples 1-22 to 1-27 were produced in the same manner as in Example 1-11 except that in the surface treatment step, the amount of $H_3BO_3$ added as Treatment agent 1 and the amount of aluminum sulfate hexadecahydrate added as Treatment agent 4 were varied as shown in Table 1.

Example 1-28

A lithium titanate powder according to Example 1-28 was produced in the same manner as in Example 1-11 except that in the surface treatment step, the heat treatment was performed using a mesh belt-conveying type continuous furnace having an outlet provided with a recovery box where the dew point at 25° C. was managed at −15° C. or less, the powder after the heat treatment was cooled and sieved inside the recovery box disposed in the outlet, the powder passing through the sieve was collected and sealed in an aluminum laminated bag, and then the bag was extracted from the recovery box.

Example 1-29

A lithium titanate powder according to Example 1-29 was produced in the same manner as in Example 1-28 except that the dew point in the recovery box in the surface treatment step was controlled at −20° C.

Example 1-30

In the step of preparing raw materials, 0.55 mass % of $Al_2O_3$ as an additive relative to the amount of lithium titanate calculated in terms of the amount of $TiO_2$ was added to $Li_2CO_3$ and anatase $TiO_2$ weighed in the same manner as in Examples 1-1 to prepare a raw material powder. The raw material powder was dry mixed for 30 minutes with a Henschel mixer (made by Kawata Mfg. Co., Ltd., SUPERMIXER, SMV(G)-200). In the calcination step, the resulting mixed powder was filled into a sagger made of high purity alumina, and was calcined in the air atmosphere at 900° C. for 120 minutes using a muffle electric furnace. A lithium titanate powder according to Example 1-30 was produced by the same methods as those in Example 1-3 in the subsequent disintegration step and thereafter.

Example 1-31

A lithium titanate powder according to Example 1-31 was produced in the same manner as in Example 1-11 except that in the surface treatment step, aluminum sulfate hexadecahydrate as Treatment agent 4 was replaced with tin sulfate ($SnSO_4$) and the amount of Treatment agent 4 added was varied as shown in Table 1.

Example 1-32

A lithium titanate powder according to Example 1-32 was produced in the same manner as in Example 1-11 except that in the surface treatment step, aluminum sulfate hexadecahydrate as Treatment agent 4 was replaced with cobalt sulfate heptahydrate ($CoSO_4 \cdot 7H_2O$) and the amount of Treatment agent 4 added was varied as shown in Table 1.

Comparative Example 1-1

A lithium titanate powder according to Comparative Example 1-1 was produced in the same manner as in Example 1-1 except that any additive was not added in the surface treatment step.

Comparative Example 1-2

A lithium titanate powder according to Comparative Example 1-2 was produced in the same way as in Example 1-1 except that in the surface treatment step, the amount of $H_3BO_3$ added as Treatment agent 1 was varied as shown in Table 1.

Comparative Example 1-3

A lithium titanate powder according to Comparative Example 1-3 was produced in the same manner as in Example 1-1 except that the calcination temperature and the retention time in the calcination step were varied as shown in Table 1, and the amount of $H_3BO_3$ added as Treatment agent 1 in the surface treatment step was varied as shown in Table 1.

Comparative Example 1-4

A raw material powder was prepared by weighing raw materials in the same manner as in Example 1-1 in the step of preparing raw materials. Without adding deionized water, the raw material powder was dry mixed as it was for 30 minutes with a Henschel mixer (made by Kawata Mfg. Co., Ltd., SUPERMIXER, SMV(G)-200). In the calcination step, the resulting mixed powder was filled into a sagger made of high purity alumina, and was calcined in air atmosphere at 900° C. for 120 minutes using a muffle electric furnace. A lithium titanate powder according to Comparative Example 1-4 was produced by the same methods as those in Example 1-3 in the subsequent disintegration step and thereafter.

Comparative Example 1-5

In the step of preparing raw materials, 0.15 mass % of $H_3BO_3$ relative to the amount of lithium titanate calculated in terms of $TiO_2$ was added to $Li_2CO_3$ and anatase $TiO_2$ weighed in the same manner as in Examples 1-1 to prepare a raw material powder, and the raw material powder was dry mixed for 30 minutes with a Henschel mixer (made by Kawata Mfg. Co., Ltd., SUPERMIXER, SMV(G)-200). A lithium titanate powder according to Comparative Example 1-5 was produced by the same methods as in Comparative Example 1-4 except that the surface treatment step was not performed in the subsequent calcination step and thereafter.

Comparative Examples 1-6 and 1-7

Lithium titanate powders according to Comparative Examples 1-6 and 1-7 were produced in the same manner as in Comparative Example 1-5 except that the amount of $H_3BO_3$ added in the preparation of raw materials was varied as shown in Table 1.

Comparative Example 1-8

A lithium titanate powder according to Comparative Example 1-8 was produced in the same manner as in Example 1-11 except that $H_3BO_3$ was not added in the surface treatment step.

[Measurement of Powder Physical Properties]

A variety of physical properties of the lithium titanate powders according to Examples 1-1 to 1-32 and Comparative Examples 1-1 to 1-8 (hereinafter, referred to as each of the lithium titanate powders according to Examples and Comparative Examples in some cases) were measured as follows. The results of measurement for Examples 1-1 to 1-10 and Comparative Examples 1-1 to 1-7 are shown in Table 2, and the results of measurement for Examples 1-11 to 1-32 and Comparative Example 1-8 are shown in Table 3.

TABLE 2

| | Physical Properties of Powder | | | | | | | | Battery Characteristics | | | |
| --- | --- | --- | --- | --- | --- | --- | --- | --- | --- | --- | --- | --- |
| | ICP | XPS Boron (B) | | | | | | | | Initial | | Amount of Gas |
| | Specific Surface Area S [$m^2/g$] | Boron (B) Content $B_B$ [mass %] | B1s Peak [eV] | Concentration $B_S$ [atm %] | $B_B \times S$ | Water Content [ppm] | | | Single Electrode Capacity [mAh/g] | Charge/ Discharge Rate [%] | 5 C Charge Rate [%] | Generated at 70° C. in 100 Cycles [ml] |
| | | | | | | 25° C. to 200° C. | 200° C. to 350° C. | Total Content | | | | |
| Example 1-1 | 6.1 | 0.06 | 193 | 2.6 | 16 | 2231 | 251 | 2482 | 167 | 97.8 | 68 | 2.8 |
| Example 1-2 | 5.4 | 0.11 | 193 | 5.3 | 29 | 1750 | 291 | 2041 | 167 | 97.6 | 66 | 2.4 |
| Example 1-3 | 5.0 | 0.18 | 193 | 4.5 | 23 | 1812 | 333 | 2145 | 168 | 97.6 | 67 | 2.0 |
| Example 1-4 | 4.7 | 0.40 | 193 | 6.5 | 31 | 1634 | 309 | 1943 | 165 | 97.6 | 66 | 2.1 |
| Example 1-5 | 4.6 | 0.95 | 193 | 10.1 | 46 | 1710 | 254 | 2004 | 162 | 97.2 | 64 | 2.0 |
| Example 1-6 | 5.1 | 0.18 | 192 | 5.0 | 26 | 1860 | 307 | 2167 | 167 | 97.9 | 67 | 2.2 |

TABLE 2-continued

| | Physical Properties of Powder | | | | | | | | Battery Characteristics | | | |
|---|---|---|---|---|---|---|---|---|---|---|---|---|
| | | ICP | XPS Boron (B) | | | | | | | Initial | | Amount of Gas |
| | Specific Surface Area S [m²/g] | Boron (B) Content $B_B$ [mass %] | B1s Peak [eV] | Concentration $B_S$ [atm %] | $B_B \times S$ | Water Content [ppm] 25° C. to 200° C. | 200° C. to 350° C. | Total Content | Single Electrode Capacity [mAh/g] | Charge/ Discharge Rate [%] | 5 C Charge Rate [%] | Generated at 70° C. in 100 Cycles [ml] |
| Example 1-7 | 5.2 | 0.14 | 194 | 5.0 | 26 | 2005 | 319 | 2324 | 168 | 98.0 | 65 | 2.2 |
| Example 1-8 | 4.1 | 0.15 | 193 | 4.0 | 16 | 1700 | 317 | 2017 | 167 | 97.8 | 60 | 2.0 |
| Example 1-9 | 9.6 | 0.15 | 193 | 5.0 | 48 | 2988 | 341 | 3329 | 167 | 97.8 | 69 | 2.2 |
| Example 1-10 | 9.3 | 0.95 | 193 | 9.8 | 91 | 2861 | 355 | 3216 | 162 | 97.3 | 64 | 3.2 |
| Comparative Example 1-1 | 6.0 | 0 | undetected | 0 | 0 | 2113 | 357 | 2470 | 168 | 97.8 | 63 | 9.0 |
| Comparative Example 1-2 | 6.0 | 0.03 | 193 | 1.4 | 8 | 2541 | 311 | 2852 | 168 | 97.8 | 64 | 6.4 |
| Comparative Example 1-3 | 9.5 | 1.6 | 193 | 13.0 | 124 | 3300 | 339 | 3639 | 155 | 96.3 | 58 | 3.4 |
| Comparative Example 1-4 | 3.4 | 0.17 | 193 | 4.6 | 16 | 1308 | 277 | 1585 | 158 | 97.8 | 35 | 3.3 |
| Comparative Example 1-5 | 0.9 | 0.02 | 193 | 3.2 | 3 | 955 | 231 | 1186 | 138 | 94.6 | 15 | 3.9 |
| Comparative Example 1-6 | 0.7 | 0.15 | 193 | 5.0 | 4 | 809 | 201 | 1010 | 121 | 93.0 | 10 | 3.8 |
| Comparative Example 1-7 | 0.6 | 0.56 | 193 | 9.0 | 5 | 731 | 175 | 906 | 111 | 92.1 | 5 | 3.8 |

TABLE 3

| | Physical Properties of Powder | | | | | | | | | | |
|---|---|---|---|---|---|---|---|---|---|---|---|
| | | ICP | | | | XPS | | | | | |
| | | Boron (B) | Metal Element M2 | | | Boron (B) | | Metal Element M2 | | | |
| | Specific Surface Area S [m²/g] | Content $B_9$ [mass %] | Kind | Content $C_{M2}$ [mass %] | $CM_2/B_9$ | B1s Peak [eV] | Concentration $B_s$ [atm %] | Kind | Concentration $M_s$ ($A_s$) [atm %] | $M_s/B_s$ ($A_s/B_s$) | $B_s \times S$ |
| Example 1-11 | 5.1 | 0.18 | Al | 0.12 | 0.67 | 193 | 6.1 | Al | 1.0 | 0.16 | 31 |
| Example 1-12 | 5.3 | 0.16 | Al | 0.24 | 1.50 | 193 | 6.0 | Al | 2.0 | 0.38 | 32 |
| Example 1-13 | 4.1 | 0.18 | Al | 0.12 | 0.57 | 193 | 6.1 | Al | 1.0 | 0.16 | 25 |
| Example 1-14 | 9.7 | 0.17 | Al | 0.12 | 0.71 | 193 | 6.1 | Al | 1.0 | 0.16 | 59 |
| Example 1-15 | 5.1 | 0.17 | Mg | 0.13 | 0.76 | 193 | 5.0 | Mg | 1.0 | 0.20 | 26 |
| Example 1-16 | 5.3 | 0.16 | Zn | 0.12 | 0.76 | 193 | 6.0 | Zn | 1.0 | 0.17 | 32 |
| Example 1-17 | 5.2 | 0.17 | Ga | 0.14 | 0.82 | 193 | 6.0 | Ga | 2.0 | 0.33 | 31 |
| Example 1-18 | 5.1 | 0.16 | In | 0.13 | 0.81 | 193 | 5.0 | In | 2.0 | 0.40 | 26 |
| Example 1-19 | 5.1 | 0.19 | Al | 0.05 | 0.26 | 193 | 5.8 | Al | 0.6 | 0.10 | 30 |
| Example 1-20 | 5.2 | 0.17 | Al | 0.38 | 2.24 | 193 | 5.0 | Al | 3.0 | 0.60 | 26 |
| Example 1-21 | 5.3 | 0.16 | Al | 0.79 | 4.94 | 193 | 5.0 | Al | 7.0 | 1.40 | 27 |
| Example 1-22 | 4.6 | 0.95 | Al | 0.05 | 0.05 | 193 | 10.0 | Al | 0.5 | 0.05 | 46 |
| Example 1-23 | 4.7 | 0.54 | Al | 0.05 | 0.09 | 193 | 7.0 | Al | 0.5 | 0.07 | 33 |
| Example 1-24 | 4.7 | 0.56 | Al | 0.07 | 0.13 | 193 | 7.0 | Al | 0.7 | 0.10 | 33 |
| Example 1-25 | 6.2 | 0.06 | Al | 0.51 | 8.50 | 193 | 2.4 | Al | 6.0 | 2.50 | 15 |
| Example 1-26 | 5.7 | 0.06 | Al | 0.79 | 13.2 | 193 | 2.6 | Al | 8.0 | 3.08 | 15 |
| Example 1-27 | 6.2 | 0.06 | Al | 0.95 | 16.8 | 193 | 2.4 | Al | 10.0 | 4.17 | 15 |
| Example 1-28 | 5.1 | 0.15 | Al | 0.12 | 0.80 | 193 | 6.1 | Al | 1.0 | 0.16 | 31 |
| Example 1-29 | 5.5 | 0.15 | Al | 0.12 | 0.80 | 193 | 6.1 | Al | 1.0 | 0.16 | 34 |
| Example 1-30 | 4.3 | 0.18 | Al | 0.28 | 1.56 | 193 | 6.1 | Al | 0.2 | 0.08 | 26 |
| Example 1-31 | 5.5 | 0.17 | Sn | 0.15 | 0.86 | 193 | 6.1 | Sn | 1.0 | 0.16 | 34 |
| Example 1-32 | 5.6 | 0.18 | Co | 0.14 | 0.78 | 193 | 6.1 | Co | 1.0 | 0.16 | 34 |
| Comparative Example 1-3 | 6.0 | 0 | Al | 0.14 | 0.14/undetected | undetected | 0 | Al | 1.0 | 1/undetected | 0 |

TABLE 3-continued

Physical Properties of Powder

| | TEM Metal Element M2 | | | | | | Battery Characteristics | | | |
|---|---|---|---|---|---|---|---|---|---|---|
| | Atomic | | | | | | | | | |
| | Atomic Concentration (Surface of Particle) F1 [atm %] | Atomic Concentration Ratio (Surface of Particle/Inside of Particle) F1/F2 | Atomic Concentration Ratio to Ti (Surface of Particle) F1/Fti | Water Content [ppm] | | | Single Electrode Capacity [mAh/g] | Initial Charge/ Discharge Rate [%] | 6 C Charge Rate [%] | Amount of Gas Generated at 70° C. in 100 Cycles [ml] |
| | | | | 25° C. to 200° C. | 200° C. to 350° C. | Total Content | | | | |
| Example 1-11 | 3.3 | 3.3/undetected | 0.04 | 2770 | 356 | 3125 | 168 | 97.5 | 80 | 0.5 |
| Example 1-12 | 6.3 | 6.3/undetected | 0.08 | 3016 | 376 | 3392 | 168 | 97.5 | 80 | 0.6 |
| Example 1-13 | 3.3 | 3.3/undetected | 0.04 | 3105 | 341 | 3446 | 168 | 97.8 | 79 | 0.6 |
| Example 1-14 | 3.3 | 3.3/undetected | 0.04 | 3321 | 365 | 3686 | 168 | 97.9 | 82 | 0.8 |
| Example 1-15 | 3.6 | 3.3/undetected | 0.04 | 2770 | 356 | 3125 | 167 | 97.5 | 79 | 1.6 |
| Example 1-16 | 3.3 | 3.3/undetected | 0.04 | 3016 | 376 | 3392 | 166 | 97.6 | 80 | 1.6 |
| Example 1-17 | 3.9 | 3.3/undetected | 0.05 | 2698 | 398 | 3096 | 167 | 98.0 | 78 | 1.6 |
| Example 1-18 | 3.6 | 3.5/undetected | 0.04 | 2908 | 377 | 3285 | 167 | 98.0 | 80 | 1.6 |
| Example 1-19 | 1.0 | 1.0/undetected | 0.02 | 2605 | 317 | 2922 | 166 | 97.6 | 71 | 0.8 |
| Example 1-20 | 8.5 | 8.5/undetected | 0.18 | 3188 | 371 | 3559 | 166 | 97.9 | 82 | 0.6 |
| Example 1-21 | 13.3 | 10.0/undetected | 0.26 | 3700 | 425 | 4125 | 163 | 97.8 | 82 | 0.8 |
| Example 1-22 | 1.0 | 1.0/undetected | 0.02 | 2400 | 301 | 2701 | 162 | 97.3 | 73 | 1.6 |
| Example 1-23 | 1.1 | 1.1/undetected | 0.02 | 2412 | 311 | 2723 | 166 | 97.8 | 74 | 1.4 |
| Example 1-24 | 1.9 | 1.3/undetected | 0.02 | 2345 | 344 | 2683 | 166 | 97.8 | 76 | 1.0 |
| Example 1-25 | 10.7 | 10.7/undetected | 0.17 | 3290 | 418 | 3708 | 164 | 97.8 | 80 | 1.2 |
| Example 1-26 | 13.6 | 13.8/undetected | 0.26 | 3541 | 460 | 4001 | 163 | 97.5 | 81 | 1.4 |
| Example 1-27 | 15.0 | 15.0/undetected | 0.32 | 3701 | 463 | 4164 | 162 | 97.3 | 81 | 1.6 |
| Example 1-28 | 3.3 | 3.3/undetected | 0.04 | 381 | 162 | 643 | 168 | 97.9 | 80 | 0.4 |
| Example 1-29 | 3.3 | 3.3/undetected | 0.04 | 287 | 60 | 347 | 169 | 98.0 | 86 | 0.3 |
| Example 1-30 | 1.4 | 1.3 | 0.02 | 2810 | 312 | 3122 | 166 | 97.5 | 62 | 2.8 |
| Example 1-31 | 4.1 | 4.1/undetected | 0.05 | 3090 | 380 | 3470 | 166 | 97.3 | 63 | 3.2 |
| Example 1-32 | 3.9 | 8.9/undetected | 0.05 | 2869 | 370 | 3289 | 166 | 97.4 | 63 | 3.1 |
| Comparative Example 1-3 | 3.9 | 8.9/undetected | 0.05 | 3505 | 290 | 3796 | 168 | 97.8 | 80 | 6.5 |

<Measurement of Specific Surface Area (S)>

In each of the lithium titanate powders according to Examples and Comparative Examples, the specific surface area (S) (m$^2$/g) was measured using an automatic BET specific surface area analyzer (made by Mountech Co., Ltd., trade name "Macsorb HM model-1208") as follows: 0.5 g of sample powder to be measured was weighed, was placed into a Φ12 standard cell (HM1201-031), and was measured by a BET single point method using liquid nitrogen.

<X-Ray Photoelectron Spectroscopy (XPS)>

An X-ray photoelectron spectrometer (ULVAC-PHI, INCORPORATED, type: PHI1800) was used. An X-ray source used was MgKα at 400 W. In Example 1-15, the X-ray source used was AlKα at 400 W to measure Mg. Each of the lithium titanate powders according to Examples and Comparative Examples was placed on a sample holder into a flat and uniform shape of Φ5 mm. In each of the lithium titanate powders according to Examples and Comparative Examples, the elements present on the surface thereof were analyzed where the region for analysis was 2.0×0.8 mm$^2$ and the photoelectron take-off angle was 45 degrees. The results of measurement were corrected such that the peak of Ti2p3 was 458.8 eV. Smoothing was performed by a Savitzky-Golay method with 11 points, and background correction used was a Shirley method. Peak areas were determined from the narrow spectra ((185 to 200 eV for boron (B1s) and 113 to 128 eV for aluminum (Al2s)) of all the elements detected in a wide spectrum, and the surface atomic concentration (atm %) of each element was calculated using a relative sensitivity factor specified by ULVAC-PHI, INCORPORATED. Al, Mg, Zn, Ga, and In were not detected for Examples 1-1 to 1-10 and Comparative Examples 1-1 to 1-7 in which Treatment agent 4 was not used. Al, Mg, Zn, Ga, and In were also not detected for Examples 1-31 and 1-32 in which these elements were not contained in Treatment agent 4. The lower limit of the atomic concentration detectable in this measurement was 0.1 atm %. The position of the peak top of B s of boron in the narrow spectrum was determined to examine the state of chemical bond of boron (whether the peak was derived from B—O bond).

From the results of measurement of the concentration $B_S$ (atm %) of boron (B) and the concentration $M_S$ (atm %) of the element M2, the ratio of $M_S$ to $B_S$ ($M_S/B_S$ (atm %/atm %)) was calculated. If the element M2 is Al, its atomic concentration is also represented by $A_S$ (atm %) and its ratio is also represented by the ratio of $A_S$ to $B_S$ ($A_S/B_S$ (atm %/atm %)) in some cases.

<Inductively Coupled Plasma Atomic Emission Spectroscopy (ICP-AES)>

Using an inductively coupled plasma atomic emission spectrometer (made by SII Technology Inc., trade name "SPS5100"), the elements contained in each of the lithium titanate powders according to Examples and Comparative Examples were subjected to quantitative analysis. A sample to be measured was precisely measured, and nitric acid and hydrofluoric acid were added to the sample. The sample was sealed, and was irradiated with microwaves to be thermally decomposed. Ultrapure water was added to give a predetermined volume, and the resultant was used as a test solution. For Examples 1-1 to 1-10 and Comparative Examples 1-1 to 1-7 in which Treatment agent 4 was not used, Al, Mg, Zn, Ga, and In were not detected. Also for Examples 1-31 and 1-32 in which Al, Mg, Zn, Ga, and In were not contained in Treatment agent 4, these elements were also not detected. The lower limit of the detectable content in this measurement was 0.0001 mass %

From the results of measurement of the content $B_B$ (mass %) of boron (B) and the content $C_{M2}$ (mass %) of the element M2, the ratio of $C_{M2}$ to $B_B$ ($C_{M2}/B_B$ (mass %/mass %)) was calculated.

<Calculation of $B_S \times S$>

From the specific surface area (S) (m$^2$/g) and the atomic concentration $B_S$ (atm %) of boron (B) described above, $B_S \times S$ (atm %·m$^2$/g) was calculated.

<Atomic Concentration of M2 and Atomic Concentration of Ti in Cross-Section of Lithium Titanate Particle (Scanning Transmission Electron Microscope (STEM))>

The lithium titanate particles forming the lithium titanate powder containing the element M2 were subjected to cross-sectional analysis of the lithium titanate particles using a scanning transmission electron microscope (STEM), and the atomic concentration of M2 and the atomic concentration of Ti were measured by energy dispersive X-ray spectroscopy (EDS). The measurement was performed by the following method.

Lithium titanate particles were bonded to a dummy substrate with an epoxy resin. The substrate was cut, and was bonded to a reinforcing ring. The substrate was then subjected to grinding, dimpling, Ar ion milling, and finally carbon deposition to prepare a thin sample.

The atomic concentration of M2 and the atomic concentration of Ti at a specific position of the resulting thin sample of lithium titanate particles were measured by energy dispersive X-ray spectroscopy (EDS) as follows. While a cross-section of the thin sample was being observed at an accelerating voltage of 120 kV using a JEM-2100F field-emission transmission electron microscope (with Cs correction) made by JEOL, Ltd., the atomic concentration of M2 and the atomic concentration of Ti at an inner position of 1 nm and those at an inner position of 100 nm from the surface of the thin sample were measured using an UTW Si(Li) semiconductor detector made by JEOL, Ltd. attached to the microscope, the inner positions being located on a straight line drawn orthogonal to a tangent of the surface of the thin sample from its point of tangency. The beam diameter was 0.2 nm, namely, the analysis region was a circle having a diameter of 0.2 nm. The lower limit of the atomic concentration detectable in this measurement was 0.1 atm %.

<Measurement of Water Content by Karl-Fischer Method>

In each of the lithium titanate powders according to Examples and Comparative Examples, the water content was measured using dry nitrogen as a carrier gas in a room where the temperature was managed at 25° C. and the dew point at −20° C. or less, using a Karl Fischer aquameter (made by Hiranuma Sangyo Co., Ltd., AQ-2200) provided with a water content vaporization apparatus (made by Hiranuma Sangyo Co., Ltd. EV-2000). In each of the lithium titanate powders according to Examples and Comparative Examples, 1 g of lithium titanate powder was placed from an inlet into a cell of the water content vaporization apparatus, and the cell was covered with the lid to start the measurement. Simultaneously when the start button of the apparatus was pressed, a heater heated to 200° C. was elevated to cover the cell. The cell was held in this state for one hour. The amount of water generated from the start of measurement to the end of keeping the temperature at 200° C. was defined as the water content measured by the Karl-Fischer method (25° C. to 200° C.). Subsequently, the cell was heated from 200° C. to 350° C. in 15 minutes, and was held at 350° C. for one hour. The measurement was performed where the amount of water generated from the start of heating from 200° C. to the end of keeping the temperature at 350° C. was defined as the water content measured by the Karl-Fischer method (200° C. to 350° C.). The sum of the water content (ppm) from 25° C. to 200° C. and the water content (ppm) at 200° C. to 350° C. was calculated as the water content (ppm) from 25° C. to 350° C. (in this specification, referred to as the total water content in some cases).

<X-Ray Diffractometry>

In addition to the measurements above, each of the lithium titanate powders according to Examples and Comparative Examples was subjected to X-ray diffractometry by the following method. Specifically, the measurement apparatus used was an X-ray diffraction diffractometer (made by Rigaku Corporation, RINT-TTR-III) using CuKα radiation. X-ray diffractometry was performed under the following conditions: range of the angle for measurement (2θ): 10° to 90°, step interval: 0.02°, measurement time: 0.25 sec/step, radiation source: CuKα radiation, voltage of the tube: 40 V, and current: 300 mA.

Among diffraction peaks to be measured, the following four diffraction peaks were measured, i.e., the main peak intensity of $Li_4Ti_5O_{12}$ in the PDF card 00-049-0207 of ICDD (PDF2010) (peak intensity corresponding to the diffraction peak attributed to the (111) plane in the range of the diffraction angle 2θ of 18.1 to 18.5°), the main peak intensity of anatase titanium dioxide in the PDF card 01-070-6826 (peak intensity corresponding to the diffraction peak attributed to the (101) plane in the range of the diffraction angle 2θ of 24.7 to 25.7°), the main peak intensity of rutile titanium dioxide in the PDF card 01-070-7347 (peak intensity corresponding to the diffraction peak attributed to the (110) plane in the range of diffraction angle 2θ of 27.2 to 27.6°), and the peak intensity of $Li_2TiO_3$ in the PDF card 00-033-0831 (peak intensity corresponding to the diffraction peak attributed to the (−133) plane in the range of the diffraction angle 2θ of 43.5 to 43.8°).

The relative values of the peak intensities of anatase titanium dioxide, rutile titanium dioxide, and $Li_2TiO_3$ were calculated where the main peak intensity of $Li_4Ti_5O_{12}$ was 100. In each of the lithium titanate powders according to Examples and Comparative Examples, the sum of the relative values of the peak intensities were 5 or less, and any other phases than these crystal phases were not detected.

[Evaluation of Battery Characteristics]

Coin batteries and laminate batteries were prepared using the lithium titanate powders according to Examples and Comparative Examples, and their battery characteristics were evaluated. The results of evaluation for Examples 1-1 to 1-10 and Comparative Examples 1-1 to 1-7 are shown in Table 2, and the results of measurement for Examples 1-11 to 1-32 and Comparative Example 1-8 are shown in Table 3.

<Preparation of Negative Electrode Sheet>

Negative electrode sheets were prepared by the following method in a room in which the room temperature was managed at 25° C. and the dew point was managed at −20° C. or less. 90 mass % of each of the lithium titanate powders of Examples and Comparative Examples as an active substance, 5 mass % of acetylene black as a conductive agent, and a 5 mass % of poly(vinylidene fluoride) as a binder were mixed as described below to prepare a coating material. Poly(vinylidene fluoride) preliminarily dissolved in a 1-methyl-2-pyrrolidone solvent, acetylene black, and a 1-methyl-2-pyrrolidone solvent were mixed with a planetary agitating/defoaming apparatus, and each of the lithium titanate powders of Examples and Comparative Examples was added. These materials were adjusted to give a total solid content of 64 mass %, and were mixed with the planetary agitating/defoaming apparatus. Subsequently, a 1-methyl-2-pyrrolidone solvent was added to adjust the total solid content to 50 mass %, and was mixed with the planetary agitating/defoaming apparatus to prepare a coating material. The resulting coating material was applied onto an aluminum foil, and was dried to prepare a single-sided negative electrode sheet for a coin battery described later. The coating material was also applied onto the surface opposite to the single-sided negative electrode sheet, and was dried to prepare a double-sided negative electrode sheet for a laminate battery described later.

<Preparation of Positive Electrode Sheet>

A double-sided positive electrode sheet used in the laminate battery described later was prepared by the same method as that in Section <Preparation of negative electrode sheet> described above including the ratio of the active substance, the conductive agent, and the binder except that a lithium cobaltite powder was used as an active substance.

<Preparation of Electrolyte Solution>

An electrolyte solution used in the battery for evaluation of characteristics was prepared as follows. A nonaqueous solvent of ethylene carbonate (EC):propylene carbonate (PC):methyl ethyl carbonate (MEC):dimethyl carbonate (DMC)=10:20:20:50 (volume ratio) was prepared in an argon box managed at a temperature of 25° C. and a dew point of −70° C. or less, and $LiPF_6$ as an electrolyte salt was dissolved in this nonaqueous solvent to give a concentration of 1 M. An electrolyte solution was thereby prepared.

<Preparation of Coin Battery>

The single-sided negative electrode sheet prepared by the method described above was punched into a circular shape having a diameter of 14 mm, and was pressed under a pressure of 2 t/cm². The weight of the pressed electrode was measured. The weight of aluminum foil (8.5 mg in the circular shape having a diameter of 14 mm) was subtracted from the measured weight, and was multiplied by 90 mass % (the weight proportion of the active substance in the electrode) to calculate the weight of the active substance of the pressed electrode. Subsequently, the pressed electrode was vacuum dried at 120° C. for 5 hours to prepare an electrode for evaluation. The prepared electrode for evaluation and metal lithium (formed into a circular shape having a thickness of 0.5 mm and a diameter of 16 mm) were disposed facing each other with two layers of glass filters (GA-100 made by Advantec Co., Ltd. and GF/C made by Whatman plc) interposed therebetween. The nonaqueous electrolytic solution prepared by the method described in Section <Preparation of electrolyte solution> above was added. These materials were sealed to prepare a 2032 coin battery.

<Preparation of Laminate Battery>

A laminate battery was prepared as follows in a room managed at a room temperature of 25° C. and a dew point of −20° C. or less. The double-sided negative electrode sheet was pressed under a pressure of 2 t/cm², and was punched out to prepare a negative electrode having a lead wire connection part. The double-sided positive electrode sheet was pressed under a pressure of 2 t/cm², and was punched out to prepare a positive electrode having a lead wire connection part. The negative electrode and the positive electrode prepared were vacuum dried at 150° C. for 12 hours. The positive electrode and the negative electrode after the vacuum drying were disposed facing each other with a separator (made by Ube Industries, Ltd., UP3085) interposed therebetween, and were laminated. An aluminum foil lead wire was connected to the positive electrode and the negative electrode, and the nonaqueous electrolytic solution was added. These materials were vacuum scaled with an aluminum laminate to prepare a laminate battery for evaluation. As the capacity of the battery, the ratio of the capacity of the negative electrode to that of the positive electrode at 1000 mAh (negative electrode capacity/positive electrode capacity) was 1.1.

<Measurement of Single Electrode Capacity, Initial Charge/Discharge Efficiency, and 5 C Charge Rate>

In a thermostat at 25° C., the coin battery prepared by the method described in Section <Preparation of coin battery> above was charged to 1 V at a current density of 0.2 mA/cm² where charge was defined as a direction of Li occluded in the electrode for evaluation, and was further charged at a constant current and a constant voltage where charging was performed at 1 V until the current density of the charge current reached 0.05 mA/cm². The coin battery was then discharged at a constant current where discharging was performed to 2 V at a current density of 0.2 mA/cm². Three cycles of this charge/discharge operation were performed. The discharge capacity in the third cycle was defined as an initial capacity, and the single electrode capacity per amount of the active substance (mAh/g) (hereinafter, referred to as single electrode capacity in some cases) was determined. If the lithium titanate powder has high single electrode capacity, such a lithium titanate powder used as an electrode material for an energy storage device can increase the charge/discharge capacity of the energy storage device. The initial charge/discharge efficiency (%) was determined by dividing the discharge capacity in the first cycle by the charging capacity in the first cycle. The coin battery was then charged to 1 V at a current corresponding to 0.2 C of the initial capacity, and was discharged to 2 V at a current of 0.2 C to determine the 0.2 C charging capacity. The coin battery was then charged to 1 V at a current corresponding to 5 C of the initial capacity, and was discharged to 2 V at a current of 0.2 C to determine the 5 C charge capacity. The 5 C charge capacity was divided by the 0.2 C charge capacity to calculate the 5 C charge rate (%). If the lithium titanate powder has a high 5 C charge rate, such a lithium titanate powder used as an electrode material for an energy storage device can improve the charge rate characteristics.

<Measurement of Amount of Gas Generated at 70° C. in 100 Cycles>

In a thermostat at 25° C., the laminate battery prepared by the method described in Section <Preparation of laminate battery> above was charged at a constant current where charging was performed to 2.75 V at a current of 0.2 C, and was discharged at a constant current where discharging was performed to 1.4 V at a current of 0.2 C. Three cycles of this charge/discharge operation were repeated. Subsequently, the volume of the laminate battery was measured by an Archimedes' method, and was defined as the initial volume of the laminate battery (hereinafter, referred to as initial volume in some cases).

Next, in a thermostat at 70° C., the laminate battery was charged at a constant current where charging was performed to 2.75 V at a current of 1 C, and was discharged at a constant current where discharging was performed to 1.4 V at a current of 1 C. 100 cycles of this charge/discharge operation were repeated to perform a cycle test.

After the 100-cycle test, in a thermostat at 25° C., this laminate battery was charged at a constant current where charging was performed to 2.75 V at a current of 0.2 C, and was discharged at a constant current where discharging was performed to 1.4 V at a current of 0.2 C. Three cycles of this charge/discharge operation were repeated. Subsequently, the volume of the laminate battery was measured by the Archimedes' method, and was defined as the volume of the laminate battery after the cycle test (hereinafter, referred to as the post-cycle test volume in some cases). The initial volume was subtracted from the post-cycle test volume to determine the amount (ml) of gas generated after the 100-cycle test (in this specification, referred to as the amount of gas generated in 100 cycles at 70° C. in some cases).

Examples and Comparative Examples According to Second Embodiment

The conditions for production in Examples and Comparative Examples according to the second embodiment (embodiment in which Ln is contained as a localized element) will be summarized in Tables 4 and 5 below.

TABLE 4

Preparation of Raw Materials

| | Lithium Raw Material | | Titanium Raw Material | | Additive | | | Calcination | Calcination |
|---|---|---|---|---|---|---|---|---|---|
| | Kind | Average Particle Size [μm] | Kind | Specific Surface Area [m2/g] | Kind | Amount [mass %] | Mixing | Form | Furnance |
| Example 2-1 | Li$_2$CO$_3$ | 4.6 | anatase TiO$_2$ | 10 | | | wet bead mill | slurry | rotary furnance |
| Example 2-2 | | | | | | | | | |
| Example 2-3 | | | | | | | | | |
| Example 2-4 | | | | | | | | | |
| Example 2-5 | | | | | | | | | |
| Example 2-6 | | | | | | | | | |
| Example 2-7 | | | | | | | | | |
| Example 2-8 | | | | | | | | | |
| Example 2-9 | | | | | | | | | |
| Example 2-10 | | | | | | | | | |
| Example 2-11 | | | | | | | | | |
| Example 2-12 | | | | | | | | | |
| Comparative Example 2-1 | | | | | | | | | |
| Comparative Example 2-2 | | | | | | | | | |
| Comparative Example 2-3 | | | | | | | | | |
| Comparative Example 2-4 | | | | | | | | | |
| Comparative Example 2-5 | | | | | | | | | |
| Comparative Example 2-6 | | | | | La acetate•n-hydrate | 1.76 | | | |

| | Calcination | | Disintegration Hammer Mill Disintegration | Surface Treatment | | Heat Treatment | |
|---|---|---|---|---|---|---|---|
| | Highest Temperature | Retention Time | | Treatment Agent 2 Kind | Amount [mass %] | Temp. | Time |
| Example 2-1 | 840° C. | 30 min | done | La acetate•n-hydrate | 1.76 | 500° C. | 1 h |
| Example 2-2 | | | | | 0.88 | | |
| Example 2-3 | | | | | 5.0 | | |
| Example 2-4 | | | | | 0.44 | | |
| Example 2-5 | | | | | 10.0 | | |
| Example 2-6 | | | | | 1.76 | 400° C. | |
| Example 2-7 | | | | | 1.76 | 600° C. | |
| Example 2-8 | | | | Pr acetate•n-hydrate | 1.64 | 500° C. | |
| Example 2-9 | | | | Nd acetate•1-hydrate | 1.74 | | |
| Example 2-10 | | | | Gd acetate•4-hydrate | 1.72 | | |
| Example 2-11 | | | | Er acetate•4-hydrate | 2.14 | | |
| Example 2-12 | | | | Y acetate•4-hydrate | 1.74 | | |
| Comparative Example 2-1 | | | | | | | |
| Comparative Example 2-2 | | | | La acetate•n-hydrate | 0.22 | | |
| Comparative Example 2-3 | | | | | 15.0 | | |
| Comparative Example 2-4 | | | | | 1.76 | | |
| Comparative Example 2-5 | | | | | 1.76 | 900° C. | 1 h |
| Comparative Example 2-6 | | | | | | | |

TABLE 5

Preparation or Raw Materials

| | Lithium Raw Material | | Titanium Raw Material | | | | Calcination | | |
|---|---|---|---|---|---|---|---|---|---|
| | Kind | Average Particle Size [μm] | Kind | Specific Surface Area [m$^2$/g] | Mixing | Form | Calcination Furnance | Highest Temperature | Retention Time |
| Example 2-1 | Li$_2$CO$_3$ | 4.6 | anatase TiO$_2$ | 10 | wet bead mill | slurry | rotary furnance | 840° C. | 30 min |
| Example 2-13 | | | | | | | | | |
| Example 2-14 | | | | | | | | | |
| Example 2-15 | | | | | | | | | |
| Example 2-16 | | | | | | | | | |

TABLE 5-continued

Example 2-17
Example 2-18
Example 2-19
Example 2-20
Example 2-21
Example 2-22
Example 2-23
Example 2-24
Example 2-25
Example 2-26
Comparative Example 2-1
Comparative Example 2-7
Comparative Example 2-8

| | Disintegration Hammer Mill Disintegration | Surface Treatment | | | | Heat Treatment | |
|---|---|---|---|---|---|---|---|
| | | Treatment Agent 2 | | Treatment Agent 4 | | | |
| | | Kind | Amount [mass %] | Kind | Amount [mass %] | Temp. | Time |
| Example 2-1 | done | La acetate•n-hydrate | 1.76 | | | 500° C. | 1 h |
| Example 2-13 | | | 1.76 | Al slfate•14-18-hydrate | 0.6 | | |
| Example 2-14 | | | 1.76 | | 1.0 | | |
| Example 2-15 | | | 1.76 | | 1.6 | | |
| Example 2-16 | | | 1.76 | | 5.0 | | |
| Example 2-17 | | | 1.76 | | 10.0 | | |
| Example 2-18 | | | 0.44 | | 1.6 | | |
| Example 2-19 | | | 0.88 | | 1.6 | | |
| Example 2-20 | | | 5.0 | | 1.6 | | |
| Example 2-21 | | | 10.0 | | 1.6 | | |
| Example 2-22 | | | 0.44 | | 5.0 | | |
| Example 2-23 | | | 0.88 | | 5.0 | | |
| Example 2-24 | | | 0.44 | | 10.0 | | |
| Example 2-25 | | | 10.0 | | 1.0 | | |
| Example 2-26 | | | 1.76 | Mg sulfate•7-hydrate | 1.6 | | |
| Comparative Example 2-1 | | | | | | | |
| Comparative Example 2-7 | | | | Al sulfate•14-18-hydrate | 1.6 | | |
| Comparative Example 2-8 | | | | Mg sulfate•7-hydrate | 1.6 | | |

Example 2-1

<Step of Preparing Raw Materials>

$Li_2CO_3$ (average particle size: 4.6 μm) and anatase $TiO_2$ (specific surface area: 10 m²/g) were weighed such that the atomic ratio of Li to Ti (Li/Ti) was 0.83. A raw material powder was thereby prepared. Deionized water was added to and stirred with the raw material powder to give a raw material mixed slurry having a solid content of 40 mass %. Using a bead mill (made by Willy A. Bachofen AG, type: DYNO-MILL KD-20BC, material for the agitator: polyurethane, material for the vessel inner surface: zirconia) including a vessel 80 vol % filled with zirconia beads (outer diameter: 0.65 mm), this raw material mixed slurry was processed at an agitator circumferential speed of 13 m/s and a slurry feed rate of 55 kg/hr under control such that the vessel internal pressure was 0.02 to 0.03 MPa or less, and the raw material powder was wet mixed and milled.

<Calcination Step>

Using a rotary kiln calcination furnace (length of the furnace core tube: 4 m, diameter of the furnace core tube: 30 cm, external heating type) provided with an anti-adhesion mechanism, the resulting mixed slurry was introduced into the furnace core tube from the raw material feed zone of the calcination furnace, and was dried and calcined in a nitrogen atmosphere. In this operation, the tilt angle of the furnace core tube to the horizontal direction was 2 degrees, the rotational speed of the furnace core tube was 20 rpm, and the flow rate of nitrogen introduced from the calcinated product recovery zone into the furnace core tube was 20 L/min. The heating temperature of the furnace core tube was 900° C. in the raw material feed zone, 900° C. in the central zone, and 900° C. in the calcinated product recovery zone. The retention time of the calcinated product at 900° C. was 30 minutes.

<Disintegration Step>

The calcinated product recovered from the calcinated product recovery zone of the furnace core tube was disintegrated at a screen opening of 0.5 mm, the number of rotations of 8,000 rpm, and a powder feed rate of 25 kg/hr using a hammer mill (made by DALTON CORPORATION, AIIW-5).

<Surface Treatment Step>

Deionized water was added to and stirred with the calcined powder subjected to disintegration, and was stirred to give a slurry having a solid content of 30 mass %. Then, lanthanum acetate (lanthanum acetate-n-hydrate, n=0.5 to 4.0 (the same applies below)) as Treatment agent 2 was added in the amount of 1.76 mass % of the calcined powder subjected to disintegration to prepare a mixed slurry. While being stirred, this mixed slurry was heated to 100° C. to be dried. The dried powder was placed into an alumina sagger, and was subjected to a heat treatment at 500° C. for one hour in a mesh belt conveying-type continuous furnace. The powder after the heat treatment was sieved with a sieve (mesh size: 45 μm) to yield a lithium titanate powder according to Example 2-1.

Examples 2-2 to 2-5

Lithium titanate powders according to Examples 2-2 to 2-5 were produced in the same manner as in Example 2-1 except that the amount of lanthanum acetate (lanthanum acetate-n-hydrate) added as Treatment agent 2 in the surface treatment step was varied as shown in Table 4.

Examples 2-6 and 2-7

Lithium titanate powders according to Examples 2-6 and 2-7 were produced in the same manner as in Example 2-1 except that the temperature for the heat treatment in the surface treatment step was varied as shown in Table 4.

Examples 2-8 to 2-12

Lithium titanate powders according to Examples 2-8 to 2-12 were produced in the same manner as in Example 2-1 except that instead of lanthanum acetate (lanthanum acetate.n-hydrate), Treatment agent 2 added in the surface treatment step and the amount thereof added were varied as shown in Table 4.

Example 2-13

Deionized water was added to and stirred with the calcined powder prepared in the same manner as in Example 2-1 and subjected to disintegration to give a slurry having a solid content of 30 mass %. Then, lanthanum acetate (lanthanum acetate-n-hydrate) as Treatment agent 2 and aluminum sulfate (aluminum sulfate-tetradeca- to octadecahydrate) as Treatment agent 4 were simultaneously added in the amounts, respectively, of 1.76 mass % and 0.6 mass % of the calcined powder subjected to disintegration to prepare a mixed slurry. A lithium titanate powder according to Example 2-13 was produced in the same manner as in Example 2-1 thereafter.

Examples 2-14 to 2-25

Lithium titanate powders according to Examples 2-14 to 2-25 were produced in the same manner as in Example 2-13 except that the amount of lanthanum acetate (lanthanum acetate-n-hydrate) as Treatment agent 2 added and the amount of aluminum sulfate (aluminum sulfate-tetradeca- to octadecahydrate) as Treatment agent 4 were varied as shown in Table 5 in the surface treatment step.

Example 2-26

A lithium titanate powder according to Example 2-26 was produced in the same manner as in Example 2-13 except that instead of aluminum sulfate (aluminum sulfate-tetradeca- to octadecahydrate), Treatment agent 4 added and the amount thereof were varied as shown in Table 5.

Comparative Example 2-1

A lithium titanate powder according to Comparative Example 2-1 was produced in the same manner as in Example 2-1 except that any additive was not added in the surface treatment step.

Comparative Examples 2-2 and 2-3

Lithium titanate powders according to Comparative Examples 2-2 and 2-3 were produced in the same manner as in Example 2-1 except that the amount of lanthanum acetate (lanthanum acetate-n-hydrate) as Treatment agent 2 added in the surface treatment step was varied as shown in Table 4.

Comparative Examples 2-4 and 2-5

Lithium titanate powders according to Comparative Examples 2-4 and 2-5 were produced in the same manner as in Example 2-1 except that the temperature for the heat treatment in the surface treatment step was varied as shown in Table 4.

Comparative Example 2-6

A lithium titanate powder according to Comparative Example 2-6 was produced in the same manner as in Example 2-1 except that a raw material mixed slurry containing an additive in an amount as shown in Table 4 was used in the step of preparing raw materials, and the surface treatment step was not performed.

Comparative Examples 2-7 and 2-8

Lithium titanate powders according to Comparative Examples 2-7 and 2-8 were produced in the same manner as in Example 2-1 except that only Treatment agent 4 shown in Table 5 was added in the surface treatment step.

[Measurement of Powder Physical Properties]

A variety of physical properties of the lithium titanate powders according to Examples 2-1 to 2-26 and Comparative Examples 2-1 to 2-8 (hereinafter, referred to as each of the lithium titanate powders according to Examples and Comparative Examples in some cases) were measured as follows. The results of measurement for Examples 2-1 to 2-12 and Comparative Examples 2-1 to 2-6 are shown in Table 6, and the results of measurement for Example 2-13 to 2-26 and Comparative Examples 2-7 and 2-8 with those for Example 2-1 and Comparative Example 2-1 are shown in Table 7.

<Measurement of Specific Surface Area>

In the lithium titanate powders according to Examples and Comparative Examples, the specific surface area ($m^2/g$) was measured in the same manner as for Examples and Comparative Examples according to the first embodiment described above.

<Inductively Coupled Plasma Atomic Emission Spectroscopy (ICP-AES)>

Using an inductively coupled plasma atomic emission spectrometer (made by SII Technology Inc., trade name "SPS5100"), the measurement was performed in the same manner as in Examples and Comparative Examples according to the first embodiment described above. For Examples 2-1 to 2-12 and Comparative Examples 2-1 to 2-6 in which Treatment agent 4 was not used, the element M2 was not detected (the lower limit of the detectable quantity was 0.001 mass %). From the results of measurement of the content $C_{M2}$ (mass %) of the element M2 and the content $C_{Ln}$ (mass %) of the element Ln, the ratio of $C_{M2}$ to $C_{Ln}$ ($C_{M2}/C_{Ln}$ (mass %/mass %)) was calculated.

<Measurement of Water Content by Karl-Fischer Method>

In each of the lithium titanate powders according to Examples and Comparative Examples, the water content was measured in the same manner as for Examples and Comparative Examples according to the first embodiment described above. The water content at 25° C. to 200° C. in Example 2-1 was 467.1 ppm, and the water content at 200° C. to 350° C. was 173.1 ppm.

<X-Ray Diffractometry>

In addition to the measurements above, X-ray diffractometry was performed on each of the lithium titanate powders according to Examples and Comparative Examples by the same method as that for Examples and Comparative Examples according to the first embodiment described above. The relative values of the peak intensities of anatase titanium dioxide, rutile titanium dioxide, and $Li_2TiO_3$ were calculated where the main peak intensity of $Li_4Ti_5O_{12}$ was 100. In each of the lithium titanate powders according to Examples and Comparative Examples, the sum of the relative values of the peak intensities were 5 or less, and any other phases than these crystal phases were not detected.

<Atomic Concentrations of Ln and Ti in Cross-Section of Lithium Titanate Particle (Scanning Transmission Electron Microscope (STEM))>

The lithium titanate particles forming lithium titanate powder containing Ln were subjected to the cross-sectional analysis of lithium titanate particles using a scanning transmission electron microscope (STEM), and the atomic concentration of Ln and the atomic concentration of Ti were measured by energy dispersive X-ray spectroscopy (EDS). The measurement was performed by the following method.

Lithium titanate particles were bonded to a dummy substrate with an epoxy resin. The substrate was cut, and was bonded to a reinforcing ring. The substrate was then subjected to grinding, dimpling, Ar ion milling, and finally carbon deposition to prepare a thin sample.

The atomic concentration of Ln and the atomic concentration of Ti at a specific position of the resulting thin sample of lithium titanate particles were measured by energy dispersive X-ray spectroscopy (EDS) as follows. While a cross-section of the thin sample was being observed at an accelerating voltage of 120 kV using a JEM-2100F field-emission transmission electron microscope (with Cs correction) made by JEOL, Ltd., the atomic concentration of Ln and the atomic concentration of Ti at an inner position of 1 nm and an inner position of 100 nm from the surface of the thin sample were measured using an UTW Si(Li) semiconductor detector made by JEOL, Ltd. attached to the microscope, the inner positions being located on a straight line drawn orthogonal to a tangent of the surface of the thin sample from its point of tangency. The beam diameter was 0.2 nm, namely, the region for analysis was a circle having a diameter of 0.2 nm. The lower limit of the detectable quantity in this measurement was 0.5 atm %. From the result, the value of D1/Dti was calculated.

<X-Ray Photoelectron Spectroscopy (XPS)>

In Examples 2-1 and 2-15, X-ray photoelectron spectroscopy (XPS) was performed using a scanning X-ray photoelectron spectrometer (ULVAC-PHI, INCORPORATED, PHI5000 Versaprobe III). An X-ray source used was monochromatic AlKα at 500 W. In Example 2-15, the X-ray source used was monochromatic MgKα at 500 W to measure Al. Each of the lithium titanate powders according to Examples 2-1 and 2-15 was placed on a sample holder into a flat and uniform shape of Φ5 mm, and the elements present on the surface of each of the lithium titanate powders according to Examples 2-1 and 2-15 were analyzed where the region for analysis was 0.4×0.4 mm$^2$ and the photoelectron take-off angle was 45 degrees. The results of measurement were corrected such that the peak of Ti2p3 was 458.8 eV. Smoothing was performed by a Savitzky-Golay method with 11 points, and background correction used was a Shirley method. Peak areas were determined from the narrow spectra (832 to 842 eV for lanthanum (La3d5/2) and 113 to 128 eV for aluminum (Al2s)) of all the elements detected in the wide spectrum, and the surface atomic concentration (atm %) of each element was calculated using a relative sensitivity factor specified by ULVAC-PHI, INCORPORATED. Al was not detected for Example 2-1 in which Treatment agent 4 was not used. The position of the peak top of La3d5/2 in the narrow spectrum of lanthanum was determined to examine the chemically bonded state of lanthanum.

<Atomic Concentration of M2 in Cross-Section of Lithium Titanate Particle (Scanning Transmission Electron Microscope (STEM))>

By the same methods as those for Examples and Comparative Examples according to the first embodiment described above, the lithium titanate particles according to Example 2-15 were subjected to the cross-sectional analysis of the lithium titanate particles using a scanning transmission electron microscope (STEM), and the atomic concentration of M2 was measured by energy dispersive X-ray spectroscopy (EDS).

[Evaluation of Battery Characteristics]

Coin batteries and laminate batteries were prepared using the lithium titanate powders according to Examples and Comparative Examples, and their battery characteristics were evaluated. The results of evaluation for Examples 2-1 to 2-12 and Comparative Examples 2-1 to 2-6 are shown in Table 6, and the results of measurement for Example 2-13 to 2-26 and Comparative Examples 2-7 and 2-8 with those for Example 2-1 and Comparative Example 2-1 are shown in Table 7.

The results of X-ray photoelectron spectroscopy (XPS) and the results of measurement

TABLE 6

| | Physical Properties of Powder | | | | | |
|---|---|---|---|---|---|---|
| | BET | Element Ln | | | | |
| | Specific Surface Area S [m$^2$/g] | Kind | Total Content $C_{Ln}$ (ICP) [mass %] | Ln/Ti (ICP) [molar ratio] | Surface Ti Concentration Dti (TEM) [atm %] | Surface Ln/Ti D1/Dti (TEM) [atm %] |
| Example 2-1 | 5.5 | La | 0.68 | 0.0046 | 22.6 | 0.50 |
| Example 2-2 | 5.7 | La | 0.32 | 0.0022 | 18.4 | 0.34 |
| Example 2-3 | 5.4 | La | 2.0 | 0.0 | 38.4 | 0.50 |
| Example 2-4 | 5.7 | La | 0.17 | 0.0011 | 13.9 | 0.22 |
| Example 2-5 | 5.3 | La | 3.87 | 0.0266 | 49.8 | 0.53 |
| Example 2-6 | 5.3 | La | 0.69 | 0.0046 | 24.6 | 0.46 |
| Example 2-7 | 5.5 | La | 0.68 | 0.0046 | 21.5 | 0.50 |
| Example 2-8 | 5.2 | Pr | 0.69 | 0.0045 | 21.8 | 0.51 |
| Example 2-9 | 5.3 | Nd | 0.71 | 0.0048 | 20.7 | 0.52 |
| Example 2-10 | 5.6 | Gd | 0.75 | 0.0046 | 21.0 | 0.52 |
| Example 2-11 | 5.1 | Er | 0.82 | 0.0045 | 22.1 | 0.52 |
| Example 2-12 | 5.2 | Y | 0.43 | 0.0047 | 21.9 | 0.60 |
| Comparative Example 2-1 | 6.0 | undetected | undetected | undetected | 25.2 | undetected/25.2 |
| Comparative Example 2-2 | 5.8 | La | 0.07 | 0.0005 | 18.9 | 0.07 |
| Comparative Example 2-3 | 5.0 | La | 5.76 | 0.0395 | 50.3 | 0.63 |

TABLE 6-continued

| | | | | | | |
|---|---|---|---|---|---|---|
| Comparative Example 2-4 | 5.8 | La | 0.71 | 0.0047 | 2.8 | 2.11 |
| Comparative Example 2-5 | 2.8 | La | 0.66 | 0.0046 | 20.1 | 0.52 |
| Comparative Example 2-6 | 5.8 | La | 0.67 | 0.0046 | 25.1 | undetected/25.1 |

| | Physical Properties of Powder Element Ln | | Battery Characteristics | | | |
|---|---|---|---|---|---|---|
| | Atomic Concentration (Surface of Particle) D1 [atm %] | Atomic Concentration (Inside of Particle) D2 [atm %] | Charge capacity [mAh/g] | Amount of Gas Generated at 70° C. in 200 Cycles [ml] | | |
| | | | | $H_2$ | Organic Gas | All Gases |
| Example 2-1 | 11.2 | undetected | 169.5 | 3.12 | 3.91 | 7.03 |
| Example 2-2 | 6.3 | undetected | 170.2 | 3.21 | 4.65 | 7.86 |
| Example 2-3 | 19.7 | undetected | 165.2 | 2.31 | 2.65 | 4.96 |
| Example 2-4 | 3.1 | undetected | 170.6 | 3.66 | 5.01 | 8.67 |
| Example 2-5 | 26.4 | undetected | 158.4 | 2.14 | 2.32 | 4.46 |
| Example 2-6 | 11.3 | undetected | 169.7 | 3.73 | 3.53 | 7.26 |
| Example 2-7 | 10.7 | undetected | 169.5 | 3.45 | 4.54 | 7.99 |
| Example 2-8 | 11.1 | undetected | 169.6 | 2.72 | 3.89 | 6.61 |
| Example 2-9 | 10.8 | undetected | 169.6 | 2.84 | 4.03 | 6.87 |
| Example 2-10 | 10.9 | undetected | 169.6 | 2.83 | 4.00 | 6.83 |
| Example 2-11 | 11.4 | undetected | 169.2 | 2.74 | 4.02 | 6.76 |
| Example 2-12 | 11.0 | undetected | 169.6 | 2.88 | 3.99 | 6.87 |
| Comparative Example 2-1 | undetected | undetected | 170.6 | 4.62 | 5.54 | 10.16 |
| Comparative Example 2-2 | 1.1 | undetected | 170.8 | 4.68 | 5.33 | 10.01 |
| Comparative Example 2-3 | 31.5 | undetected | 138.7 | 2.08 | 2.27 | 4.35 |
| Comparative Example 2-4 | 5.9 | undetected | 161.5 | 7.88 | 3.07 | 10.95 |
| Comparative Example 2-5 | 10.4 | undetected | 142.7 | 3.69 | 4.44 | 8.13 |
| Comparative Example 2-6 | undetected | undetected | 169.9 | 3.72 | 5.55 | 9.27 |

TABLE 7

| | Physical Properties of Powder | | | | | | | |
|---|---|---|---|---|---|---|---|---|
| | BET Specific Surface Area S [m²/g] | Element Ln | | | | | | |
| | | Kind | Total Content $C_{Ln}$ (ICP) [mass %] | Ln/Ti (ICP) [molar ratio] | Surface Ti Concentration Dti (TEM) [atm %] | Surface Ln/Ti D1/Dti (TEM) [atm %] | Atomic Concentration (Surface of Particle) D1 [atm %] | Atomic Concentration (Inside of Particle) D2 [atm %] |
| Example 2-1 | 5.5 | La | 0.68 | 0.0046 | 22.6 | 0.50 | 11.2 | undetected |
| Example 2-13 | 5.4 | La | 0.68 | 0.0046 | 22.6 | 0.50 | 11.2 | undetected |
| Example 2-14 | 5.4 | La | 0.68 | 0.0046 | 22.7 | 0.49 | 11.2 | undetected |
| Example 2-15 | 5.5 | La | 0.67 | 0.0046 | 23.1 | 0.49 | 11.4 | undetected |
| Example 2-16 | 5.5 | La | 0.68 | 0.0046 | 22.8 | 0.47 | 10.8 | undetected |
| Example 2-17 | 5.6 | La | 0.68 | 0.0046 | 22.4 | 0.48 | 10.8 | undetected |
| Example 2-18 | 5.6 | La | 0.32 | 0.0022 | 18.8 | 0.34 | 6.3 | undetected |
| Example 2-19 | 5.5 | La | 0.17 | 0.0011 | 14.0 | 0.22 | 3.1 | undetected |
| Example 2-20 | 4.7 | La | 1.86 | 0.0132 | 38.8 | 0.51 | 19.7 | undetected |
| Example 2-21 | 4.3 | La | 3.55 | 0.0266 | 49.2 | 0.54 | 26.4 | undetected |
| Example 2-22 | 5.1 | La | 0.16 | 0.0011 | 13.6 | 0.23 | 3.1 | undetected |
| Example 2-23 | 5.2 | La | 0.32 | 0.0022 | 18.1 | 0.35 | 6.3 | undetected |
| Example 2-24 | 5.3 | La | 0.17 | 0.0011 | 13.4 | 0.22 | 3.0 | undetected |
| Example 2-25 | 4.3 | La | 3.57 | 0.0276 | 49.6 | 0.54 | 26.8 | undetected |
| Example 2-26 | 5.6 | La | 0.67 | 0.0046 | 22.9 | 0.49 | 11.3 | undetected |
| Comparative Example 2-1 | 6.0 | undetected | undetected | undetected | 25.2 | undetected/25.2 | undetected | undetected |
| Comparative Example 2-7 | 6.1 | undetected | undetected | undetected | 25.1 | undetected/26.1 | undetected | undetected |
| Comparative Example 2-8 | 5.9 | undetected | undetected | undetected | 25.8 | undetected/25.8 | undetected | undetected |

TABLE 7-continued

| | Physical Properties of Powder | | | Battery Characteristics | | | |
|---|---|---|---|---|---|---|---|
| | Element M2 | | M2/Ln Element Concentration Ratio (ICP) | | Amount of Gas Generated at 70° C. in 200 Cycles [ml] | | |
| | Kind | $C_{M2}$ [mass %] | $C_{M2}/C_{Ln}$ [mass %/mass %] | Discharge Capacity [mAh/g] | $H_2$ | Organic Gas | All Gases |
| Example 2-1 | undetected | undetected | undetected | 169.5 | 3.12 | 3.91 | 7.03 |
| Example 2-13 | Al | 0.05 | 0.07 | 169.5 | 2.66 | 3.61 | 6.27 |
| Example 2-14 | Al | 0.07 | 0.10 | 169.5 | 2.69 | 3.48 | 6.17 |
| Example 2-15 | Al | 0.14 | 0.21 | 169.7 | 2.68 | 3.11 | 5.79 |
| Example 2-16 | Al | 0.44 | 0.65 | 166.8 | 3.01 | 2.86 | 5.87 |
| Example 2-17 | Al | 0.83 | 1.22 | 167.2 | 3.21 | 2.68 | 5.89 |
| Example 2-18 | Al | 0.14 | 0.44 | 170.3 | 3.16 | 4.02 | 7.18 |
| Example 2-19 | Al | 0.15 | 0.88 | 170.6 | 3.48 | 4.33 | 7.81 |
| Example 2-20 | Al | 0.14 | 0.08 | 163.1 | 2.35 | 2.22 | 4.57 |
| Example 2-21 | Al | 0.16 | 0.05 | 160.1 | 2.14 | 2.03 | 4.17 |
| Example 2-22 | Al | 0.44 | 2.75 | 169.9 | 3.88 | 3.12 | 7.00 |
| Example 2-23 | Al | 0.44 | 1.38 | 169.8 | 3.33 | 2.98 | 6.31 |
| Example 2-24 | Al | 0.82 | 4.82 | 168.9 | 3.92 | 3.58 | 7.50 |
| Example 2-25 | Al | 0.07 | 0.02 | 159.8 | 2.33 | 2.31 | 4.64 |
| Example 2-26 | Mg | 0.44 | 0.66 | 169.3 | 2.88 | 3.28 | 6.16 |
| Comparative Example 2-1 | undetected | undetected | undetected/undetected | 171.1 | 4.62 | 5.54 | 10.16 |
| Comparative Example 2-7 | Al | 0.14 | 0.14/undetected | 170.9 | 4.71 | 4.92 | 9.63 |
| Comparative Example 2-8 | Mg | 0.14 | 0.14/undetected | 170.4 | 4.66 | 4.89 | 9.55 |

TABLE 8

| | Physical Properties of Powder | | | | | | | | | | |
|---|---|---|---|---|---|---|---|---|---|---|---|
| | XPS | | | | | | | | | | TEM Element Ln Atomic Concentration (Surface of Particle) |
| | Element Ln | | | | Metal Element M2 | | | M2/Ln | | | |
| | Kind | Spectrum Orbital | Peak Top [eV] | Concentration CS1 [atm %] | Kind | Spectrum Orbital | Peak Top [eV] | Concentration [atm %] | [atm %/atm %] | $C_{g1} \times S$ | Kind | D1 [atm %] |
| Example 2-1 | La | 3d5/2 | 835, 839 | 3.5 | — | — | — | — | — | 19 | La | 11.2 |
| Example 2-15 | La | 3d5/2 | 835, 839 | 2.9 | Al | Al2s | 119 | 1.5 | 0.52 | 16 | La | 11.4 |

| | Physical Properties of Powder TEM | | | | | |
|---|---|---|---|---|---|---|
| | Element Ln | Metal Element M2 | | | Atomic | |
| | Atomic Concentration (Inside of Particle) D2 [atm %] | Kind | Atomic Concentration (Surface of Particle) F1 [atm %] | Atomic Concentration (Inside of Particle) F2 [atm %] | Ti Surface Ti Concentration [atm %] | Concentration Ratio (Surface of Particle/Inside of Particle) D1/D2 | Atomic Concentration Ratio to Ti (Surface of Particle) D1/D6 |
| Example 2-1 | undetected | — | — | — | 22.8 | 11.2/undetected | 0.50 |
| Example 2-15 | undetected | Al | 5.4 | undetected | 23.1 | 11.4/undetected | 0.48 |

<Preparation of Negative Electrode Sheet>

Negative electrode sheets were prepared by the same method as that for Examples and Comparative Examples according to the first embodiment described above.

<Preparation of Positive Electrode Sheet>

Positive electrode sheets were prepared by the same method as that for Examples and Comparative Examples according to the first embodiment described above.

<Preparation of Electrolyte Solution>

An electrolyte solution used in the batteries for evaluation of characteristics was prepared as follows. A nonaqueous solvent of ethylene carbonate (EC), propylene carbonate (PC), diethyl ethyl carbonate (DEC), and dimethyl carbonate (DMC) was prepared in the proportion described later in an argon box managed at a temperature of 25° C. and a dew point of −70° C. or less. An electrolyte salt $LiPF_6$ was dissolved in this nonaqueous solvent to prepare an electrolyte solution.

<Preparation of Coin Battery>

The single-sided negative electrode sheet prepared by the method described above was punched into a circular shape having a diameter of 14 mm, and was pressed under a pressure of 2 t/cm². The weight of the pressed electrode was measured. The weight of aluminum foil (8.5 mg in the circular shape having a diameter of 14 mm) was subtracted from the measured weight, and was multiplied by 90 mass % (the weight proportion of the active substance in the electrode) to calculate the weight of the active substance of the pressed electrode. Subsequently, the pressed electrode was vacuum dried at 120° C. for 5 hours to prepare an electrode for evaluation. The prepared electrode for evaluation and metal lithium (formed into a circular shape having a thickness of 0.5 mm and a diameter of 16 mm) were disposed facing each other with two layers of glass filters (GA-100 made by Advantec Co., Ltd. and GF/C made by Whatman plc) interposed therebetween. A nonaqueous electrolytic solution of 1.0 M $LiPF_6$ dissolved in a nonaqueous solvent of propylene carbonate (PC):dimethyl carbonate (DMC)=1:2 (volume proportion) prepared by the method described in Section <Preparation of electrolyte solution> above was added. These materials were sealed to prepare a 2032 coin battery.

<Preparation of Laminate Battery>

A laminate battery was prepared in a room in which the room temperature was managed at 25° C. and the dew point was managed to −40° C. or less. The double-sided negative electrode sheet was pressed under a pressure of 2 t/cm², and a negative electrode having a lead wire connection part was prepared. The double-sided positive electrode sheet was pressed under a pressure of 2 t/cm², and a positive electrode having a lead wire connection part was prepared. The prepared negative electrode and positive electrode were vacuum dried at 150° C. for 12 hours. The positive electrode and the negative electrode after the vacuum drying were disposed facing each other with a separator (made by Ubc Industries, Ltd., UP3085) interposed therebetweecn, and were laminated. An aluminum foil lead wire was connected to the positive electrode and the negative electrode. The nonaqueous electrolytic solution of 1.3 M $LiPF_6$ dissolved in the nonaqueous solvent of ethylene carbonate (EC):diethyl carbonate (DEC)=1:2 (volume proportion) prepared by the method described in Section <Preparation of electrolyte solution> above was added. These materials were vacuum sealed with an aluminum laminate to prepare a laminate battery for evaluation. As the capacity of the battery, the ratio of the capacity of the negative electrode to that of the positive electrode at 1000 mAh (negative electrode capacity/positive electrode capacity) was 1.1.

<Measurement of Discharge Capacity>

The single electrode capacity was evaluated in a thermostat at 25° C. using the coin batteries prepared by the method described in Section <Preparation of coin battery> above. Charge was defined as a direction of Li occluded in the electrode for evaluation, and discharge was defined as a direction of Li released from the electrode for evaluation. As a pre-treatment of the electrodes, two cycles of the following charge/discharge operation were repeated: Charge at a constant current and a constant voltage was performed by charging each battery to 1 V at a current density of 0.2 mA/cm², and further charging the battery at 1 V until the current density of the charge current density reached 0.05 mA/cm²; and then, discharge at a constant current was performed by discharging the battery to 2 V at a current density of 0.2 mA/cm.

The battery was then charged to 1 V at a current of 1.0 C of the capacity determined in the pre-treatment, and was discharged to 2 V at a current of 1.0 C to determine the discharge capacity. A larger capacity at 1.0 C indicates higher battery performance.

<Measurement of Amount of Gas Generated at 70° C. in 200 Cycles>

In each of the laminate batteries prepared by the method described in Section <Preparation of laminate battery> above, the volume thereof was measured by an Archimedes' method at room temperature. Three cycles of the following charge/discharge operation were repeated in a thermostat at 70° C.: Charge at constant current was performed by charging the battery to 2.2 V at a current of 0.2 C of a designed capacity, and then discharge at a constant current was performed by discharging the battery to 1.5 V at a current of 0.2 C.

Next, in a thermostat at 70° C., charge at a constant current was performed by charging the battery to 2.2 V at a current of 1.0 C, and discharge at a constant current was performed by discharging the battery to 1.5 V at a current of 1.0 C. 200 cycles of this charge/discharge operation was repeated to perform a cycle test.

After the 200-cycle test, the volume of the laminate battery was measured by the Archimedes' method, and was defined as the volume of the laminate battery after the cycle test (hereinafter, referred to as the post-cycle test volume in some cases). The initial volume was subtracted from the post-cycle test volume to determine the amount (ml) of gas generated after the 200-cycle test (in this specification, referred to as the amount of gas generated in the 200 cycles at 70° C. in some cases). Hereinafter, the amount of gas determined by the Archimedes' method is defined as the total gas amount.

Using a capillary gas chromatograph (made by SHIMADZU Corporation, trade name "GC-2010 Plus"), the generated gas was subjected to compositional analysis. The calibration curve was created using five standard gases (made by GL Sciences Inc., "methane: 1.99%, carbon monoxide: 1.98%, carbon dioxide: 3.01%, (balance gas: nitrogen)"; "methane: 1.07%, ethane: 1.02%, propane: 1.03%, normal butane: 1.05%, isobutane: 1.02%, carbon dioxide: 1.02% (balance gas: nitrogen)"; "ethane: 1.01%, propane: 1.02%, propylene: 1.05%, normal butane: 1.02%, isobutane: 1.02%, ethylene: 1.00% (balance gas: nitrogen)"; "hydrogen: 21.1%, methane: 19.8%, carbon dioxide: 10.7% (balance gas: nitrogen)"; and "pure hydrogen: 99.99%") and air. Assuming that the kinds of gas above were all the gases generated, compositional analysis was performed. From the determined compositional proportion, the amount of hydrogen gas contained in the total gas amount and those of organic gases (other than hydrogen gas) generated were calculated.

Example 2-27

The lithium titanate powder according to Example 2-3 was used, and a porous aluminum was used as a current collector, rather than the aluminum foil, in Section <Preparation of negative electrode sheet> in [Evaluation of battery characteristics]. A porous aluminum current collector (porosity: 91%, pore diameter: 300 µm) was immersed into a slurry prepared under the same condition as described above, and the pressure was reduced (−0.1 MPa). After the immersion, excess slurry adhering to the front and rear surfaces of the porous aluminum current collector was removed with a scraper made of silicon rubber, and the porous aluminum current collector was dried to prepare a porous aluminum current collector negative electrode. In Section <Preparation of coin battery>, pressing was performed under a pressure of 0.8 t/cm² rather than 2 t/cm². The negative electrode density was calculated by subtracting only the mass of the current collector (circular shape having a diameter of 14 mm, 37 mg) rather than the thickness and the mass of the current collector (circular shape having a diameter of 14 mm, 20 jam, 8.5 mg). Except for that, [Evaluation of battery characteristics] was performed in the same manner as in Example 2-1.

Example 2-28

A coin battery and a laminate battery were prepared in the same manner as in Example 2-27 except that that the lithium titanate powder according to Example 2-5 was used, and their battery characteristics were evaluated.

The results of measurement for Examples 2-27 and 2-28 with those for Examples 2-3 and 2-5 are shown in Table 9.

TABLE 9

|  | Lithium Titanate Powder Used | Current Collector | Battery Characteristics | | | |
|---|---|---|---|---|---|---|
|  |  |  | Discharge Capacity [mAh/g] | Amount of Gas Generated at 70° C. in 200 Cycles [ml] | | |
|  |  |  |  | $H_2$ | Organic Gas | All Gases |
| Example 2-3 | Example 2-3 | Al Foil | 165.2 | 2.31 | 2.65 | 4.96 |
| Example 2-5 | Example 2-5 | Al Foil | 158.4 | 2.14 | 2.32 | 4.46 |
| Example 2-27 | Example 2-3 | Porous Al | 168.3 | 2.36 | 2.69 | 5.05 |
| Example 2-28 | Example 2-5 | Porous Al | 161.9 | 2.22 | 2.28 | 4.50 |

<Evaluation>

The electrodes (Examples 2-1 to 2-26, and Examples 2-27 and 2-28) comprising the lithium titanate powders according to Examples 2-1 to 2-26 had large charge/discharge capacity while the generation of gas during the operation at high temperature was prevented. In contrast, use of the lithium titanate powder not containing Ln (Comparative Examples 2-1, 2-7, and 2-8), the lithium titanate powder having an excessively low content of Ln (Comparative Example 2-2), the lithium titanate powder having a value of D1/Dti of more than 2.0 (Comparative Example 2-4), and the lithium titanate powder in which Ln was undetectable on the surfaces of the particles (Comparative Example 2-6) resulted in a large amount of gas generated during operation at high temperature. Moreover, use of a lithium titanate powder having a high content of Ln (Comparative Example 2-3) reduced the charge/discharge capacity. Use of a lithium titanate powder having a specific surface area of less than 4 $m^2/g$ (Comparative Example 2-5) resulted in a reduced charge/discharge capacity and an increased amount of gas generated during operation at high temperature.

Examples and Comparative Examples According to Third Embodiment

The conditions for production in Examples and Comparative Examples according to the third embodiment (embodiment in which M1 is contained as a localized element) are summarized in Tables 10, 11, and 12 below.

TABLE 10

| | Preparation of Raw Materials | | | | | | | | | |
|---|---|---|---|---|---|---|---|---|---|---|
| | Lithium Raw Materia | | Titanium Raw Material | | Additive | | | | Calcination | |
| | Kind | Average Particle Size [μm] | Kind | Specific Surface Area [$m^2$/g] | Kind | Amount [mass %] | Mixing | Form | Calcination Furnance | Highest Tempature |
| Example 3-1 | $Li_2CO_3$ | 4.6 | anatase $TiO_2$ | 10 | | | wet bead mill | slurry | rotary furnance | 840° C. |
| Example 3-2 | | | | | | | | | | |
| Example 3-3 | | | | | | | | | | |
| Example 3-4 | | | | | | | | | | |
| Example 3-5 | | | | | | | | | | |
| Example 3-6 | | | | | | | | | | |
| Example 3-7 | | | | | | | | | | |
| Example 3-8 | | | | | | | | | | |
| Example 3-9 | | | | | | | | | | |
| Example 3-10 | | | | | | | | | | |
| Example 3-11 | | | | | | | | | | |
| Example 3-12 | | | | | | | | | | |
| Example 3-13 | | | | | | | | | | |
| Example 3-14 | | | | | | | | | | |
| Example 3-15 | | | | | | | | | | |
| Example 3-16 | | | | | | | | | | |
| Example 3-17 | | | | | | | | | | |
| Example 3-18 | | | | | | | | | | |
| Comparative Example 3-1 | | | | | | | | | | |
| Comparative Example 3-2 | | | | | | | | | | |
| Comparative Example 3-3 | | | | | | | | | | |
| Comparative Example 3-4 | | | | | | | | | | |
| Comparative Example 3-5 | | | | | | | | | | |
| Comparative Example 3-6 | | | | | | | | | | |
| Comparative Example 3-7 | | | | | | | | | | |
| Comparative Example 3-8 | | | | | | | | | | |
| Comparative Example 3-9 | | | | | | | | | | |

TABLE 10-continued

|  | Calcination Retention Time | Disintegration Hammer Mill Disintegration | Surface Treatment Treatment Agent 3 | | Heat Treatment | |
|---|---|---|---|---|---|---|
|  |  |  | Kind | Amount [mass %] | Temperature | Time |
| Example 3-1 | 30 min | done | Li$_2$MoO$_2$ | 0.91 | 500° C. | 1 h |
| Example 3-2 |  |  |  | 0.46 |  |  |
| Example 3-3 |  |  |  | 2.7 |  |  |
| Example 3-4 |  |  |  | 0.23 |  |  |
| Example 3-5 |  |  |  | 4.6 |  |  |
| Example 3-6 |  |  |  | 0.91 | 300° C. | 1 h |
| Example 3-7 |  |  |  | 0.91 | 400° C. |  |
| Example 3-8 |  |  |  | 0.91 | 600° C. |  |
| Example 3-9 |  |  |  | 0.91 | 700° C. |  |
| Example 3-10 |  |  | Li$_2$WO$_4$ | 1.37 | 500° C. | 1 h |
| Example 3-11 |  |  |  | 0.68 |  |  |
| Example 3-12 |  |  |  | 4.1 |  |  |
| Example 3-13 |  |  |  | 0.34 |  |  |
| Example 3-14 |  |  |  | 6.9 |  |  |
| Example 3-15 |  |  |  | 1.37 | 300° C. | 1 h |
| Example 3-16 |  |  |  | 1.37 | 400° C. |  |
| Example 3-17 |  |  |  | 1.37 | 600° C. |  |
| Example 3-18 |  |  |  | 1.37 | 700° C. |  |
| Comparative Example 3-1 |  |  |  |  |  |  |
| Comparative Example 3-2 |  |  | Li$_2$MoO$_4$ | 0.06 | 500° C. | 1 h |
| Comparative Example 3-3 |  |  |  | 9.2 |  |  |
| Comparative Example 3-4 |  |  |  | 0.91 | 900° C. |  |
| Comparative Example 3-5 |  |  |  | 0.91 |  |  |
| Comparative Example 3-6 |  |  | Li$_2$WO$_4$ | 0.08 | 500° C. | 1 h |
| Comparative Example 3-7 |  |  |  | 13.8 |  |  |
| Comparative Example 3-8 |  |  |  | 1.37 | 900° C. |  |
| Comparative Example 3-9 |  |  |  | 1.37 |  |  |

TABLE 11

| | Preparation of Raw Materials | | | | | | | |
|---|---|---|---|---|---|---|---|---|
| | Lithium Raw Materia | | Titanium Raw Material | | | | Calcination | |
| | Kind | Average Particle Size [μm] | Kind | Specific Surface Area [m$^2$/g] | Mixing | Form | Calcination Furnance | Highest Tempature | Retention Time |
| Example 3-1 | Li$_2$CO$_3$ | 4.6 | anatase TiO$_2$ | 10 | wet bead mill | slurry | rotary furnance | 840° C. | 30 min |
| Example 3-19 | | | | | | | | | |
| Example 3-20 | | | | | | | | | |
| Example 3-21 | | | | | | | | | |
| Example 3-22 | | | | | | | | | |
| Example 3-23 | | | | | | | | | |
| Example 3-24 | | | | | | | | | |
| Example 3-25 | | | | | | | | | |
| Example 3-26 | | | | | | | | | |
| Example 3-27 | | | | | | | | | |
| Example 3-28 | | | | | | | | | |
| Example 3-29 | | | | | | | | | |
| Example 3-30 | | | | | | | | | |
| Example 3-31 | | | | | | | | | |
| Example 3-32 | | | | | | | | | |
| Comparative Example 3-1 | | | | | | | | | |
| Comparative Example 3-10 | | | | | | | | | |

TABLE 11-continued

|  | Disintegration Hammer Mill Disintegration | Surface Treatment | | | | Heat Treatment | |
|---|---|---|---|---|---|---|---|
|  |  | Treatment Agent 3 | | Treatment Agent 4 | | | |
|  |  | Kind | Amount [mass %] | Kind | Amount [mass %] | Temperature | Time |
| Example 3-1 | done | Li$_2$MoO$_4$ | 0.91 |  |  | 500° C. | 1 h |
| Example 3-19 |  |  | 0.91 | Al sulfate•14-18-hydrate | 0.6 |  |  |
| Example 3-20 |  |  | 0.91 |  | 1.0 |  |  |
| Example 3-21 |  |  | 0.91 |  | 1.6 |  |  |
| Example 3-22 |  |  | 0.91 |  | 5.0 |  |  |
| Example 3-23 |  |  | 0.91 |  | 10.0 |  |  |
| Example 3-24 |  |  | 0.46 |  | 1.6 |  |  |
| Example 3-25 |  |  | 0.23 |  | 1.6 |  |  |
| Example 3-26 |  |  | 2.7 |  | 1.6 |  |  |
| Example 3-27 |  |  | 4.6 |  | 1.6 |  |  |
| Example 3-28 |  |  | 0.23 |  | 5.0 |  |  |
| Example 3-29 |  |  | 0.46 |  | 5.0 |  |  |
| Example 3-30 |  |  | 0.23 |  | 10.0 |  |  |
| Example 3-31 |  |  | 2.7 |  | 0.8 |  |  |
| Example 3-32 |  |  | 4.6 |  | 1.0 |  |  |
| Comparative Example 3-1 |  |  |  |  |  |  |  |
| Comparative Example 3-10 |  |  |  | Al sulfate•14-18-hydrate | 1.6 | 500° C. | 1 h |

TABLE 12

| | Preparation of Raw Materials | | | | | | | | |
|---|---|---|---|---|---|---|---|---|---|
| | Lithium Raw Materia | | Titanium Raw Material | | | | Calcination | | |
| | Kind | Average Particle Size [μm] | Kind | Specific Surface Area [m$^2$/g] | Mixing | Form | Calcination Furnance | Highest Temparture | Retention Time |
| Example 3-10 | Li$_2$CO$_3$ | 4.6 | anatase TiO$_2$ | 10 | wet bead mill | slurry | rotary furnance | 840° C. | 30 min |
| Example 3-33 |  |  |  |  |  |  |  |  |  |
| Example 3-34 |  |  |  |  |  |  |  |  |  |
| Example 3-35 |  |  |  |  |  |  |  |  |  |
| Example 3-36 |  |  |  |  |  |  |  |  |  |
| Example 3-37 |  |  |  |  |  |  |  |  |  |
| Example 3-38 |  |  |  |  |  |  |  |  |  |
| Example 3-39 |  |  |  |  |  |  |  |  |  |
| Example 3-40 |  |  |  |  |  |  |  |  |  |
| Example 3-41 |  |  |  |  |  |  |  |  |  |
| Example 3-42 |  |  |  |  |  |  |  |  |  |
| Example 3-43 |  |  |  |  |  |  |  |  |  |
| Example 3-44 |  |  |  |  |  |  |  |  |  |
| Example 3-45 |  |  |  |  |  |  |  |  |  |
| Example 3-46 |  |  |  |  |  |  |  |  |  |
| Comparative Example 3-1 |  |  |  |  |  |  |  |  |  |
| Comparative Example 3-10 |  |  |  |  |  |  |  |  |  |

|  | Disintegration Hammer Mill Disintegration | Surface Treatment | | | | Heat Treatment | |
|---|---|---|---|---|---|---|---|
|  |  | Treatment Agent 3 | | Treatment Agent 4 | | | |
|  |  | Kind | Amount [mass %] | Kind | Amount [mass %] | Temperature | Time |
| Example 3-10 | done | Li$_2$WO$_4$ | 1.37 |  |  | 500° C. | 1 h |
| Example 3-33 |  |  | 1.37 | Al sulfate•14-18-hydrate | 0.6 |  |  |
| Example 3-34 |  |  | 1.37 |  | 1.0 |  |  |
| Example 3-35 |  |  | 1.37 |  | 1.6 |  |  |
| Example 3-36 |  |  | 1.37 |  | 5.0 |  |  |
| Example 3-37 |  |  | 1.37 |  | 10.0 |  |  |
| Example 3-38 |  |  | 0.68 |  | 1.6 |  |  |
| Example 3-39 |  |  | 0.34 |  | 1.6 |  |  |
| Example 3-40 |  |  | 4.1 |  | 1.6 |  |  |
| Example 3-41 |  |  | 6.9 |  | 1.6 |  |  |

TABLE 12-continued

| | | | | |
|---|---|---|---|---|
| Example 3-42 | 0.34 | 5.0 | | |
| Example 3-43 | 0.68 | 5.0 | | |
| Example 3-44 | 0.34 | 10.0 | | |
| Example 3-45 | 4.1 | 0.8 | | |
| Example 3-46 | 6.9 | 1.0 | | |
| Comparative Example 3-1 | | | | |
| Comparative Example 3-10 | Al sulfate•14-18-hydrate | 1.6 | 500° C. | 1 h |

Example 3-1

<Step of Preparing Raw Materials>

$Li_2CO_3$ (average particle size: 4.6 μm) and anatase $TiO_2$ (specific surface area: 10 m$^2$/g) were weighed such that the atomic ratio of Li to Ti (Li/Ti) was 0.83. A raw material powder was thereby prepared. Deionized water was added to and stirred with the raw material powder to give a raw material mixed slurry having a solid content of 40 mass %. Using a bead mill (made by Willy A. Bachofen AG, type: DYNO-MILL KD-20BC, material for the agitator: polyurethane, material for the vessel inner surface: zirconia) including a vessel 80 vol % filled with zirconia beads (outer diameter: 0.65 mm), this raw material mixed slurry was processed at an agitator circumferential speed of 13 m/s and a slurry feed rate of 55 kg/hr under control such that the vessel internal pressure was 0.02 to 0.03 MPa or less, and the raw material powder was wet mixed and milled.

<Calcination Step>

Using a rotary kiln calcination furnace (length of the furnace core tube: 4 m, diameter of the furnace core tube: 30 cm, external heating type) provided with an anti-adhesion mechanism, the resulting mixed slurry was introduced into the furnace core tube from the raw material feed zone of the calcination furnace, and was dried and calcined in a nitrogen atmosphere. In this operation, the tilt angle of the furnace core tube to the horizontal direction was 2 degrees, the rotational speed of the furnace core tube was 20 rpm, and the flow rate of nitrogen introduced from the calcinated product recovery zone into the furnace core tube was 20 L/min. The heating temperature of the furnace core tube was 900° C. in the raw material feed zone, 900° C. in the central zone, and 900° C. in the calcinated product recovery zone. The retention time of the calcinated product at 900° C. was 30 minutes.

<Disintegration Step>

The calcinated product recovered from the calcinated product recovery zone of the furnace core tube was disintegrated at a screen opening of 0.5 mm, the number of rotations of 8,000 rpm, and a powder feed rate of 25 kg/hr using a hammer mill (made by DALTON CORPORATION, AIIW-5).

<Surface Treatment Step>

Deionized water was added to and stirred with the calcined powder subjected to disintegration to give a slurry having a solid content of 30 mass %. Then, lithium molybdate ($Li_2MoO_4$) as Treatment agent 3 was added in the amount of 0.91 mass % of the calcined powder subjected to disintegration to prepare a mixed slurry. While being stirred, this mixed slurry was heated to 100° C. to be dried. The dried powder was placed into an alumina sagger, and was subjected to a heat treatment at 500° C. for one hour in a mesh belt conveying-type continuous furnace. The powder after the heat treatment was sieved with a sieve (mesh size: 45 m) to yield a lithium titanate powder according to Example 3-1.

Examples 3-2 to 3-5

Lithium titanate powders according to Examples 3-2 to 3-5 were produced in the same manner as in Example 3-1 except that the amount of lithium molybdate ($Li_2MoO_4$) added Treatment agent 3 in the surface treatment step was varied as shown in Table 10.

Examples 3-6 to 3-9

Lithium titanate powders according to Examples 3-6 to 3-9 were produced in the same manner as in Example 3-1 except that the temperature for the heat treatment in the surface treatment step was varied as shown in Table 10.

Example 3-10

A lithium titanate powder according to Example 3-10 was produced in the same manner as in Example 3-1 except that instead of lithium molybdate, lithium tungstate ($Li_2WO_4$) as Treatment agent 3 was added in the amount of 1.37 mass % of the calcined powder subjected to disintegration in the surface treatment step.

Examples 3-11 to 3-14

Lithium titanate powders according to Examples 3-11 to 3-14 were produced in the same manner as in Example 3-10 except that the amount of lithium tungstate ($Li_2WO_4$) added as Treatment agent 3 in the surface treatment step was varied as shown in Table 10.

Examples 3-15 to 3-18

Lithium titanate powders according to Examples 3-15 to 3-18 were produced in the same manner as in Example 3-10 except that the temperature for the heat treatment in the surface treatment step was varied as shown in Table 10.

Example 3-19

Deionized water was added to and stirred with the calcined powder in the same manner as in Example 3-1 and subjected to disintegration to give a slurry having a solid content of 30 mass %. Then, lithium molybdate as Treatment agent 3 and aluminum sulfate (aluminum sulfate-tetradecato octadecahydrate) as Treatment agent 4 were simultaneously added in the amounts, respectively, of 0.91 mass % and 0.6 mass % of the calcined powder subjected to disintegration to prepare a mixed slurry. Thereafter, a lithium titanate powder according to Example 3-19 was produced in the same manner as in Example 3-1.

Examples 3-20 to 3-32

Lithium titanate powders according to Examples 3-20 to 3-32 were produced in the same manner as in Example 3-19 except that the amount of lithium molybdate added as Treatment agent 3 and the amount of aluminum sulfate (aluminum sulfate-tetradeca- to octadecahydrate) added as Treatment agent 4 in the surface treatment step were varied as shown in Table 11.

Examples 3-33 to 3-46

Lithium titanate powders according to Examples 3-33 to 3-46 were produced in the same manner as in Example 3-19 except that in the surface treatment step, lithium tungstate rather than lithium molybdate was added as Treatment agent 3 in an amount shown in Table 12, and the amount of aluminum sulfate (aluminum sulfate-tetradeca- to octadecahydrate) added as Treatment agent 4 was varied as shown in Table 12.

Comparative Example 3-1

A lithium titanate powder according to Comparative Example 3-1 was produced in the same manner as in Example 3-1 except that any additive was not added in the surface treatment step.

Comparative Examples 3-2 and 3-3

Lithium titanate powders according to Comparative Examples 3-2 and 3-3 were produced in the same manner as in Example 3-1 except that the amount of lithium molybdate added as Treatment agent 3 in the surface treatment step was varied as shown in Table 10.

Comparative Example 3-4

A lithium titanate powder according to Comparative Example 3-4 was produced in the same manner as in Example 3-1 except that the temperature for the heat treatment in the surface treatment step was varied as shown in Table 10.

Comparative Example 3-5

A lithium titanate powder according to Comparative Example 3-5 was produced in the same manner as in Example 3-1 except that the heat treatment was not performed in the surface treatment step.

Comparative Examples 3-6 to 3-8

Lithium titanate powders according to Comparative Examples 3-6 to 3-8 were produced in the same manner as in Example 3-1 except that in the surface treatment step, lithium tungstate rather than lithium molybdate was added as Treatment agent 3 in an amount shown in Table 10, and the temperature for the heat treatment was varied as shown in Table 10.

Comparative Example 3-9

A lithium titanate powder according to Comparative Example 3-9 was produced in the same manner as in Example 3-10 except that the heat treatment was not performed in the surface treatment step.

Comparative Example 3-10

A lithium titanate powder according to Comparative Example 3-10 was produced in the same manner as in Example 3-1 except that only treatment agent 4 was added in the surface treatment step as shown in Table 11.

[Measurement of Powder Physical Properties]

A variety of physical properties of the lithium titanate powders according to Examples 3-1 to 3-46 and Comparative Examples 3-1 to 3-10 (hereinafter, referred to as each of the lithium titanate powders according to Examples and Comparative Examples in some cases) were measured as follows. The results of measurement for Examples 3-1 to 3-18 and Comparative Examples 3-1 to 3-9 are shown in Table 13. The results of measurement for Examples 3-19 to 3-32 and Comparative Example 3-10 with those for Example 3-1 and Comparative Example 3-1 are shown in Table 14. The results of measurement for Examples 3-33 to 3-46 with those for Example 3-10 and Comparative Examples 3-1 and 3-10 are shown in Table 15.

<Measurement of Specific Surface Area>

In each of the lithium titanate powders according to Examples and Comparative Examples, the specific surface area ($m^2/g$) was measured in the same manner as for Examples and Comparative Examples according to the first embodiment described above.

<Inductively Coupled Plasma Atomic Emission Spectroscopy (ICP-AES)>

Using an inductively coupled plasma atomic emission spectrometer (made by SII Technology Inc., trade name "SPS5100"), elements contained in each of the lithium titanate powders according to Examples and Comparative Examples were subjected to quantitative analysis. A sample to be measured was precisely measured, and nitric acid and hydrofluoric acid were added to the sample. The sample was sealed, and was irradiated with microwaves to be thermally decomposed. Ultrapure water was added to give a predetermined volume, and the resultant was used as a test solution. For Examples 3-1 to 3-18 and Comparative Examples 3-1 to 3-9 where Treatment agent 4 was not used, the element M2 was not detected (the lower limit of the detectable quantity was 0.001 mass %). From the mass proportion of the contents of the elements determined by ICP-AES, the contents $C_{M1}$, $C_{M2}$, and $C_{Ti}$ (mol %) per mol of M1, M2, and Ti elements were determined, respectively. From the results, the ratio of $C_{M1}$ to $C_{Ti}$ and the ratio of $C_{M1}$ to $C_{M2}$ ($C_{M1}/C_{Ti}$, $C_{M2}/C_{M1}$ (mol %/mol %)) were calculated.

<Measurement of Water Content by Karl-Fischer Method>

In each of the lithium titanate powders according to Examples and Comparative Examples, the water content was measured in the same manner as for Examples and Comparative Examples according to the first embodiment described above. For Example 3-1, the water content at 25° C. to 200° C. was 471.6 ppm, and the water content at 200° C. to 350° C. was 280.1 ppm. For Example 3-10, the water content at 25° C. to 200° C. was 556.1 ppm, and the water content at 200° C. to 350° C. was 147.5 ppm.

<X-Ray Diffractometry>

In addition to the measurements above, X-ray diffractometry was performed on each of the lithium titanate powders according to Examples and Comparative Examples by the same method as that for Examples and Comparative Examples according to the first embodiment described above. The relative values of the peak intensities of anatase titanium dioxide, rutile titanium dioxide, and $Li_2TiO_3$ were calculated where the main peak intensity of $Li_4Ti_5O_{12}$ was 100. In each of the lithium titanate powders according to Examples and Comparative Examples, the sum of the relative values of the peak intensities were 5 or less, and any other phases than these crystal phases were not detected.

<Atomic Concentrations of M1 and Ti in Cross-Section of Lithium Titanate Particle (Scanning Transmission Electron Microscope (STEM))>

The lithium titanate particles forming the lithium titanate powder containing M1 were subjected to the cross-sectional analysis of lithium titanate particles using a scanning transmission electron microscope (STEM), and the atomic concentration of M1 and that of Ti were measured by energy dispersive X-ray spectroscopy (EDS). The measurement was performed by the following method.

Lithium titanate particles were bonded to a dummy substrate with an epoxy resin. The substrate was cut, and was bonded to a reinforcing ring. The substrate was then subjected to grinding, dimpling, Ar ion milling, and finally carbon deposition to prepare a thin sample.

The atomic concentration of M1 and the atomic concentration of Ti at a specific position of the resulting thin sample of lithium titanate particles were measured by energy dispersive X-ray spectroscopy (EDS) as follows. While a cross-section of the thin sample was being observed at an accelerating voltage of 120 kV using a JEM-2100F field-emission transmission electron microscope (with Cs correction) made by JEOL, Ltd., the atomic concentration of M1 and the atomic concentration of Ti at an inner position of 1 nm and an inner position of 100 nm from the surface of the thin sample were measured using an UTW Si(Li) semiconductor detector made by JEOL, Ltd. attached to the microscope, the inner positions being located on a straight line drawn orthogonal to a tangent of the surface of the thin sample from its point of tangency. The beam diameter was 0.2 nm, namely, the region for analysis was a circle having a diameter of 0.2 nm. The lower limit of the detectable quantity in this measurement was 0.5 atm %. From the result, the value of E1/Eti was calculated.

<X-Ray Photoelectron Spectroscopy (XPS)>

In Examples 3-1, 3-10, 3-21, and 3-35, X-ray photoelectron spectroscopy (XPS) was performed using a scanning X-ray photoelectron spectrometer (made by ULVAC-PHI, INCORPORATED, PHI5000 Versaprobe III). An X-ray source used was monochromatic AlKα at 500 W. In Examples 3-21 and 3-35, the X-ray source used was monochromatic MgKα at 500 W to measure Al. Each of the lithium titanate powders according to Examples 3-1, 3-10, 3-21, and 3-35 was placed on a sample holder into a flat and uniform shape of D5 mm, and the elements present on the surface of each of the lithium titanate powders according to Examples 3-1, 3-10, 3-21, and 3-35 were analyzed where the region for analysis was 0.4×0.4 $mm^2$ and the photoelectron take-off angle was 45 degrees. The results of measurement were corrected such that the peak of Ti2p3 was 458.8 eV. Smoothing was performed by a Savitzky-Golay method with 11 points, and background correction used was a Shirley method. Peak areas were determined from the narrow spectra (240 to 255 eV for tungsten (W4d5/2), 230 to 240 eV for molybdenum (Mo3d), and 113 to 128 eV for aluminum (Al2s)) of all the elements detected in the wide spectrum, and the surface atomic concentration (atm %) of each element was calculated using a relative sensitivity factor specified by ULVAC-PHI, INCORPORATED. Al was not detected for Examples 3-1 and 3-10 where Treatment agent 4 was not used. The position of the peak top of W4d5/2 in the narrow spectrum of tungsten and the position of the peak top of Mo3d in the narrow spectrum of molybdenum were determined to examine the chemically bonded state of tungsten and molybdenum.

<Atomic Concentration of M2 in Cross-Section of Lithium Titanate Particle (Scanning Transmission Electron Microscope (STEM))>

By the same methods as those for Examples and Comparative Examples according to the first embodiment described above, the lithium titanate particles according to Examples 3-21 and 3-35 were subjected to the cross-sectional analysis of lithium titanate particles using a scanning transmission electron microscope (STEM), and the atomic concentration of M2 was measured by energy dispersive X-ray spectroscopy (EDS).

[Evaluation of Battery Characteristics]

Coin batteries and laminate batteries were prepared using the lithium titanate powders according to Examples and Comparative Examples, and their battery characteristics were evaluated. The results of evaluation for Examples 3-1 to 3-18 and Comparative Examples 3-1 to 3-9 are shown in Table 13. The results of measurement for Examples 3-19 to 3-32 and Comparative Example 3-10 with those for Example 3-1 and Comparative Example 3-1 are shown in Table 14. The results of measurement for Examples 3-33 to 3-46 with those for Example 3-10 and Comparative Examples 3-1 and 3-10 are shown in Table 15.

Moreover, the results of X-ray photoelectron spectroscopy (XPS) and the results of measurement of the atomic concentration of M2 for Examples 3-1, 3-10, 3-21, and 3-35 are shown in Table 16.

TABLE 13

| | Physical Properties of Powder | | | | | |
|---|---|---|---|---|---|---|
| | | Element M1 | | | | |
| | BET Specific Surface Area S [$m^2$/g] | Kind | Total Content $C_{M1}$ (ICP) [mol %] | Atomic Concentration (Surface of Particle) E1 [atm %] | Atomic Concentration (Inside of Particle) E2 [atm %] | Ti Surface Concentration Eti (TEM) [atm %] |
| Example 3-1 | 5.8 | Mo | 0.093 | 3.3 | undetected | 29.4 |
| Example 3-2 | 5.7 | Mo | 0.050 | 3.2 | undetected | 30.2 |
| Example 3-3 | 5.8 | Mo | 0.28 | 23.1 | undetected | 11.6 |
| Example 3-4 | 6.1 | Mo | 0.023 | 3.1 | undetected | 30.5 |
| Example 3-5 | 6.0 | Mo | 0.47 | 24.8 | undetected | 7.4 |
| Example 3-6 | 5.7 | Mo | 0.092 | 3.3 | undetected | 31.0 |
| Example 3-7 | 5.9 | Mo | 0.096 | 3.3 | undetected | 30.7 |
| Example 3-8 | 4.8 | Mo | 0.093 | 3.2 | undetected | 30.1 |
| Example 3-9 | 4.2 | Mo | 0.089 | 3.2 | undetected | 34.8 |
| Example 3-10 | 5.6 | W | 0.095 | 4.8 | undetected | 45.3 |
| Example 3-11 | 5.8 | W | 0.051 | 4.6 | undetected | 44.5 |
| Example 3-12 | 5.6 | W | 0.28 | 26.1 | undetected | 10.6 |
| Example 3-13 | 5.6 | W | 0.025 | 4.6 | undetected | 46.2 |
| Example 3-14 | 5.7 | W | 0.48 | 25.1 | undetected | 7.2 |
| Example 3-15 | 5.4 | W | 0.093 | 5.1 | undetected | 46.5 |
| Example 3-16 | 5.7 | W | 0.095 | 4.6 | undetected | 47.7 |
| Example 3-17 | 4.9 | W | 0.096 | 4.3 | undetected | 44.7 |
| Example 3-18 | 4.4 | W | 0.095 | 4.3 | undetected | 48.0 |
| Comparative Example 3-1 | 6.0 | undetected | undetected | undetected | undetected | 25.2 |
| Comparative Example 3-2 | 5.6 | Mo | 0.006 | 3.1 | undetected | 31.1 |
| Comparative Example 3-3 | 5.1 | Mo | 0.96 | 24.9 | undetected | 3.9 |
| Comparative Example 3-4 | 3.2 | Mo | 0.091 | 3.0 | undetected | 29.4 |
| Comparative Example 3-5 | 6.1 | Mo | 0.10 | 32.1 | undetected | 5.3 |

TABLE 13-continued

| | | | | | | |
|---|---|---|---|---|---|---|
| Comparative Example 3-6 | 5.9 | W | 0.006 | 4.1 | undetected | 44.8 |
| Comparative Example 3-7 | 5.2 | W | 0.95 | 27.4 | undetected | 4.2 |
| Comparative Example 3-8 | 3.3 | W | 0.093 | 4.8 | undetected | 46.6 |
| Comparative Example 3-9 | 6.0 | W | 0.10 | 33.6 | undetected | 4.5 |

| | Physical Properties of Powder M1/Ti | | Battery Characteristics | | | |
|---|---|---|---|---|---|---|
| | Entire Particle (ICP) [molar ratio] | Surface E1/Eti (TEM) [atm %/atm %] | Charge capacity [mAh/g] | Amount of Gas Generated at 70° C. in 200 Cycles [ml] | | |
| | | | | $H_2$ | Organic Gas | All Gases |
| Example 3-1 | 0.0041 | 0.11 | 160 | 3.3 | 1.9 | 5.2 |
| Example 3-2 | 0.0022 | 0.11 | 162 | 3.7 | 2.2 | 5.8 |
| Example 3-3 | 0.012 | 1.99 | 153 | 3.0 | 1.0 | 4.0 |
| Example 3-4 | 0.0010 | 0.10 | 169 | 3.8 | 2.4 | 6.1 |
| Example 3-5 | 0.021 | 3.35 | 148 | 2.5 | 1.0 | 3.6 |
| Example 3-6 | 0.0040 | 0.11 | 169 | 4.0 | 2.2 | 6.2 |
| Example 3-7 | 0.0042 | 0.11 | 165 | 3.2 | 1.9 | 5.2 |
| Example 3-8 | 0.0041 | 0.11 | 159 | 3.5 | 2.0 | 5.5 |
| Example 3-9 | 0.0040 | 0.09 | 144 | 3.2 | 1.8 | 5.1 |
| Example 3-10 | 0.0043 | 0.11 | 158 | 3.3 | 1.8 | 5.1 |
| Example 3-11 | 0.0022 | 0.10 | 165 | 3.6 | 2.1 | 5.7 |
| Example 3-12 | 0.013 | 2.46 | 154 | 3.0 | 1.1 | 4.0 |
| Example 3-13 | 0.0011 | 0.10 | 169 | 3.8 | 2.2 | 61 |
| Example 3-14 | 0.022 | 3.49 | 150 | 2.7 | 1.0 | 3.6 |
| Example 3-15 | 0.0040 | 0.11 | 168 | 3.9 | 1.9 | 5.8 |
| Example 3-16 | 0.0044 | 0.10 | 162 | 3.5 | 2.0 | 5.5 |
| Example 3-17 | 0.0043 | 0.10 | 158 | 3.2 | 1.7 | 4.9 |
| Example 3-18 | 0.0042 | 0.09 | 140 | 3.2 | 1.7 | 4.9 |
| Comparative Example 3-1 | undetected | undetected/25.2 | 171 | 4.6 | 5.5 | 10.2 |
| Comparative Example 3-2 | 0.0003 | 0.10 | 170 | 4.0 | 4.2 | 8.2 |
| Comparative Example 3-3 | 0.046 | 6.4 | 118 | 2.5 | 0.8 | 3.4 |
| Comparative Example 3-4 | 0.0042 | 0.10 | 114 | 3.4 | 1.4 | 4.9 |
| Comparative Example 3-5 | 0.0040 | 6.06 | 170 | 4.5 | 3.0 | 7.5 |
| Comparative Example 3-6 | 0.0003 | 0.092 | 170 | 4.0 | 4.2 | 8.2 |
| Comparative Example 3-7 | 0.047 | 6.5 | 127 | 2.7 | 0.9 | 3.6 |
| Comparative Example 3-8 | 0.0039 | 0.10 | 111 | 3.5 | 1.2 | 4.8 |
| Comparative Example 3-9 | 0.0042 | 7.50 | 169 | 4.4 | 2.8 | 7.1 |

TABLE 14

| | Physical Properties of Powder | | | | | | | |
|---|---|---|---|---|---|---|---|---|
| | | | Element M1 | | | | M1/Ti | |
| | BET Specific Surface Area S [$m^2$/g] | Kind | Total Content $C_{M1}$ (ICP) [mol %] | Atomic Concentration (Surface of Particle) E1 [atm %] | Atomic Concentration (Inside of Particle) E2 [atm %] | Ti Surface Concentration Eti (TEM) [atm %] | Entire Particle (ICP) [molar ratio] | Surface E1/Eti (TEM) [atm %/atm %] |
| Example 3-1 | 5.8 | Mo | 0.093 | 3.3 | undetected | 29.4 | 0.0041 | 0.11 |
| Example 3-19 | 5.6 | Mo | 0.096 | 3.2 | undetected | 29.7 | 0.0042 | 0.11 |
| Example 3-20 | 5.7 | Mo | 0.093 | 3.1 | undetected | 31.8 | 0.0041 | 0.10 |
| Example 3-21 | 5.8 | Mo | 0.098 | 3.5 | undetected | 28.9 | 0.0043 | 0.12 |
| Example 3-22 | 5.6 | Mo | 0.091 | 3.2 | undetected | 27.6 | 0.0041 | 0.11 |
| Example 3-23 | 5.8 | Mo | 0.093 | 3.2 | undetected | 30.1 | 0.0041 | 0.11 |
| Example 3-24 | 5.8 | Mo | 0.052 | 3.2 | undetected | 29.8 | 0.0023 | 0.11 |
| Example 3-25 | 5.6 | Mo | 0.025 | 3.5 | undetected | 31.1 | 0.0011 | 0.11 |
| Example 3-26 | 5.5 | Mo | 0.28 | 25.6 | undetected | 10.6 | 0.013 | 2.37 |
| Example 3-27 | 5.5 | Mo | 0.48 | 24.6 | undetected | 8.3 | 0.021 | 2.96 |
| Example 3-28 | 5.6 | Mo | 0.023 | 3.2 | undetected | 30.8 | 0.0010 | 0.10 |
| Example 3-29 | 5.7 | Mo | 0.043 | 3.1 | undetected | 32.6 | 0.0019 | 0.09 |

TABLE 14-continued

| | | | | | | | | |
|---|---|---|---|---|---|---|---|---|
| Example 3-30 | 5.4 | Mo | 0.027 | 3.3 | undetected | 28.6 | 0.0012 | 0.11 |
| Example 3-31 | 5.4 | Mo | 0.28 | 26.1 | undetected | 9.0 | 0.012 | 2.91 |
| Example 3-32 | 5.3 | Mo | 0.46 | 23.9 | undetected | 6.9 | 0.020 | 3.47 |
| Comparative Example 3-1 | 6.0 | undetected | undetected | undetected | undetected | 25.2 | undetected/22.8 | undetected/25.2 |
| Comparative Example 3-10 | 6.1 | undetected | undetected | undetected | undetected | 26.1 | undetected/22.8 | undetected/26.1 |

| | Physical Properties of Powder | | | Battery Characteristics | | |
|---|---|---|---|---|---|---|
| | Element M2 | | M2/M1 Element Concentration Ratio (ICP) | Discharge Capacity [mAh/g] | Amount of Gas Generated at 70° C. in 200 Cycles [ml] | | |
| | Kind | Content $C_{M2}$ [mol %] | $C_{M2}/C_{M1}$ [mol %/mol %] | | $H_2$ | Organic Gas | All Gases |
| Example 3-1 | undetected | undetected | undetected/0.093 | 160 | 3.3 | 1.9 | 5.2 |
| Example 3-19 | Al | 0.032 | 0.34 | 169 | 3.4 | 2.1 | 5.5 |
| Example 3-20 | Al | 0.057 | 0.61 | 169 | 3.6 | 2.0 | 5.6 |
| Example 3-21 | Al | 0.12 | 1.2 | 170 | 3.8 | 2.0 | 5.8 |
| Example 3-22 | Al | 0.36 | 4.0 | 169 | 3.9 | 2.2 | 6.1 |
| Example 3-23 | Al | 0.66 | 7.0 | 172 | 4.2 | 2.3 | 6.5 |
| Example 3-24 | Al | 0.11 | 2.2 | 170 | 3.6 | 2.4 | 6.0 |
| Example 3-25 | Al | 0.12 | 4.9 | 171 | 3.6 | 2.5 | 6.3 |
| Example 3-26 | Al | 0.12 | 0.43 | 166 | 3.6 | 1.5 | 5.1 |
| Example 3-27 | Al | 0.11 | 0.24 | 162 | 3.5 | 1.3 | 4.8 |
| Example 3-28 | Al | 0.36 | 16 | 169 | 3.5 | 2.3 | 5.8 |
| Example 3-29 | Al | 0.35 | 8.0 | 171 | 3.4 | 2.2 | 5.6 |
| Example 3-30 | Al | 0.66 | 24 | 170 | 3.4 | 2.4 | 5.8 |
| Example 3-31 | Al | 0.041 | 0.15 | 161 | 3.7 | 1.2 | 4.9 |
| Example 3-32 | Al | 0.057 | 0.12 | 159 | 3.6 | 1.4 | 5.0 |
| Comparative Example 3-1 | undetected | undetected | undetected/undetected | 171 | 4.6 | 5.5 | 10.2 |
| Comparative Example 3-10 | Al | 0.113 | 0.113/undetected | 171 | 4.7 | 4.9 | 9.6 |

TABLE 15

| | Physical Properties of Powder | | | | | | |
|---|---|---|---|---|---|---|---|
| | BET Specific Surface Area S [m²/g] | Element M1 | | | Ti Surface Concentration Eti (TEM) [atm %] | M1/Ti | |
| | | Kind | Total Content $C_{M1}$ (ICP) [mol %] | Atomic Concentration (Surface of Particle) E1 [atm %] | Atomic Concentration (Inside of Particle) E2 [atm %] | | Entire Particle (ICP) [molar ratio] | Surface E1/Eti (TEM) [atm %/atm %] |
| Example 3-10 | 5.4 | W | 0.095 | 4.8 | undetected | 45.3 | 0.0043 | 0.11 |
| Example 3-33 | 5.6 | W | 0.094 | 4.1 | undetected | 48.7 | 0.0041 | 0.08 |
| Example 3-34 | 5.5 | W | 0.096 | 5.0 | undetected | 46.2 | 0.0043 | 0.11 |
| Example 3-35 | 5.3 | W | 0.095 | 4.4 | undetected | 47.6 | 0.0042 | 0.09 |
| Example 3-36 | 5.6 | W | 0.094 | 4.6 | undetected | 45.7 | 0.0041 | 0.10 |
| Example 3-37 | 5.6 | W | 0.095 | 4.2 | undetected | 45.6 | 0.0042 | 0.09 |
| Example 3-38 | 5.5 | W | 0.051 | 4.3 | undetected | 44.7 | 0.0022 | 0.10 |
| Example 3-39 | 5.4 | W | 0.026 | 4.9 | undetected | 48.6 | 0.0012 | 0.10 |
| Example 3-40 | 5.5 | W | 0.28 | 27.3 | undetected | 10.9 | 0.013 | 2.50 |
| Example 3-41 | 5.4 | W | 0.48 | 26.9 | undetected | 7.6 | 0.021 | 3.54 |
| Example 3-42 | 5.6 | W | 0.025 | 4.2 | undetected | 45.7 | 0.0011 | 0.09 |
| Example 3-43 | 5.5 | W | 0.052 | 4.6 | undetected | 46.9 | 0.0023 | 0.10 |
| Example 3-44 | 5.3 | W | 0.026 | 4.5 | undetected | 47.6 | 0.0011 | 0.09 |
| Example 3-45 | 5.4 | W | 0.28 | 26.7 | undetected | 8.8 | 0.012 | 3.03 |
| Example 3-46 | 5.9 | W | 0.48 | 28.2 | undetected | 6.9 | 0.021 | 4.09 |
| Comparative Example 3-1 | 6.0 | undetected | undetected | undetected | undetected | 25.2 | undetected/22.8 | undetected/25.2 |
| Comparative Example 3-10 | 6.1 | undetected | undetected | undetected | undetected | 26.1 | undetected/22.8 | undetected/26.1 |

TABLE 15-continued

| | | Physical Properties of Powder | | | Battery Characteristics | | | |
|---|---|---|---|---|---|---|---|---|
| | | Element M2 | | M2/M1 Element Concentration Ratio | | Amount of Gas Generated at 70° C. in 200 Cycles [ml] | | |
| | | Kind | Content $C_{M2}$ [mol %] | (ICP) $C_{M2}/C_{M1}$ [mol %/mol %] | Discharge Capacity [mAh/g] | $H_2$ | Organic Gas | All Gases |
| | Example 3-10 | undetected | undetected | undetected/0.095 | 158 | 3.3 | 1.8 | 5.1 |
| | Example 3-33 | Al | 0.032 | 0.35 | 167 | 3.3 | 2.0 | 5.3 |
| | Example 3-34 | Al | 0.049 | 0.50 | 172 | 3.5 | 1.9 | 5.5 |
| | Example 3-35 | Al | 0.12 | 1.3 | 169 | 3.8 | 2.0 | 5.8 |
| | Example 3-36 | Al | 0.38 | 4.1 | 169 | 3.6 | 2.2 | 5.7 |
| | Example 3-37 | Al | 0.68 | 7.0 | 171 | 3.5 | 2.3 | 5.8 |
| | Example 3-38 | Al | 0.11 | 2.1 | 170 | 3.6 | 2.2 | 5.8 |
| | Example 3-39 | Al | 0.11 | 4.3 | 171 | 3.8 | 2.5 | 6.3 |
| | Example 3-40 | Al | 0.12 | 0.43 | 165 | 3.6 | 1.4 | 5.1 |
| | Example 3-41 | Al | 0.13 | 0.27 | 164 | 3.2 | 1.5 | 4.7 |
| | Example 3-42 | Al | 0.36 | 15 | 172 | 3.5 | 2.3 | 5.8 |
| | Example 3-43 | Al | 0.36 | 6.8 | 170 | 3.1 | 2.1 | 5.2 |
| | Example 3-44 | Al | 0.67 | 26 | 168 | 3.5 | 2.1 | 5.7 |
| | Example 3-45 | Al | 0.049 | 0.17 | 163 | 3.6 | 1.3 | 4.9 |
| | Example 3-46 | Al | 0.057 | 0.12 | 158 | 3.6 | 1.5 | 5.1 |
| | Comparative Example 3-1 | undetected | undetected | undetected/undetected | 171 | 4.6 | 5.5 | 10.2 |
| | Comparative Example 3-10 | Al | 0.113 | 0.113/undetected | 171 | 4.7 | 4.9 | 9.6 |

TABLE 16

| | Physical Properties of Powder XPS | | | | | | | | | TEM |
|---|---|---|---|---|---|---|---|---|---|---|
| | Element M1 | | | Metal Element M2 | | | | | | |
| | | | Concentration | | | | | | | Element M1 |
| | Kind | Spetrum Orbital | Peak Top [eV] | $C_{s2}$ [atm %] | Kind | Spetrum Orbital | Peak Top [eV] | Concentration [atm %] | M2/M1 [atm %/atm %] | $C_{s2} \times S$ | Kind |
| Example 3-1 | Mo | 3d | 233, 236 | 1.4 | — | — | — | — | — | 8 | Mo |
| Example 3-10 | W | 4d5/2 | 248 | 1.4 | — | — | — | — | — | 8 | W |
| Example 3-21 | Mo | 3d | 233, 236 | 1.0 | Al | Al2s | 119 | 1.1 | 1.10 | 6 | Mo |
| Example 3-35 | W | 4d5/2 | 248 | 1.1 | Al | Al2s | 119 | 0.9 | 0.82 | 6 | W |

| | Physical Properties of Powder TEM | | | | | | |
|---|---|---|---|---|---|---|---|
| | Element M1 | | Metal Element M2 | | | Atomic Concentration | |
| | Atomic Concentration (Surface of Particle) E1 [atm %] | Atomic Concentration (Inside of Particle) E2 [atm %] | Kind | Atomic Concentration (Surface of Particle) F1 [atm %] | Atomic Concentration (Inside of Particle) F2 [atm %] | Ti Surface Ti Concentration [atm %] | Ratio (Surface of Particle/Inside of Particle) E1/E2 | Atomic Concentration Ratio to Ti (Surface of Particle) E1/Eti |
| Example 3-1 | 3.3 | undetected | — | — | — | 29.4 | 3.3/undetected | 0.11 |
| Example 3-10 | 4.8 | undetected | — | — | — | 45.3 | 4.8/undetected | 0.11 |
| Example 3-21 | 3.5 | undetected | Al | 0.45 | undetected | 28.9 | 3.5/undetected | 0.12 |
| Example 3-35 | 4.4 | undetected | Al | 0.12 | undetected | 47.6 | 4.4/undetected | 0.09 |

<Preparation of Negative Electrode Sheet>

Negative electrode sheets were prepared by the same method as that for Examples and Comparative Examples according to the first embodiment described above.

<Preparation of Positive Electrode Sheet>

Positive electrode sheets were prepared by the same method as that for Examples and Comparative Examples according to the first embodiment described above.

<Preparation of Coin Battery>

Coin batteries of type 2032 were prepared by the same method as for Examples and Comparative Examples according to the second embodiment described above.

<Preparation of Laminate Battery>

Laminate batteries for evaluation were prepared by the same method as that for Examples and Comparative Examples according to the second embodiment described above. As the capacity of the battery, the ratio of the capacity of the negative electrode to that of the positive electrode at 1000 mAh (negative electrode capacity/positive electrode capacity) was 1.1.

<Measurement of Discharge Capacity>

Using the coin batteries prepared by the method described in Section <Preparation of coin battery> above, the single electrode capacity was evaluated by the same methods as those for Examples and Comparative Examples according to the second embodiment described above.

<Measurement of Amount of Gas Generated at 70° C. in 200 Cycles>

Each of the laminate batteries prepared by the method described in Section <Preparation of laminate battery> above was subjected to the cycle test at room temperature by the above method for Examples and Comparative Examples according to the second embodiment above to determine the amount (ml) of gas generated after the 200-cycle test.

Example 3-47

The lithium titanate powder according to Example 3-5 was used, and a porous aluminum was used as a current collector, rather than the aluminum foil, in Section <Preparation of negative electrode sheet> in [Evaluation of battery characteristics]. A porous aluminum current collector (porosity: 91%, pore diameter: 300 µm) was immersed into a slurry prepared under the same condition as described above, and the pressure was reduced (−0.1 MPa). After the immersion, excess slurry adhering to the front and rear surfaces of the porous aluminum current collector was removed with a scraper made of silicon rubber, and the porous aluminum current collector was dried to a porous aluminum current collector negative electrode. Section <Preparation of coin battery>, pressing was performed under a pressure of 0.8 t/cm$^2$ rather than 2 t/cm$^2$. The negative electrode density was calculated by subtracting only the mass of the current collector (circular shape having a diameter of 14 mm, 37 mg) rather than the thickness and the mass of the current collector (circular shape having a diameter of 14 mm, 20 µm, 8.5 mg). Except for that, [Evaluation of battery characteristics] was performed in the same manner as for Example 3-1.

Example 3-48

A coin battery and a laminate battery were prepared in the same manner as in Example 3-47 except that the lithium titanate powder according to Example 3-14 was used, and their battery characteristics were evaluated.

The results of measurement for Examples 3-47 and 3-48 with those for Examples 3-5 and 3-14 are shown in Table 17.

TABLE 17

|  | Lithium Titanate Powder Used | Current Collector | Discharge Capacity [mAh/g] | Battery Characteristics | | |
| --- | --- | --- | --- | --- | --- | --- |
|  |  |  |  | Amount of Gas Generated at 70° C. in 200 Cycles [ml] | | |
|  |  |  |  | H$_2$ | Organic Gas | All Gases |
| Example 3-5 | Example 3-5 | Al Foil | 148 | 2.5 | 1.0 | 3.6 |
| Example 3-14 | Example 3-14 | Al Foil | 150 | 2.7 | 1.0 | 3.6 |
| Example 3-47 | Example 3-5 | Porous | 154 | 2.5 | 1.2 | 3.7 |
| Example 3-48 | Example 3-14 | Porous | 157 | 2.6 | 1.2 | 3.8 |

<Evaluation>

The electrodes (Examples 3-1 to 3-46, and Examples 3-47 and 3-48) comprising the lithium titanate powder according to Examples 3-1 to 3-46 had large charge/discharge capacity while the generation of gas during the operation at high temperature was prevented. In contrast, use of the lithium titanate powder not containing M1 (Comparative Examples 3-1 and 3-10), the lithium titanate powder having an excessively low content of M1 (Comparative Examples 3-2 and 3-6), and the lithium titanate powder having an excessively large value of E1/Eti (Comparative Examples 3-5 and 3-9) resulted in a large amount of gas generated during operation at high temperature. Moreover, use of the lithium titanate powder having an excessively high content of M1 (Comparative Examples 3-3 and 3-7), and the lithium titanate powder having a specific surface area of less than 4 m$^2$/g (Comparative Example 3-4, 3-8) resulted in a reduced charge/discharge capacity.

The invention claimed is:

1. A lithium titanate powder, comprising Li$_4$Ti$_5$O$_{12}$ as a main component,
   having a specific surface area of 4 m$^2$/g or more and 25 m$^2$/g or less, and
   comprising at least one localized element selected from the group consisting of M1 where M1 is at least one metal element selected from W and Mo,
   wherein M1 as the localized element are localized on or near surfaces of lithium titanate particles forming the lithium titanate powder.

2. The lithium titanate powder according to claim 1,
   wherein boron (B) is contained as the localized element,
   B$_B$ (mass %) is 0.05 or more and 1.0 or less where B$_B$ is defined as the content of boron (B) determined by inductively coupled plasma atomic emission spectroscopy (ICP-AES),
   a peak attributed to B—O bond is observed in a spectrum of B1s in surface analysis by X-ray photoelectron spectroscopy (XPS), and
   a relation represented by the following expression (I) is satisfied:

$$10 \leq (B_S \times S) \leq 100 \quad \text{(I)}$$

wherein B$_S$ (atm %) is the concentration of boron (B) determined based on a peak area in the spectrum of B1s in surface analysis by X-ray photoelectron spectroscopy (XPS) and S (m$^2$/g) is the specific surface area.

3. The lithium titanate powder according to claim 1,
   wherein Ln is contained as the localized element,
   C$_{Ln}$ (mass %) is 0.1 or more and 5 or less, where C$_{Ln}$ is the content of Ln determined by inductively coupled plasma atomic emission spectroscopy (ICP-AES), and
   a relation represented by the following expression (II) is satisfied:

$$1 \leq (C_{S1} \times S) \leq 100 \quad \text{(II)}$$

wherein C$_{S1}$ (atm %) is the concentration of Ln determined based on a peak area of a spectrum of Ln3d, Ln3d5/2, Ln4d, Ln4d5/2, Ln2p, or Ln2p3/2 in surface analysis by X-ray photoelectron spectroscopy (XPS) and S (m²/g) is the specific surface area.

4. The lithium titanate powder according to claim 1, $C_{M1}$ (mol %) is 0.01 or more and 0.9 or less, where $C_{M1}$ is the content of M1 determined by inductively coupled plasma atomic emission spectroscopy (ICP-AES), and a relation represented by the following expression (III) is satisfied:

$$1 \leq (C_{S2} \times S) \leq 100 \tag{III}$$

wherein $C_{S2}$ (atm %) is the concentration of M1 determined based on a peak area of a spectrum of W4d5/2 and/or Mo3d in surface analysis by X-ray photoelectron spectroscopy (XPS) and S (m²/g) is the specific surface area.

5. The lithium titanate powder for an electrode of an energy storage device according to claim 1,
wherein Ln is contained in the localized element,
$C_{Ln}$ (mass %) is 0.1 or more and 5 or less, where $C_{Ln}$ is the content of Ln determined by inductively coupled plasma atomic emission spectroscopy (ICP-AES), and relations represented by the following expressions (IV) and (V) are satisfied:

$$D1 > D2 \tag{IV}$$

$$0.20 \leq D1/Dti \leq 2.0 \tag{V}$$

wherein D1 (atm %) is the elemental concentration of Ln at a depth position of 1 nm from the surface of each lithium titanate particle, Dti (atm %) is the atomic concentration of titanium at a depth position of 1 nm therefrom, and D2 (atm %) is the elemental concentration of Ln at a depth position of 100 nm from the surface of each lithium titanate particle, the elemental concentrations and the atomic concentration being measured by energy dispersive X-ray spectroscopy in cross-sectional analysis of the lithium titanate particles forming the lithium titanate powder using a scanning transmission electron microscope.

6. The lithium titanate powder according to claim 1, $C_{M1}$ (mol %) is 0.01 or more and 0.9 or less, where $C_{M1}$ is the content of M1 determined by inductively coupled plasma atomic emission spectroscopy (ICP-AES), and relations represented by the following expressions (VI) and (VII) are satisfied:

$$E1 > E2 \tag{VI}$$

$$0.05 \leq E1/Eti \leq 6 \tag{VII}$$

wherein E1 (atm %) is the elemental concentration of M1 at a depth position of 1 nm from the surface of each lithium titanate particle, Eti (atm %) is the atomic concentration of titanium at a depth position of 1 nm therefrom, and E2 (atm %) is the elemental concentration of M1 at a depth position of 100 nm from the surface of each lithium titanate particle, the elemental concentrations and the atomic concentration being measured by energy dispersive X-ray spectroscopy in cross-sectional analysis of the lithium titanate particles forming the lithium titanate powder using a scanning transmission electron microscope.

7. The lithium titanate powder according to claim 6, wherein $C_{M1}$ is 0.02 or more and 0.9 or less.

8. The lithium titanate powder according to claim 5, wherein in the cross-sectional analysis of the lithium titanate particles forming the lithium titanate powder using the scanning transmission electron microscope, Ln is not detected at a position of 100 nm from the surfaces of the lithium titanate particles measured by energy dispersive X-ray spectroscopy.

9. The lithium titanate powder according to claim 6, wherein in the cross-sectional analysis of the lithium titanate particles forming the lithium titanate powder using the scanning transmission electron microscope, M1 is not detected at a position of 100 nm from the surfaces of the lithium titanate particles measured by energy dispersive X-ray spectroscopy.

10. The lithium titanate powder for an electrode of an energy storage device according to claim 1, wherein M2, where M2 is at least one element selected from the group consisting of elements of Groups 2, 12, and 13, is contained.

11. The lithium titanate powder according to claim 10, wherein M2 is at least one element selected from the group consisting of B, Mg, Zn, Al, Ga, and In.

12. The lithium titanate powder according to claim 11, wherein M2 is Al.

13. The lithium titanate powder according to claim 12, wherein boron (B) is contained as the localized element, and
a ratio of $A_S$ to $B_S (A_S/B_S$ (atm %/atm %)) is 0.06 or more and 3 or less, where $B_S$ (atm %) is the concentration of boron (B) determined based on a peak area in a spectrum of B1s in surface analysis by X-ray photoelectron spectroscopy (XPS), and $A_S$ (atm %) is the concentration of Al determined based on a peak area in a spectrum of Al2s in surface analysis by X-ray photoelectron spectroscopy (XPS).

14. The lithium titanate powder for an electrode of an energy storage device according to claim 10, wherein a relation represented by the following expression (VIII) is satisfied:

$$F1/F2 \geq 5 \tag{VIII}$$

wherein F1 (atm %) is the elemental concentration of M2 at an inner position of 1 nm from the surface of each lithium titanate particle, the inner position being located on a straight line which extends from the surface of each lithium titanate particle and is drawn orthogonal to a tangent of the surface of the lithium titanate particle, and F2 (atm %) is the elemental concentration of M2 at a depth position of 100 nm from the surface of the lithium titanate particle, the inner position being located on a straight line which extends from the surface of the lithium titanate particle and is drawn orthogonal to a tangent of the surface of the lithium titanate particle, the elemental concentrations being measured by energy dispersive X-ray spectroscopy in cross-sectional analysis of the lithium titanate particles forming the lithium titanate powder using a scanning transmission electron microscope.

15. The lithium titanate powder of claim 10, wherein $C_{M2}$ (mass %) is 0.01 or more and 1.0 or less, where $C_{M2}$ is the content of M2 determined by inductively coupled plasma atomic emission spectroscopy (ICP-AES).

16. The lithium titanate powder according to claim 15, wherein boron (B) is contained as the localized element, and
a ratio of $C_{M2}$ to $B_B$ ($C_{M2}/B_B$ (mass %/mass %)) is 0.07 or more and 15 or less, where $B_B$ (mass %) is the content of boron (B) determined by inductively coupled plasma atomic emission spectroscopy (ICP-AES).

17. The lithium titanate powder according to claim 15, wherein Ln is contained as the localized element, and
a ratio of $C_{M2}$ to $C_{Ln}$ ($C_{M2}/C_{Ln}$ (mass %/mass %)) is 0.05 or more and 5.0 or less, where $C_{Ln}$ (mass %) is the content of Ln determined by inductively coupled plasma atomic emission spectroscopy (ICP-AES).

18. The lithium titanate powder according to claim 15, wherein M1 is contained as the localized element,
a ratio of $C_{M2}$ to $C_{M1}$ ($C_{M2}/C_{M1}$ (mol %/mol %)) is 0.3 or more and 30 or less, where $C_{M1}$ (mol %) is the content of M1 determined by inductively coupled plasma atomic emission spectroscopy (ICP-AES).

19. An active material comprising the lithium titanate powder according to claim 1.

20. An electrode sheet, comprising the active material according to claim 19.

21. An energy storage device comprising the active material according to claim 19.

22. A lithium ion secondary battery comprising the active material according to claim 19.

23. A hybrid capacitor comprising the active material according to claim 19.

* * * * *